United States Patent
Inoue et al.

(10) Patent No.: US 10,539,098 B2
(45) Date of Patent: Jan. 21, 2020

(54) CONTROL SYSTEM OF COMPRESSION-IGNITION ENGINE

(71) Applicant: Mazda Motor Corporation, Aki-gun, Hiroshima (JP)

(72) Inventors: Atsushi Inoue, Aki-gun (JP); Kota Matsumoto, Aki-gun (JP); Yusuke Kawai, Hiroshima (JP); Toru Miyamoto, Higashihiroshima (JP); Yudai Koshiro, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/960,880

(22) Filed: Apr. 24, 2018

(65) Prior Publication Data

US 2018/0334998 A1    Nov. 22, 2018

(30) Foreign Application Priority Data

May 19, 2017    (JP) ................................ 2017-100358
May 19, 2017    (JP) ................................ 2017-100359
(Continued)

(51) Int. Cl.
*F02M 26/01*    (2016.01)
*F02D 41/00*    (2006.01)
(Continued)

(52) U.S. Cl.
CPC ......... *F02M 26/01* (2016.02); *F02D 41/0002* (2013.01); *F02P 5/045* (2013.01); *F02B 11/00* (2013.01); *F02D 2041/0015* (2013.01)

(58) Field of Classification Search
CPC ..... F02M 26/01; F02B 23/06; F02B 23/0624; F02B 23/0669; F02B 23/0696;
(Continued)

(56) References Cited

U.S. PATENT DOCUMENTS

2005/0016496 A1    1/2005    Hitomi et al.

FOREIGN PATENT DOCUMENTS

JP    2001003800 A    1/2001
JP    2003090239 A    3/2003
(Continued)

*Primary Examiner* — John Kwon
*Assistant Examiner* — Johnny H Hoang
(74) *Attorney, Agent, or Firm* — Alleman Hall Creasman & Tuttle LLP

(57) ABSTRACT

A control system of a compression-ignition engine is provided, which includes an engine configured to cause combustion of mixture gas inside a combustion chamber, a spark plug, and a controller configured to operate the engine. The combustion is performed in a given mode in which, after the spark plug ignites the mixture gas to start combustion, unburned mixture gas combusts by self-ignition. The controller has a heat amount ratio changing module configured to change, according to an engine operating state, a heat amount ratio as an index relating to a ratio of a heat amount generated when the mixture gas combusts by flame propagation with respect to a total heat amount generated when the mixture gas inside the combustion chamber combusts. The controller causes the changing module to increase the heat amount ratio at a high engine speed than at a low engine speed.

9 Claims, 22 Drawing Sheets

(30) Foreign Application Priority Data

Dec. 13, 2017 (JP) .................................. 2017-238528
Dec. 13, 2017 (JP) .................................. 2017-238531

(51) Int. Cl.
*F02P 5/04* (2006.01)
*F02B 11/00* (2006.01)

(58) Field of Classification Search
CPC ........ F02B 31/08; F02B 31/085; F02D 13/02;
F02D 13/0261; F02D 35/02; F02D
35/023; F02D 41/00; F02D 41/0002;
F02D 41/0052; F02D 41/006; F02D
41/30; F02D 41/3041; F02P 5/04; F02P
5/045
USPC ......... 123/295, 305, 478–481; 701/101–105,
701/110–114
See application file for complete search history.

(56) References Cited

FOREIGN PATENT DOCUMENTS

| | | | |
|---|---|---|---|
| JP | 2006283571 | A | 10/2006 |
| JP | 4082292 | B2 | 4/2008 |
| JP | 2009108777 | A | 5/2009 |
| JP | 2009108778 | A | 5/2009 |
| JP | 2012246783 | A | 12/2012 |

CONTROL SYSTEM OF COMPRESSION-IGNITION ENGINE

TECHNICAL FIELD

The present disclosure relates to a control system of a compression-ignition engine.

BACKGROUND OF THE DISCLOSURE

JP4082292B discloses an engine for combusting a mixture gas inside a combustion chamber by self-ignition within a given operating range where an engine load and an engine speed are low. The engine combusts the mixture gas by spark-ignition within an operating range where the engine load is high and an operating range where the engine speed is higher than the given operating range.

Incidentally, combustion caused by compression ignition accompanies a relatively loud combustion noise. When the engine speed is high, NVH (Noise Vibration Harshness) of the engine exceeds an allowable value.

SUMMARY OF THE DISCLOSURE

The present disclosure is made in view of the above situations and aims to perform combustion by compression ignition while suppressing NVH of a compression-ignition engine below an allowable value.

As described later, the present inventors considered a combustion mode (SPCCI (SPark Plug Controlled Compression Ignition) combustion) in which SI (Spark Ignition) combustion and CI (Compression Ignition) combustion are combined. That is, mixture gas inside a combustion chamber is forcibly ignited to combust through flame propagation, and heat generated by this combustion causes unburned mixture gas to combust by self-ignition.

In the CI combustion, the timing of the self-ignition changes greatly due to a variation in the temperature inside the combustion chamber before the compression starts. For example, if the timing of the self-ignition is advanced, the combustion noise increases.

In this regard, the variation in the temperature inside the combustion chamber before the compression starts can be reduced by changing the heat generation amount in the SI combustion. For example, by changing the ignition timing to change the start timing of the SI combustion according to the temperature inside the combustion chamber before the compression starts, the timing of self-ignition can be controlled.

The combustion by flame propagation causes a relatively small variation in pressure, and thus the combustion noise decreases. Further, the CI combustion has a shorter combustion period compared to the combustion by flame propagation, which is advantageous in improving fuel efficiency. Therefore, the combustion mode combined the SI combustion and the CI combustion improves the fuel efficiency while reducing the combustion noise.

By performing the SPCCI combustion when an engine speed is high, it is possible to perform the CI combustion while suppressing NVH below the allowable value.

Specifically, according to one aspect of the present disclosure, a control system of a compression-ignition engine is provided, which includes an engine formed with a combustion chamber and configured to cause combustion of a mixture gas inside the combustion chamber, a spark plug disposed to be oriented into the combustion chamber and configured to ignite the mixture gas inside the combustion chamber, and a controller connected to the spark plug and configured to operate the engine by outputting a control signal to the spark plug.

The combustion is performed in a given mode in which, after the spark plug ignites the mixture gas to start combustion, unburned mixture gas combusts by self-ignition. The controller has a heat amount ratio changing module configured to change, according to an operating state of the engine, a heat amount ratio as an index relating to a ratio of a heat amount generated when the mixture gas combusts by flame propagation with respect to a total heat amount generated when the mixture gas inside the combustion chamber combusts. The controller causes the heat amount ratio changing module to increase the heat amount ratio at a high engine speed than at a low engine speed.

Note that the definition of "combustion chamber" here is not limited to a space formed when a piston is at a top dead center on compression stroke (CTDC) but is broad.

According to this configuration, the controller outputs, once determined as needed based on the operating state of the engine, the control signal to the spark plug so as to perform the combustion of the given mode in which the spark plug ignites the mixture gas inside the combustion chamber at a given timing to start the combustion, and, subsequently, the unburned mixture gas combusts by self-ignition. That is, the SPCCI combustion described above is performed.

In order to control the SPCCI combustion, the heat amount ratio (SI ratio) as the index indicating the characteristic of this combustion is defined in the controller. Further, the controller includes the heat amount ratio changing module configured to change the heat amount ratio according to the operating state of the engine.

When the SPCCI combustion is performed, the heat amount ratio changing module controls the SPCCI combustion so that the heat amount ratio at a high engine speed becomes higher than at a low engine speed.

As described above, NVH increases at a higher engine speed than at a low engine speed. Therefore, when the CI combustion which accompanies loud combustion noise is performed at the high engine speed, similar to when the engine speed is low, NVH may exceed the allowable value.

Therefore, when the engine speed is high, by controlling the heat amount ratio to be higher, i.e., relatively increasing the ratio of the SI combustion which accompanies quieter combustion noise in the SPCCI combustion, so as to relatively reduce the ratio of the CI combustion, NVH is suppressed below the allowable value also at the high engine speed.

As a more specific configuration, the control system may further include a pressure sensor configured to detect pressure inside the combustion chamber. The controller may set a target heat amount ratio, receive a detection signal of the pressure sensor, calculate the heat amount ratio based on a pressure waveform caused by the combustion of the mixture gas, and change, when the calculated heat amount ratio is different from the target heat amount ratio, the heat amount ratio to approach the target heat amount ratio.

Thus, the heat amount ratio is changed according to a difference between an actual combustion state inside the combustion chamber based on the detection signal of the pressure sensor, and a target combustion state. Thus, since the target combustion state of the SPCCI combustion corresponding to the operating state of the engine is accurately achieved, NVH is suppressed below the allowable value.

The control system may further include an internal exhaust gas recirculation (EGR) system provided to the engine and configured to change an internal EGR ratio that is a ratio of an amount of internal EGR gas contained within the mixture gas inside the combustion chamber. The controller may output a control signal to the internal EGR system to increase the internal EGR ratio so as to increase the heat amount ratio.

One method of increasing the heat amount ratio at a high engine speed is increasing a temperature of the mixture gas inside the combustion chamber (a temperature immediately before the combustion).

At a high engine speed, a combustion cycle is shorter than at a low engine speed. Since the amount of heat which an inner wall of the combustion chamber, etc. receives during the combustion accordingly decreases and the temperature inside the combustion chamber decreases, it is difficult for the mixture gas to receive heat and a time length for the mixture gas to combust becomes short. Therefore, at a high engine speed, the heat amount ratio needs to be increased under such a disadvantageous condition. In this regard, by increasing the temperature of the mixture gas itself, the SPCCI combustion is stimulated even under such a condition.

In the SPCCI combustion, the ignition of the CI combustion occurs after the SI combustion. Although increasing the temperature of the mixture gas stimulates both the SI combustion and the CI combustion, the combustion duration is short when the engine speed is high. Thus, the SI combustion becomes sharper and is stimulated than the CI combustion, which starts later than the SI combustion. Thus, by increasing the temperature of the mixture gas, the heat amount ratio is increased also at a high engine speed.

Therefore, by increasing the internal EGR ratio so as to increase the ratio of the internal EGR gas contained within the mixture gas (high-temperature burned gas), the temperature of the mixture gas increases, and thus, the heat amount ratio increases. As a result, NVH is suppressed below the allowable value also at a high engine speed.

Further, the control system may further include an external EGR system provided to the engine and configured to change an external EGR ratio that is a ratio of an amount of external EGR gas contained within the mixture gas inside the combustion chamber. The controller may output a control signal to the external EGR system to reduce the external EGR ratio so as to increase the heat amount ratio.

While the engine is operating, also by reducing the external EGR ratio so as to reduce the ratio of the external EGR gas contained within the mixture gas (cooled low-temperature burned gas), the temperature of the mixture gas increases, and thus, the heat amount ratio increases. As a result, NVH is suppressed below the allowable value also at a high engine speed.

By increasing the internal EGR ratio and reducing the external EGR ratio, the temperature of the mixture gas before the combustion is more effectively increased, and thus, the heat amount ratio is stably increased.

A swirl flow may be formed in the combustion mode when the combustion is performed in the given mode.

If the swirl flow is formed in the combustion chamber, the flow of the mixture gas inside the combustion chamber is stimulated and also the mixture gas in the combustion chamber is stratified. Thus, hazardous substances, such as $NO_x$ and soot, are prevented from being generated, and the mixture gas by which the SI combustion in the SPCCI combustion is stably performed is formed around the spark plug at an ignition timing. Therefore, the degree of freedom of controlling the heat amount ratio is increased and a more stable SPCCI combustion is achieved.

The controller may output the control signal to the spark plug to advance an ignition timing so as to increase the heat amount ratio.

When the ignition timing is advanced, the SI combustion starts early. Thus, the SI combustion is stimulated even in a short period of time at a high engine speed, and the heat amount ratio is increased. This method may be combined with the methods described above, and thereby, the heat amount ratio at a high engine speed is more effectively increased.

The internal EGR gas may be introduced into the combustion chamber by overlapping an open period of an intake valve with an open period of an exhaust valve.

In the introduction of the internal EGR gas by setting a so-called positive overlap period in which the open period of the intake valve and the open period of the exhaust valve overlap, the high-temperature burned gas generated in the combustion chamber once flows from the combustion chamber to an intake passage. Then, the burned gas flowed into the intake passage is introduced again into the combustion chamber. By flowing to the intake passage where the temperature is low, the high-temperature burned gas to be introduced into the combustion chamber, i.e., the internal EGR gas, is cooled.

Therefore, the introduction of the internal EGR gas by setting the positive overlap period lowers the temperature of the combustion chamber more than when the internal EGR gas is introduced by setting a negative overlap period in which the high-temperature burned gas is confined as it is in the combustion chamber. By this temperature decrease, it becomes possible to introduce a larger amount of the internal EGR gas, and thus, the CI combustion by self-ignition becomes slower. As a result, the degree of freedom of controlling the heat amount ratio is increased and the stable SPCCI combustion is achieved.

A swirl ratio of the swirl flow may be below 4.

In this case, for example, the control system may further include a swirl control valve provided to the engine and configured to change a strength of the swirl flow by controlling an opening by the controller. The strength of the swirl flow may increase as the opening of the swirl control valve is reduced. The controller may control the swirl control valve to have a given narrow opening without fully closing the swirl control valve.

Although forming the swirl flow in the combustion chamber stimulates the flow of the mixture gas inside the combustion chamber and stratify the mixture gas in the combustion chamber as described above, when the swirl flow is excessively strong, the stratification of the mixture gas may be unstable depending on the combustion condition. When the swirl ratio is below 4, the flow of the mixture gas inside the combustion chamber becomes suitable, and thus, the stable stratification of the mixture gas is achieved in a wide operating range of the engine.

Specifically, according to another aspect of the present disclosure, a control system of a compression-ignition engine is provided, which includes an engine formed with a combustion chamber and configured to cause combustion of mixture gas inside the combustion chamber, a spark plug disposed to be oriented into the combustion chamber and configured to ignite the mixture gas inside the combustion chamber, an EGR system provided to the engine and configured to change an EGR ratio that is a ratio of an amount of EGR gas contained within the mixture gas inside the combustion chamber, and a controller connected to the spark plug and the EGR system and configured to operate the engine by outputting a control signal to the spark plug and the EGR system, respectively.

The controller outputs the control signal to the spark plug at a given ignition timing so as to perform the combustion in a given mode in which, after the spark plug ignites the mixture gas to start combustion, unburned mixture gas inside the combustion chamber combusts by self-ignition. The controller outputs the control signal to the EGR system so as to increase the EGR ratio higher at a high engine speed than at a low engine speed.

According to this configuration, the controlled outputs, once determined as needed based on the operating state of the engine, the control signal to the spark plug so as to perform the combustion of the given mode in which the spark plug ignites the mixture gas inside the combustion chamber at a given timing to start the combustion, and, subsequently, the unburned mixture gas combusts by self-ignition. That is, the SPCCI combustion described above is performed.

When the SPCCI combustion is performed, the controller outputs the control signal to the EGR system provided to the engine. The EGR system changes the EGR ratio (a ratio of an amount of EGR gas contained within the mixture gas inside the combustion chamber) and increases the EGR ratio to be higher at a high engine speed than at a low engine speed according to the control signal outputted from the controller.

As described above, NVH increases at a high engine speed than at a low engine speed. Therefore, when the CI combustion which accompanies loud combustion noise is performed at the high engine speed, similar to when the engine speed is low, NVH may exceed the allowable value. Therefore, in order to perform the combustion by the self-ignition at a high engine speed, it is required to reduce a ratio of the CI combustion in the SPCCI combustion while increasing a ratio of the SI combustion.

At a high engine speed, a combustion cycle is shorter than at a low engine speed. Since the amount of heat that an inner wall of the combustion chamber, etc. receives during the combustion accordingly decreases and the temperature inside the combustion chamber decreases, it is difficult for the mixture gas to receive heat and a time length for the mixture gas to combust becomes short. Therefore, at a high engine speed, the SPCCI combustion needs to be stimulated to increase the ratio of the SI combustion under such a disadvantageous condition. In this regard, by increasing the temperature of the mixture gas itself (the temperature immediately before the combustion), the SPCCI combustion is stimulated even under such a condition.

In the SPCCI combustion, the ignition of the CI combustion occurs after the SI combustion. Although increasing the temperature of the mixture gas stimulates both the SI combustion and the CI combustion, the combustion duration is short when the engine speed is high. Thus, the SI combustion becomes sharper and is stimulated more than the CI combustion, which starts later than the SI combustion. Thus, by increasing the temperature of the mixture gas, the ratio of the SI combustion is increased at a high engine speed.

Therefore, while the engine is operating, by increasing the EGR ratio so as to increase the ratio of the EGR gas contained within the mixture gas (high-temperature burned gas), the temperature of the mixture gas increases, and thus, the ratio of the SI combustion in the SPCCI combustion increases. As a result, NVH is suppressed below the allowable value also at a high engine speed. Note that the EGR gas may be either one of the internal EGR gas and the external EGR gas as long as it has a high temperature.

When the engine speed exceeds a given limitation starting speed, the controller may output the control signal to the EGR system so as to limit the increase in the EGR ratio.

Although increasing the EGR ratio raises the temperature of the mixture gas, which suppresses NVH below the allowable value as described above, if the temperature of the mixture gas rises excessively, the CI combustion becomes sharp and the combustion noise increases, which may cause NVH above the allowable value. Therefore, the controller limits the increase in the EGR ratio before such a situation may occur so as to prevent NVH from exceeding the allowable value.

In this case, the limitation starting speed may be set to be lower as the engine load increases.

As the engine load increases, the temperature of the mixture gas easily becomes excessively high. Therefore, by setting the limitation starting speed at which the limitation of the increase in the EGR ratio starts, lower as the engine load increases, it is more surely prevented that NVH exceeds the allowable value.

The control system may further include an intake flow control device attached to the engine and configured to change a flow of intake air introduced into the combustion chamber. The controller may output a control signal to the intake flow control device to increase the flow of the intake air within an engine speed range exceeding the limitation starting speed.

Above the limitation starting speed, since the ratio of the SI combustion does not increase, the effect of reducing the combustion noise is limited and the effect may not be obtained sufficiently. Therefore, in accordance with the above configuration, the effect which is limited by changing the EGR ratio is compensated. That is, by strengthening the intake air flow, a vaporization of injected fuel is stimulated and the SI combustion is performed in a state where the flow inside the combustion chamber is strong. Thus, the SI combustion becomes sharp and the SI combustion is stimulated compared to the CI combustion in which the ignition is performed later. Therefore, the ratio of the SI combustion in the SPCCI combustion increases and it is more surely prevented that NVH exceeds the allowable value.

Further, the controller may output a control signal to the spark plug so that an ignition timing advances within an engine speed range exceeding the limitation starting speed.

When the ignition timing is advanced, the SI combustion starts early. Thus, the SI combustion becomes sharp even in a short period of time at a high engine speed, which allows the ratio of the SI combustion in the SPCCI combustion to be increased. Therefore, also by advancing the ignition timing, the effect which is limited by changing the EGR ratio is compensated and NVH is suppressed below the allowable value also at a high engine speed.

The EGR gas may be internal EGR gas.

Since the internal EGR gas is introduced into the combustion chamber directly, the high temperature is secured more easily than the external EGR gas introduced into the combustion chamber indirectly. Therefore, the temperature of the mixture gas is easily increased, and the ratio of the SI combustion in the SPCCI combustion is easily increased.

In this case, the internal EGR gas may be introduced into the combustion chamber by providing a negative overlap period.

Alternatively, the internal EGR gas may be introduced into the combustion chamber by overlapping an open period of an intake valve with an open period of an exhaust valve (so-called a positive overlap period).

In the introduction of the internal EGR gas by setting a negative overlap period (NVO setting), burned gas residing in the combustion chamber is used as the internal EGR gas as it is, the temperature of the mixture gas is easily increased, and the ratio of the SI combustion in the SPCCI combustion is easily increased.

On the other hand, in the introduction of the internal EGR gas by setting the positive overlap period (PVO setting), the high-temperature burned gas generated in the combustion chamber once flows from the combustion chamber to an intake passage. Then, the burned gas flowed into the intake passage is introduced again into the combustion chamber. By flowing to the intake passage where the temperature is low, the high-temperature burned gas introduced into the combustion chamber, i.e., the internal EGR gas, is cooled.

Therefore, the introduction of the internal EGR gas by the PVO setting lowers the temperature of the combustion chamber more than the NVO setting. Thus, the CI combustion by self-ignition in the SPCCI combustion becomes slower and the increase of the combustion noise due to excessive CI combustion is prevented.

Further in this case, the EGR ratio may continuously increase without limitation until the engine speed comes close to a highest speed within an operating range of the engine in which the combustion of the given mode is performed.

As described above, if the temperature of the mixture gas is increased excessively, since NVH may exceed the allowable value, the increase in the EGR ratio needs to be limited. In this regard, in the introduction of the internal EGR gas by the NVO setting, since the temperature in the combustion chamber easily becomes excessively high, the necessity of limiting the increase in the EGR ratio is high. On the other hand, in the introduction of the internal EGR gas by the PVO setting, the temperature in the combustion chamber is prevented from increasing excessively high. Thus, in the introduction of the internal EGR gas by the PVO setting, the necessity of limiting the increase in the EGR ratio is low, and the EGR ratio may be continuously high until the engine speed comes close to the highest speed.

The control system may further include a boosting system attached to the engine and configured to boost gas to be introduced into the combustion chamber. The controller may output a control signal to the boosting system so as to perform boosting within a first range in which the engine load is higher than a given load, and not to perform the boosting within a second range in which the engine load is below the given load. Within the second range, the controller may output the control signal to the EGR system so as to increase the EGR ratio higher at a high engine speed than at a low engine speed.

With such an engine, within the first range in which the boosting is performed, even when the EGR gas is introduced, it is scavenged by the boosting pressure. Therefore, within the first range, it is difficult to change the EGR ratio, a state function inside the combustion chamber becomes unstable and may cause a degradation of fuel efficiency, etc. Therefore, within the second range in which the boosting is not performed, the controller outputs the control signal to the EGR system so that the EGR ratio becomes higher. Thus, NVH is suppressed below the allowable value also at a high engine speed.

A swirl flow may be formed in the combustion chamber when the combustion is performed in the given mode.

If the swirl flow is formed in the combustion chamber, the flow of the mixture gas inside the combustion chamber is stimulated and also the mixture gas in the combustion chamber is stratified. Thus, hazardous substances, such as $NO_x$ and soot, are prevented from being generated, and the mixture gas by which the SI combustion in the SPCCI combustion is stably performed is unevenly formed around the spark plug at an ignition timing. Therefore, the stable SPCCI combustion is achieved and NVH is suppressed below the allowable value also at a high engine speed.

BRIEF DESCRIPTION OF THE DRAWINGS

FIGS. 12A and 12B show charts illustrating one example of a relationship between the engine speed and an internal EGR ratio within the operating range in which the SPCCI combustion of the engine corresponding to the first operating range map is performed, in which FIG. 12A illustrates the relationship when the internal EGR gas is introduced by setting a negative overlap period, and FIG. 12B illustrates the relationship when the internal EGR gas is introduced by setting a positive overlap period.

FIGS. 13A and 13B show charts illustrating one example of a relationship between the engine speed and an external EGR ratio within the operating range in which the SPCCI combustion of the engine corresponding to the first operating range map is performed, in which FIG. 13A illustrates the relationship when a swirl flow is scarcely formed in the combustion chamber, and FIG. 13B illustrates the relationship when a swirl flow with a given strength is formed in the combustion chamber.

FIGS. 14A and 14B show charts illustrating one example of a relationship between the engine speed and the opening of a swirl control valve within the operating range in which the SPCCI combustion of the engine corresponding to the first operating range map is performed, in which FIG. 14A illustrates the relationship in the engine corresponding to the first operating range map, and FIG. 14B illustrates the relationship in the engine corresponding to a second or third operating range map.

DETAILED DESCRIPTION OF THE DISCLOSURE

Figure 1:
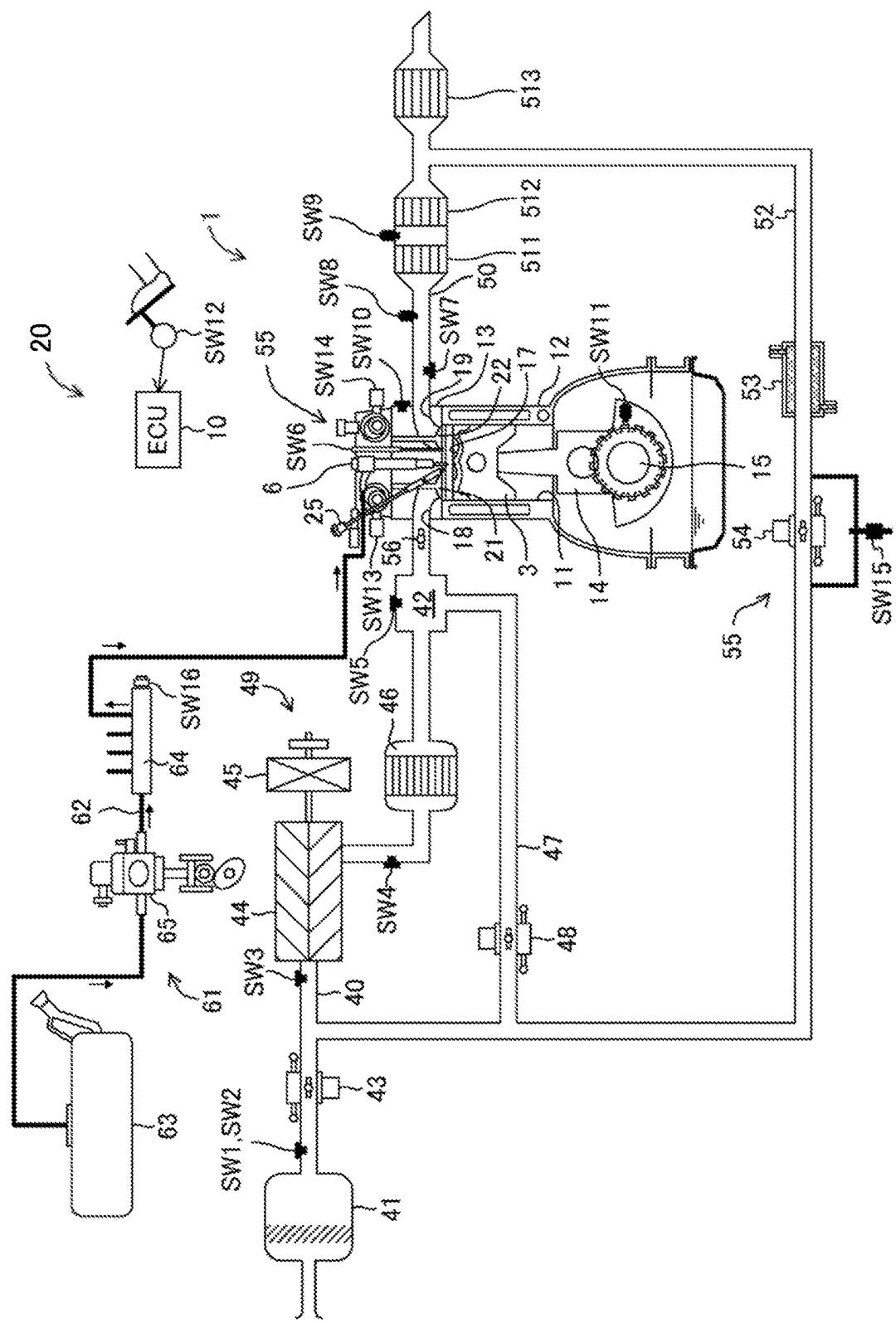
FIG. 1 is a diagram illustrating a configuration of an engine.
Figure 2:
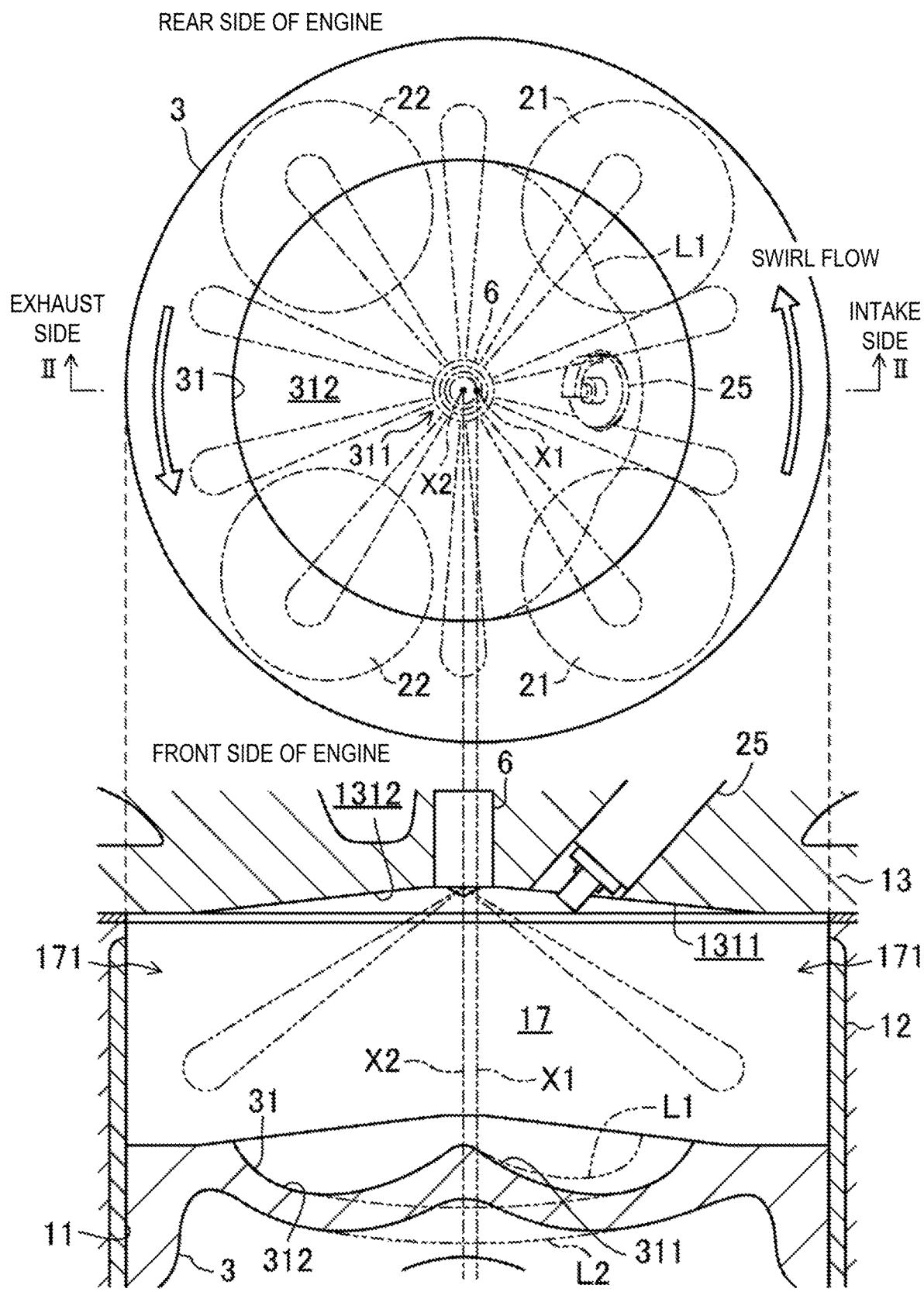
FIG. 2 is a diagram illustrating a structure of a combustion chamber, in which the upper part is a plan view of the combustion chamber and the lower part is a II-II cross-sectional view.
Figure 3:
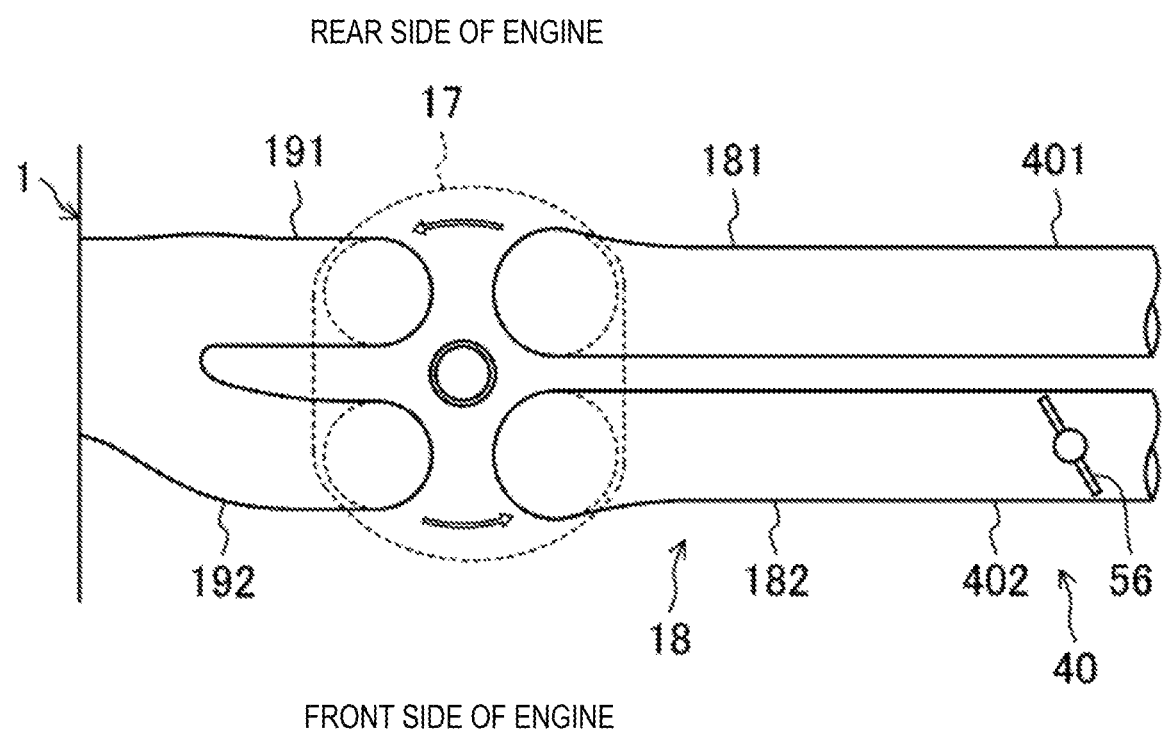
FIG. 3 is a plan view illustrating structures of the combustion chamber and an intake system.
Figure 4:
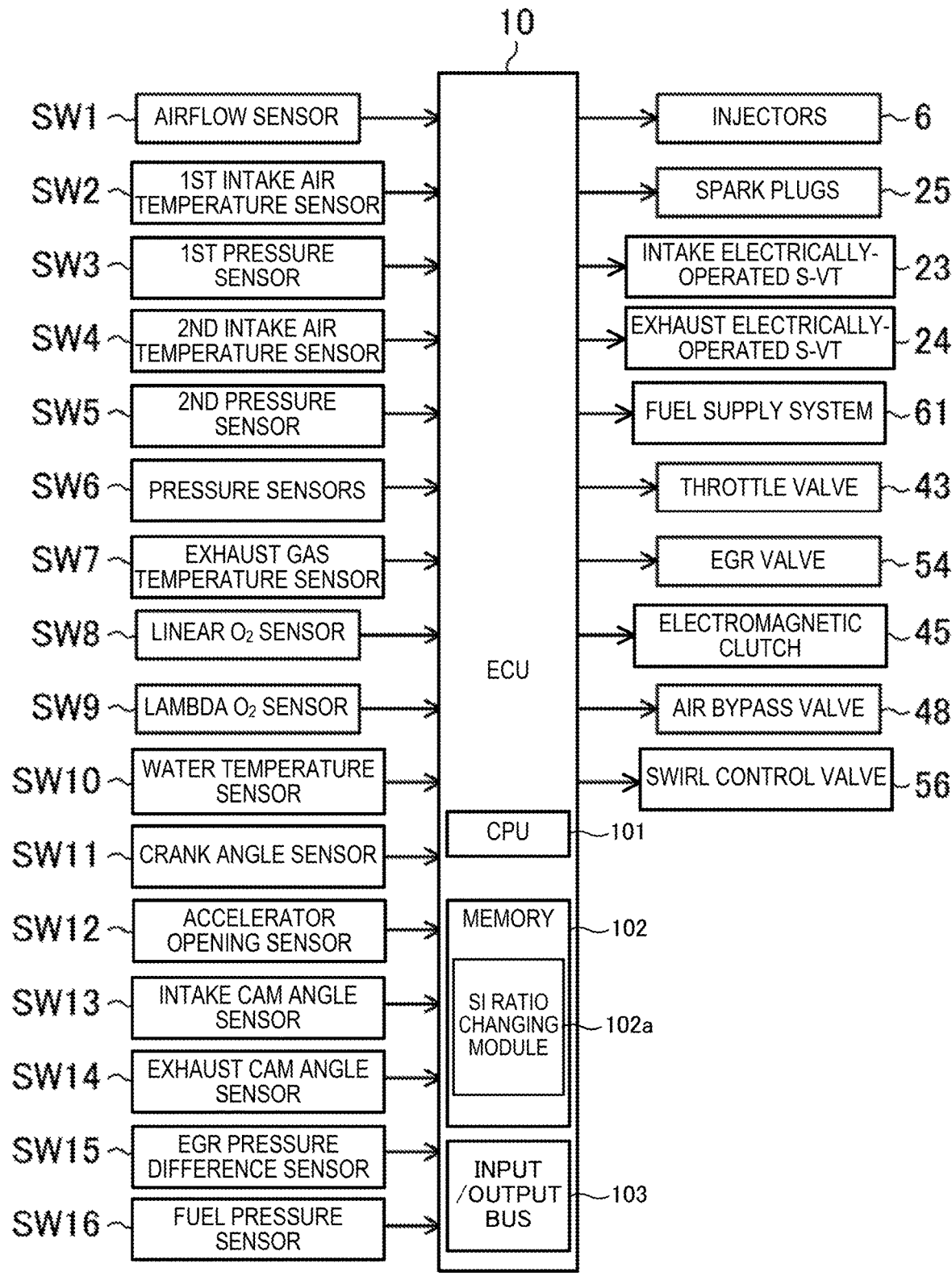
FIG. 4 is a block diagram illustrating a configuration of a control device of the engine.

Hereinafter, embodiments of a control system of a compression-ignition engine (hereinafter, may simply be referred to as "engine 1") are described in detail with reference to the accompanying drawings. The following description gives one example of the control system of the engine 1. FIG. 1 is a diagram illustrating a configuration of the engine 1. FIG. 2 is a cross-sectional view illustrating a structure of a combustion chamber. FIG. 3 is a plan view illustrating structures of the combustion chamber and an intake system. Note that in FIG. 1, an intake side is on the left side and an exhaust side is on the right side of the drawing sheet. Further in FIGS. 2 and 3, the intake side is on the right side and the exhaust side is on the left side of the drawing sheets. FIG. 4 is a block diagram illustrating a configuration of the control system of the engine 1.

Further, the definition of "EGR gas" used below includes "burned gas (exhaust gas) that remains in the combustion chamber and/or is sucked into the combustion chamber again." Similarly, the definition of "internal EGR gas" includes "burned gas (exhaust gas) that remains in the combustion chamber and/or is sucked directly into the combustion chamber again without flowing through a passage outside the engine," and the definition of "external EGR gas" includes "burned gas (exhaust gas) indirectly sucked into the combustion chamber again via the passage outside the engine, such as an exhaust passage and an intake passage." Further, "EGR ratio" is equivalent to "a ratio of an amount of EGR gas contained within a mixture gas (total gas) in the combustion chamber." Moreover, "internal EGR ratio" is equivalent to "a ratio of an amount of the internal EGR gas contained within the mixture gas (total gas) in the combustion chamber" and "external EGR ratio" is equivalent to "a ratio of an amount of the external EGR gas contained within the mixture gas (total gas) in the combustion chamber." Details of "heat amount ratio (SI ratio)" are described later.

<SPCCI Combustion>

The engine 1 performs combustion in a mode in which SI combustion and CI combustion are combined.

The SI combustion is combustion accompanying flame propagation which starts by forcibly igniting mixture gas inside a combustion chamber. The CI combustion is combustion which starts by the mixture gas inside the combustion chamber igniting by being compressed. In the combustion mode combined the SI combustion and the CI combustion, a spark plug forcibly ignites the mixture gas inside the combustion chamber to combust it through flame propagation, and heat generated by this combustion and pressure increase thereby raise the temperature inside the combustion chamber, which leads to combustion of unburned mixture gas by self-ignition.

In this regard, the variation in the temperature inside the combustion chamber before the compression starts can be reduced by adjusting the heat generation amount in the SI combustion. For example, by controlling the ignition timing to adjust the start timing of the SI combustion according to the temperature inside the combustion chamber before the compression starts, the unburned mixture gas can self-ignite at a target timing.

Hereinafter, the combustion mode in which the SI combustion and the CI combustion are combined so that the CI combustion is controlled using the SI combustion is referred to as SPCCI (Spark Controlled Compression Ignition) combustion.

<Configuration of Engine 1>

The engine 1 is mounted on a four-wheel automobile. The automobile travels by the operation of the engine 1. Fuel of the engine 1 is gasoline in this embodiment. The gasoline may contain bioethanol, etc. The fuel of the engine 1 may be any kind of fuel as long as it is liquid fuel containing at least gasoline.

The engine 1 includes a cylinder block 12 and a cylinder head 13 placed on the cylinder block 12. The cylinder block 12 is formed therein with a plurality of cylinders 11. In FIGS. 1 and 2, only one cylinder 11 is illustrated. The engine 1 is a multi-cylinder engine. The engine 1 also includes a piston 3, an injector 6, a spark plug 25, an intake valve 21, and an exhaust valve 22.

(Piston 3)

The piston 3 is reciprocatably inserted in each cylinder 11. The piston 3 is coupled to a crankshaft 15 via a connecting rod 14. The piston 3 defines a combustion chamber 17 together with the cylinder 11 and a cylinder head 13. Note that the definition of "combustion chamber" is not limited to a space formed when the piston 3 is at a top dead center on compression stroke (CTDC) and may be broad. That is, "combustion chamber" may mean any space formed by the piston 3, the cylinder 11, and the cylinder head 13 regardless of the position of the piston 3.

As illustrated in FIG. 2, a lower surface of the cylinder head 13, that is, a ceiling surface of the combustion chamber 17, is formed by an inclined surface 1311 and an inclined surface 1312. The inclined surface 1311 inclines toward an axis X2 (an axis passing through the center of injection of the injector 6) from the intake side. The inclined surface 1312 inclines upwardly toward the axis X2 from the exhaust side. The ceiling surface of the combustion chamber 17 has a so-called pent-roof shape.

An upper surface of the piston 3 bulges toward the ceiling surface of the combustion chamber 17 (or may be flat). A cavity 31 is formed in the upper surface of the piston 3. The cavity 31 is formed by denting the upper surface of the piston 3. The cavity 31 has a shallow plate shape. The cavity 31 faces the injector 6 when the piston 3 is located near CTDC.

The center of the cavity 31 is offset from an axis X1 (an axis passing through the radial center of the cylinder 11) to the exhaust side and coincides with the axis X2. The cavity 31 has a convex section 311. The convex section 311 is formed on the axis X2. The convex section 311 has a substantially conical shape. The convex section 311 extends upwardly toward the ceiling surface of the cylinder 11 from the bottom of the cavity 31.

The cavity 31 has a dented section 312 formed to surround the convex section 311 entirely. The cavity 31 has a symmetric shape with respect to the axis X2. A squish area 171 is formed outside a section of the cavity 31 within the combustion chamber 17.

A circumferential side face of the dented section 312 extends from a bottom surface of the cavity 31 to an opening surface of the cavity 31, inclined with respect to the axis X2. An inner diameter of the cavity 31 at the dented section 312 gradually increases from the bottom surface of the cavity 31 to the opening surface of the cavity 31.

Note that the shape of the combustion chamber 17 is not limited to that illustrated in FIG. 2. The shapes of the cavity 31, the upper surface of the piston 3, the ceiling surface of the combustion chamber 17, etc. are suitably changeable.

For example, the depth of the dented section 312 may be shallower on the outer circumferential side. In this case, an amount of EGR gas around the spark plug 25 decreases, and flame propagation of SI combustion in the SPCCI combustion becomes favorable.

As indicated by a virtual line L1 of FIG. 2, the cavity 31 may also have an asymmetric shape with respect to the axis X2. That is, the dented section 312 is formed radially larger and deeper on the exhaust side than the intake side. In this case, a fuel concentration around the spark plug 25 at the time of ignition increases, and therefore, ignitability of the SI combustion in the SPCCI combustion improves.

As indicated by a virtual line L2 of FIG. 2, the cavity 31 may not have the convex section 311. That is, the cavity 31 has a spherical shape gradually becoming shallower radially outwardly from the center. In this case, since it becomes more difficult for the piston 3 to come into contact with the intake valve 21 and the exhaust valve 22, the degree of freedom of controlling the opening and closing of the intake valve 21 and the exhaust valve 22 increases. If a swirl flow is formed in the combustion chamber 17 in this case, the flow stabilizes, and therefore, stratification of the mixture gas becomes easy.

The geometric compression ratio of the engine 1 is set to be between 13 and 30. As described above, the SPCCI combustion controls the CI combustion by utilizing the heat generated by the SI combustion and the pressure increase. In this engine 1, it is unnecessary to raise the temperature of the combustion chamber 17 when the piston 3 reaches CTDC for the mixture gas to self-ignite (i.e., the compression end temperature).

That is, although the engine 1 performs the CI combustion, its geometric compression ratio may be set relatively low. Lowering the geometric compression ratio is advantageous in reducing a cooling loss and a mechanical loss. For example, the geometric compression ratio may be set to 14:1 to 17:1 in regular specifications (the octane number of the fuel is about 91) and to 15:1 to 18:1 in high-octane specifications (the octane number of the fuel is about 96).

(Intake Valve 21 and Exhaust Valve 22)

The cylinder head 13 is formed with an intake port 18 for each cylinder 11. As illustrated in FIG. 3, the intake port 18 includes two intake ports of a first intake port 181 and a second intake port 182. The first intake port 181 and the second intake port 182 are arranged in axial directions of the crankshaft 15, i.e., front-and-rear directions of the engine 1. The intake port 18 communicates with the combustion chamber 17. Although not illustrated in detail, the intake port 18 is a so-called tumble port. That is, the intake port 18 has such a shape that a tumble flow is formed in the combustion chamber 17.

The intake valve 21 is disposed in the intake port 18. The intake valve 21 opens and closes the intake port 18 to and from the combustion chamber 17. The intake valve 21 is opened and closed by a valve operating mechanism at a given timing. This valve operating mechanism may be a variable valve mechanism which makes a valve timing and/or valve lift variable. In this configuration example, as illustrated in FIG. 4, the variable valve mechanism has an intake electrically-operated S-VT (Sequential-Valve Timing) 23. The intake electrically-operated S-VT 23 is continuously variable of a rotational phase of an intake camshaft within a given angular range. Thus, the open and close timings of the intake valve 21 continuously change. Note that the intake valve operating mechanism may have a hydraulically-operated S-VT instead of the electrically-operated S-VT.

The cylinder head 13 is also formed with an exhaust port 19 for each cylinder 11. As illustrated in FIG. 3, the exhaust port 19 also includes two exhaust ports of a first exhaust port 191 and a second exhaust port 192. The first exhaust port 191 and the second exhaust port 192 are arranged in the front-and-rear directions of the engine 1. The exhaust port 19 communicates with the combustion chamber 17.

The exhaust valve 22 is disposed in the exhaust port 19. The exhaust valve 22 opens and closes the exhaust port 19 to and from the combustion chamber 17. The exhaust valve 22 is opened and closed by a valve operating mechanism at a given timing. This valve operating mechanism may be a variable valve mechanism which makes a valve timing and/or valve lift variable. In this configuration example, as illustrated in FIG. 4, the variable valve mechanism has an exhaust electrically-operated S-VT 24. The exhaust electrically-operated S-VT 24 is continuously variable of a rotational phase of an exhaust camshaft within a given angular range. Thus, the open and close timings of the exhaust valve 22 continuously change. Note that the exhaust valve operating mechanism may have a hydraulically-operated S-VT instead of the electrically-operated S-VT.

Although is described later in detail, the engine 1 adjusts the length of an overlap period of the open timing of the intake valve 21 and the close timing of the exhaust valve 22 by the intake electrically-operated S-VT 23 and the exhaust electrically-operated S-VT 24. Thus, residual gas in the combustion chamber 17 is scavenged. Further, by adjusting the length of the overlap period, internal EGR gas is introduced into the combustion chamber 17 or is confined in the combustion chamber 17. In this configuration example, the intake electrically-operated S-VT 23 and the exhaust electrically-operated S-VT 24 constitute an internal EGR system as one of state function setting devices. Note that the internal EGR system is not necessarily constituted by the S-VT.

(Injector 6)

The injector 6 is attached to the cylinder head 13 for each cylinder 11. The injector 6 injects the fuel directly into the combustion chamber 17. The injector 6 is disposed in a valley portion of the pent roof where the inclined surface 1311 on the intake side and the inclined surface 1312 on the exhaust side intersect. As illustrated in FIG. 2, the injector 6 is disposed so that its injection axis extends along the axis X2. The injection axis of the injector 6 coincides with the position of the convex section 311 of the cavity 31. The injector 6 is oriented toward the cavity 31. Note that the injection axis of the injector 6 may coincide with the center axis X1 of the cylinder 11. Also in this case, it is desirable that the injection axis of the injector 6 coincides with the position of the convex section 311 of the cavity 31.

Although is not illustrated in detail, the injector 6 is constructed by a multi-port fuel injector having a plurality of nozzle ports. As indicated by two-dotted chain lines in FIG. 2, the injector 6 injects the fuel so that the fuel spray radially spreads downward from an upper center section of the combustion chamber 17 where the injection center is located. In this configuration example, the injector 6 has ten nozzle ports, and the nozzle ports are arranged at an even angular interval in the circumferential direction.

As illustrated in the upper part of FIG. 2, the axes of the nozzle ports do not circumferentially overlap with the spark plug 25 described later. That is, the spark plug 25 is sandwiched between the axes of two adjacent nozzle ports. Thus, the fuel spray injected from the injector 6 is prevented from directly hitting the spark plug 25 and getting an electrode wet.

As described later, the injector 6 may inject the fuel at the timing when the piston 3 is positioned near CTDC. In this case, when the injector 6 injects the fuel, the fuel spray flows downward along the convex section 311 of the cavity 31 while mixing with fresh air, and flows along the bottom surface and the circumferential surface of the concave portion 312 to spread radially outward from the center of the combustion chamber 17. Then, the mixture gas reaches the opening of the cavity 31, flows along the inclined surface 1311 on the intake side and the inclined surface 1312 on the exhaust side, and further flows from the outer circumferential side toward the center of the combustion chamber 17. Note that the injector 6 is not limited to the multi-port injector. The injector 6 may adopt an outward-opening valve injector.

A fuel supply system 61 is connected to the injector 6. The fuel supply system 61 includes a fuel tank 63 configured to store the fuel and a fuel supply path 62 connecting the fuel tank 63 with the injector 6. A fuel pump 65 and a common rail 64 are provided in the fuel supply path 62. The fuel pump 65 pumps the fuel to the common rail 64. In this embodiment, the fuel pump 65 is a plunger pump which is driven by the crankshaft 15.

The common rail 64 stores the fuel pumped from the fuel pump 65 at high fuel pressure. When the injector 6 opens, the fuel stored in the common rail 64 is injected into the combustion chamber 17 from the nozzle ports of the injector 6. The fuel supply system 61 is suppliable of the fuel at a high pressure of 30 MPa or higher to the injector 6. A highest fuel pressure of the fuel supply system 61 may be, for example, about 120 MPa. The pressure of the fuel supplied to the injector 6 may be changed according to an operating state of the engine 1. Note that the structure of the fuel supply system 61 is not limited to the above structure.

(Spark Plug 25)

The spark plug 25 is attached to the cylinder head 13 for each cylinder 11. The spark plug 25 forcibly ignites the mixture gas in the combustion chamber 17. In this configuration example, the spark plug 25 is disposed at the intake side of the center axis X1 of the cylinder 11. The spark plug 25 is located between the two intake ports 18. The spark plug 25 is attached to the cylinder head 13 to extend downwardly, toward the center of the combustion chamber 17 in a tilted posture with respect to up-and-down directions of the cylinder head 13.

As illustrated in FIG. 2, the electrode of the spark plug 25 is located near the ceiling surface of the combustion chamber 17 to be oriented toward inside the combustion chamber 17. The electrode of the spark plug 25 is adjacent to the nozzle ports of the injector 6. Note that the disposed position of the spark plug 25 is not limited to the configuration example of FIG. 2. The spark plug 25 may be disposed on the exhaust side of the axis X1. Alternatively, the spark plug 25 may be disposed on the axis X1, and the injector 6 may be disposed on the intake side or the exhaust side with respect to the axis X1.

(Intake Passage 40)

An intake passage 40 is connected to one side of the engine 1. The intake passage 40 communicates with the intake ports 18 of the cylinders 11. The intake passage 40 is a passage through which gas to be introduced into the combustion chamber 17 flows. An air cleaner 41 which filters fresh air is disposed in an upstream end part of the intake passage 40. A surge tank 42 is disposed near a downstream end of the intake passage 40. Although not illustrated in detail, a part of the intake passage 40 downstream of the surge tank 42 constitutes independent passages branched for the respective cylinders 11. Downstream ends of the independent passages communicate with the intake ports 18 of the cylinders 11, respectively.

A throttle valve 43 is disposed in the intake passage 40 between the air cleaner 41 and the surge tank 42. The throttle valve 43 changes an introduction amount of fresh air into the combustion chamber 17 by changing an opening thereof. The throttle valve 43 constitutes one of the state function setting devices.

A booster 44 is disposed in the intake passage 40 downstream of the throttle valve 43. The booster 44 boosts the gas introduced into the combustion chamber 17. In this configuration example, the booster 44 is a supercharger which is driven by the engine 1. The supercharger 44 may be, for example, of a Lisholm type. The supercharger 44 may have any structure. The supercharger 44 may be of a Roots type, a Vane type, or a centrifugal type. Note that the booster may be an electric booster or a turbocharger which is driven by the exhaust gas.

An electromagnetic clutch 45 is interposed between the booster 44 and the engine 1. The electromagnetic clutch 45 controls the flow of a driving force between the booster 44 and the engine 1, for example, it transmits the driving force from the engine 1 to the booster 44 or interrupts the transmission of the driving force therebetween. As is described later, by an ECU 10 switching the connection/disconnection of the electromagnetic clutch 45, the on/off of the booster 44 is switched. That is, in this engine 1, boosting the gas to be introduced into the combustion chamber 17 by the booster 44 and not boosting the gas to be introduced into the combustion chamber 17 by the booster 44 are switchable therebetween.

An intercooler 46 is disposed in the intake passage 40 downstream of the booster 44. The intercooler 46 cools the gas compressed in the booster 44. The intercooler 46 may be, for example, of a water cooling type.

A bypass passage 47 is connected to the intake passage 40. The bypass passage 47 connects a part of the intake passage 40 upstream of the booster 44 to a part of the intake passage 40 downstream of the intercooler 46, particularly the surge tank 42. An air bypass valve 48 is disposed in the bypass passage 47. The air bypass valve 48 changes a flow rate of the gas flowing through the bypass passage 47.

When the booster 44 is turned off (that is, when the electromagnetic clutch 45 is disconnected), the air bypass valve 48 is fully opened. Thus, the gas flowing through the intake passage 40 bypasses the booster 44 and is introduced into the combustion chamber 17 of the engine 1. The engine 1 operates in a non-boosted state, that is, in a naturally aspirated state.

When the booster 44 is turned on (that is, when the electromagnetic clutch 45 is connected), it operates in a boosting state (a state where pressure higher than atmospheric pressure is dynamically applied on the downstream side of the booster 44). The gas passed through the booster 44 partially flows back upstream of the booster 44 through the bypass passage 47. By changing an opening of the air bypass valve 48, a backflow amount is changed, which leads to adjusting boosting pressure of the gas introduced into the combustion chamber 17. In this configuration example, a boosting system 49 comprises the booster 44, the bypass passage 47, and the air bypass valve 48. The air bypass valve 48 constitutes one of the state function setting devices.

(Swirl Control Valve 56)

Further in the intake passage 40, a swirl control valve (SCV) 56 (intake flow control device) which controls a flow of intake air introduced into the combustion chamber 17 to form a swirl flow therein and changes the strength of the flow, is disposed.

As illustrated in FIG. 3, the SCV 56 is disposed in a secondary passage 402. The secondary passage 402 is one of a primary passage 401 and the secondary passage 402 communicating with the first intake port 181 and the second intake port 182, respectively. The SCV 56 is an opening regulating valve which is capable of adjusting the opening of a cross section of the secondary passage.

When the opening of the SCV 56 is small, the flow rate of the intake air into the combustion chamber 17 from the first intake port 181 relatively increases while the flow rate of the intake air into the combustion chamber 17 from the second intake port 182 is relatively reduced. Thus, the swirl flow in the combustion chamber 17 becomes strong.

When the opening of the SCV 56 is large, the flow rates of the intake air into the combustion chamber 17 from the first intake port 181 and the second intake port 182 become substantially even, and thus the swirl flow in the combustion chamber 17 becomes weak. When the SCV 56 is fully opened, a swirl flow does not occur. Note that the swirl flow circulates in the counter-clockwise direction in FIG. 3 as indicated by the white outlined arrows (also see the white outlined arrows in FIG. 2).

Note that alternatively/additionally to attaching the SCV 56 to the intake passage 40, a structure in which the open periods of the two intake valves 21 are varied so as to introduce the intake air into the combustion chamber 17 from only one of the intake valves 21 may be adopted. By opening only one of the two intake valves 21, the intake air is introduced unevenly into the combustion chamber 17, and thus, the swirl flow is generated in the combustion chamber 17. Alternatively, the shapes of the intake ports 18 may be devised so that the swirl flow is generated in the combustion chamber 17.

(Swirl Flow)

Here, the strength of the swirl flow in the combustion chamber 17 is defined. In this configuration example, the strength of the swirl flow in the combustion chamber 17 is expressed by a "swirl ratio." The "swirl ratio" may be defined as a value obtained by dividing a value which is obtained from measuring an intake flow lateral angular speed for each valve lift and integrating the value, by an engine angular speed. The intake flow lateral angular speed may be obtained based on a measurement using a rig test device illustrated in FIG. 5.

Figure 5:
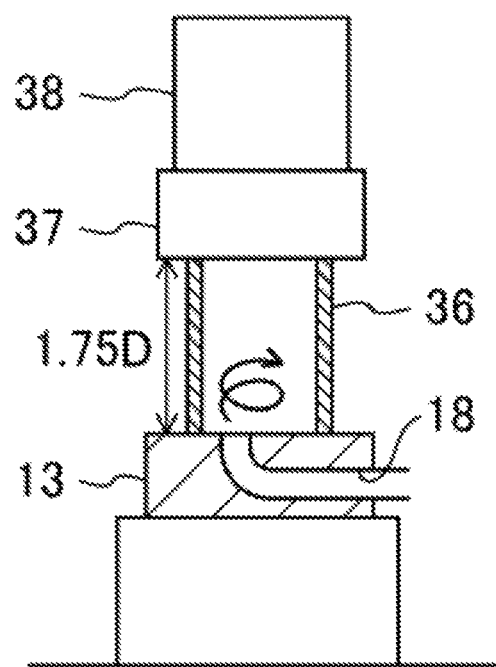
FIG. 5 is a diagram illustrating a rig test device for measuring a swirl ratio.

Specifically, in the rig test device illustrated in FIG. 5, the cylinder head 13 is placed upside down on a pedestal to connect the intake port 18 to an intake air supply device (not illustrated), and placing a cylinder 36 on the cylinder head 13 to connect, at its upper end, to an impulse meter 38 having a honeycomb rotor 37. A lower surface of the impulse meter 38 is positioned at a position 1.75D (wherein "D" is a cylinder bore diameter) away from a mating surface between the cylinder head 13 and the cylinder 36. The impulse meter 38 measures torque which acts on the honeycomb rotor 37 by a swirl generated in the cylinder 36 according to the supply of the intake air (see the arrow in FIG. 5), and the intake flow lateral angular speed is obtained based on the torque.

Figure 6:
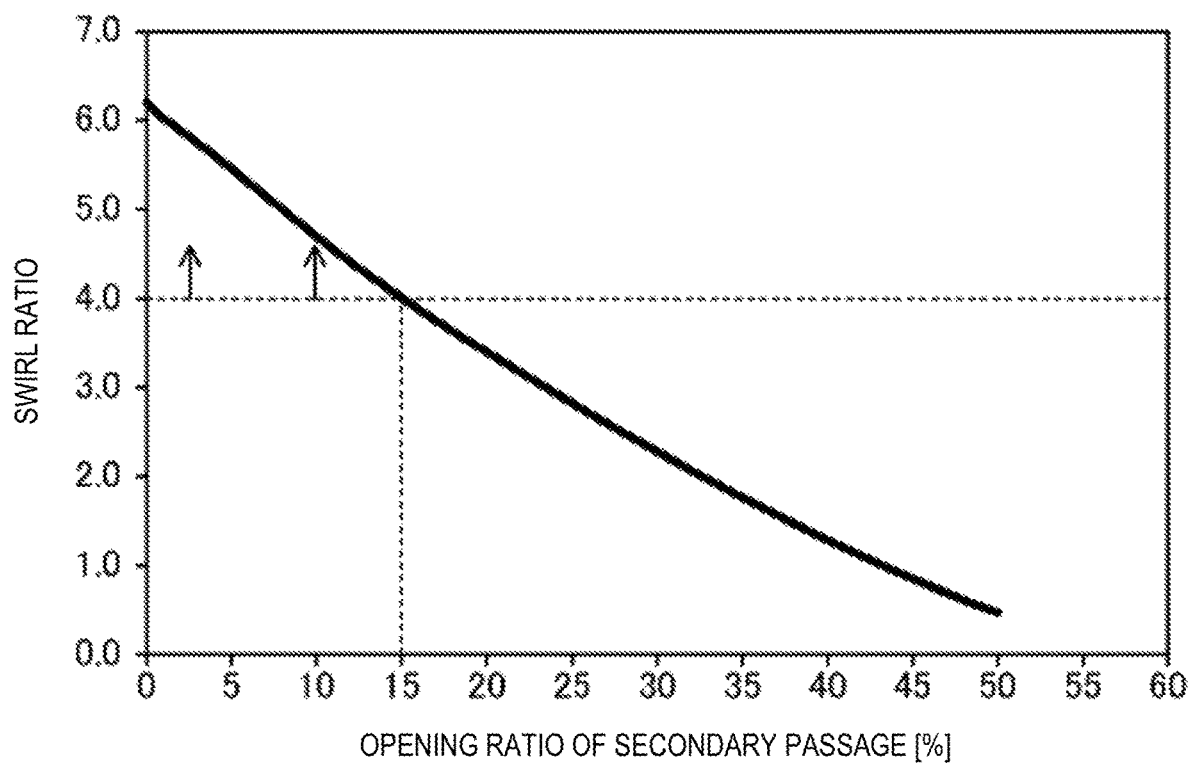
FIG. 6 is a chart illustrating a relationship between an opening ratio of a secondary passage and the swirl ratio.

FIG. 6 illustrates a relationship between the opening of the SCV 56 of the engine 1 and the swirl ratio. In FIG. 6, the opening of the SCV 56 is expressed by an opening ratio with respect to the cross section of the secondary passage 402 when fully opened. The opening ratio of the secondary passage 402 is 0% when the SCV 56 is fully closed, and increases from 0% as the opening of the SCV 56 increases. The opening ratio of the secondary passage 402 is 100% when the SCV 56 is fully opened.

As illustrated in FIG. 6, in the engine 1, the swirl ratio becomes around 6 when the SCV 56 is fully closed. In order to set the swirl ratio to be 4 or higher, the opening of the SCV 56 may be adjusted within a range of the opening ratio of 0 to 15%.

Moreover, in order to set the swirl ratio to be less than 4, the opening of the SCV 56 may be adjusted within a range of the opening ratio below 15%. Especially in order to secure the fluidity of the mixture gas and to control the stratification of the mixture gas in the combustion chamber 17 in cooperation with the SPCCI combustion within the operating range in which the engine load is low or medium, the swirl ratio is preferably adjusted within a range of 1.5 to 3 (25% to 40% in terms of the opening of the SCV 56).

(Exhaust Passage 50)

An exhaust passage 50 is connected to a side of the engine 1 opposite from the intake passage 40. The exhaust passage 50 communicates with the exhaust ports 19 of the cylinders 11. The exhaust passage 50 is a passage through which the exhaust gas discharged from the combustion chamber 17 flows. Although not illustrated in detail, an upstream part of the exhaust passage 50 constitutes independent passages branched for the respective cylinders 11. Upstream ends of the independent passages are connected to the exhaust ports 19 of the cylinders 11, respectively.

An exhaust gas purification system having one or more catalytic converters is disposed in the exhaust passage 50. The exhaust gas purification system of this configuration example has two catalytic converters. The catalytic converter on the upstream side is disposed in an engine bay and has a three-way catalyst 511 and a GPF (Gasoline Particulate Filter) 512. The catalytic converter on the downstream side is disposed outside the engine bay and has a three-way catalyst 513.

Note that the exhaust gas purification system is not limited to have the illustrated structure. For example, the GPF 512 may be omitted. Moreover, the catalytic converter is not limited to have the three-way catalyst. Furthermore, the order of arrangements of the three-way catalyst and the GPF may suitably be changed.

An EGR passage 52 constituting an external EGR system is connected between the intake passage 40 and the exhaust passage 50. The EGR passage 52 is a passage for recirculating a portion of the burned gas to the intake passage 40. An upstream end of the EGR passage 52 is connected to the exhaust passage 50 between the upstream catalytic converter and the downstream catalytic converter. A downstream end of the EGR passage 52 is connected to the intake passage 40 upstream of the booster 44.

For example, the downstream end of the EGR passage 52 is connected to an intermediate position of the bypass passage 47. The EGR gas flowing through the EGR passage 52 enters the intake passage 40 upstream of the booster 44 without passing through the air bypass valve 48 of the bypass passage 47.

A water-cooling type EGR cooler 53 is disposed in the EGR passage 52. The EGR cooler 53 cools the burned gas. An EGR valve 54 is also disposed in the EGR passage 52. The EGR valve 54 changes the flow rate of the burned gas in the EGR passage 52. By changing an opening of the EGR valve 54, the recirculation amount of the cooled burned gas (i.e., external EGR gas) is changed.

In this configuration example, an EGR system 55 includes an external EGR system including the EGR passage 52 and the EGR valve 54, and an internal EGR system including the intake electrically-operated S-VT 23 and the exhaust electrically-operated S-VT 24 described above. The EGR valve 54 constitutes one of the state function setting devices. In the external EGR system, since the EGR passage 52 is connected downstream of the upstream catalytic converter and the EGR cooler 53 is provided, the burned gas at a temperature lower than in the internal EGR system is supplied to the combustion chamber 17.

(ECU 10)

A control system 20 of the engine 1 includes an ECU (Engine Control Unit) 10 configured to operate the engine 1. The ECU 10 is a controller based on a well-known microcomputer. The ECU 10 includes a central processing unit (CPU) 101 comprising a processor configured to execute program(s)/instructions, memory 102 comprised of RAM(s) (Random Access Memory) and ROM(s) (Read Only Memory) and configured to store the program(s)/instructions and data, and an input/output bus 103 configured to input and output electric signals.

The memory 102 stores a SI ratio changing module (heat amount ratio changing module) 102a which changes the SI ratio (heat amount ratio, described later in detail) according to the operating state of the engine 1 in order to control the SPCCI combustion. The SI ratio changing module 102a comprises, for example, data such as a control program and a map used for the control program.

As illustrated in FIGS. 1 and 4, various sensors SW1 to SW16 are connected to the ECU 10. The sensors SW1 to SW16 output detection signals to the ECU 10. The sensors include the following sensors.

That is, the sensors include an airflow sensor SW1 disposed in the intake passage 40 downstream of the air cleaner 41 and configured to detect the flow rate of fresh air in the intake passage 40, a first intake air temperature sensor SW2 also disposed in the intake passage 40 downstream of the air cleaner 41 and configured to detect a temperature of the fresh air, a first pressure sensor SW3 disposed in the intake passage 40 downstream of the connecting position with the EGR passage 52 and upstream of the booster 44, and configured to detect pressure of the gas flowing into the booster 44, a second intake air temperature sensor SW4 disposed in the intake passage 40 downstream of the booster 44 and upstream of the connecting position of the bypass passage 47 and configured to detect a temperature of the gas flowed out of the booster 44, a second pressure sensor SW5 attached to the surge tank 42 and configured to detect pressure of the gas at a position downstream of the booster 44, pressure sensors SW6 attached to the cylinder head 13 corresponding to the cylinders 11 and configured to detect pressure in the combustion chambers 17, respectively, an exhaust temperature sensor SW7 disposed in the exhaust passage 50 and configured to detect a temperature of the exhaust gas discharged from the combustion chamber 17, a linear $O_2$ sensor SW8 disposed in the exhaust passage 50 upstream of the catalytic converter 511 and configured to detect an oxygen concentration within the exhaust gas, a lambda $O_2$ sensor SW9 disposed in the exhaust passage 50 downstream of the catalytic converter 511 and configured to detect an oxygen concentration within the exhaust gas, a water temperature sensor SW10 attached to the engine 1 and configured to detect a temperature of the cooling water, a crank angle sensor SW11 attached to the engine 1 and configured to detect a rotational angle of the crankshaft 15, an accelerator opening sensor SW12 attached to an accelerator pedal mechanism and configured to detect an accelerator opening corresponding to an operation amount of an accelerator pedal, an intake cam angle sensor SW13 attached to the engine 1 and configured to detect a rotational angle of the intake camshaft, an exhaust cam angle sensor SW14 attached to the engine 1 and configured to detect a rotational angle of the exhaust camshaft, an EGR pressure difference sensor SW15 disposed in the EGR passage 52 and configured to detect a difference in pressure between positions upstream and downstream of the EGR valve 54, and a fuel pressure sensor SW16 attached to the common rail 64 of the fuel supply system 61 and configured to detect pressure of the fuel to be supplied to the injector 6.

Based on these detection signals, the ECU 10 determines the operating state of the engine 1 and calculates control amounts of the various devices. The ECU 10 outputs control signals related to the calculated control amounts to the injector 6, the spark plug 25, the intake electrically-operated S-VT 23, the exhaust electrically-operated S-VT 24, the fuel supply system 61, the throttle valve 43, the EGR valve 54, the electromagnetic clutch 45 of the booster 44, the air bypass valve 48, and the SCV 56.

For example, the ECU 10 changes the boosting pressure by changing the opening of the air bypass valve 48 based on a pressure difference between the upstream and downstream sides of the booster 44 obtained from the detection signals of the first pressure sensor SW3 and the second pressure sensor SW5. Further, the ECU 10 changes the external EGR gas amount introduced into the combustion chamber 17 by changing the opening of the EGR valve 54 based on the pressure difference between the upstream and downstream sides of the EGR valve 54 obtained from the detection signal of the EGR pressure difference sensor SW15. Details of other controls of the engine 1 by the ECU 10 are described later.

<Operating Range of Engine>

Figure 7A:
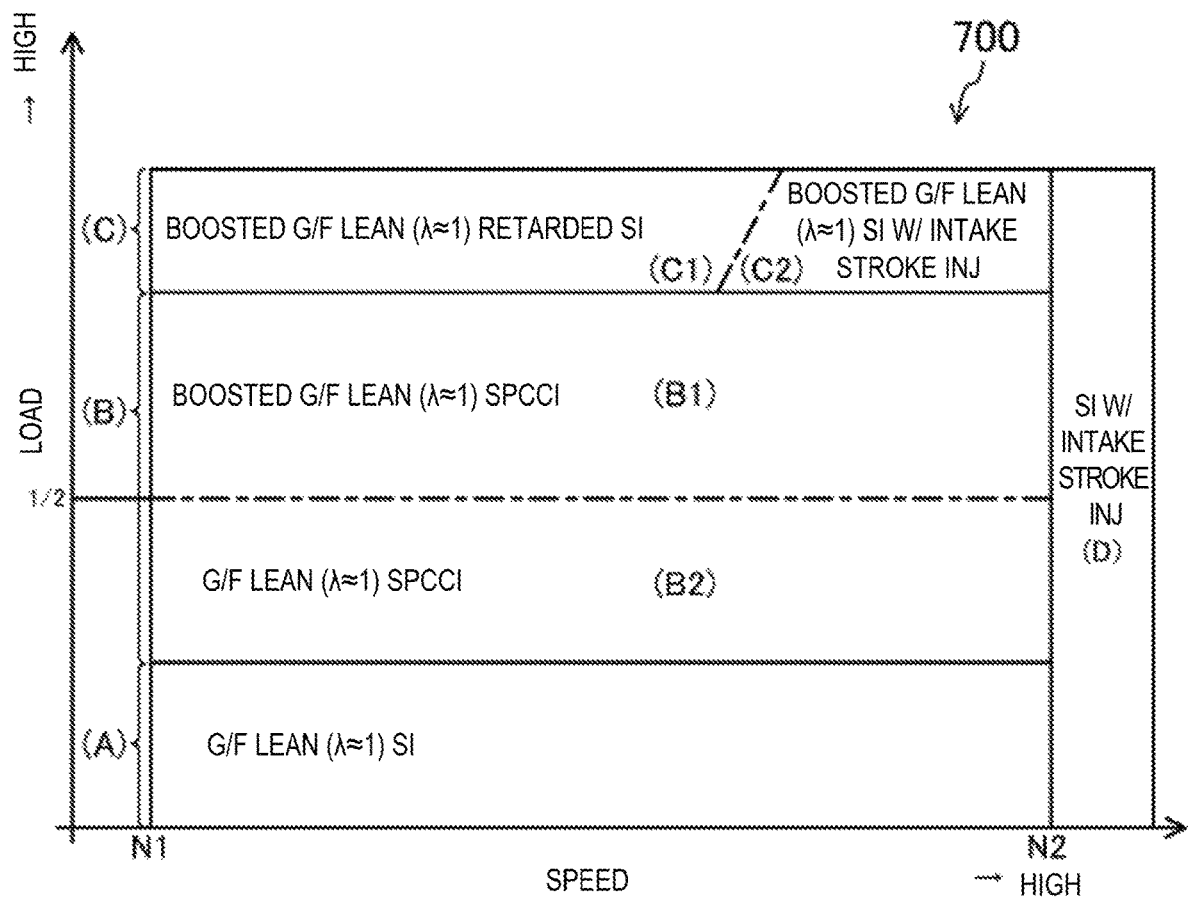
FIG. 7A is a chart illustrating a first operating range map.

FIG. 7A illustrates a first configuration example of an operating range map of the engine 1 (first operating range map 700). The operating range map 700 is defined by an engine load and an engine speed and is roughly divided into the following four ranges based on the engine load and the engine speed.

(A): a low load range including an idle operation (B): a medium load range between the low load range (A) and the following high load range (C)

(C): a high load range including a full engine load (D): a high-speed range where the engine speed is higher than in the low load range (A), the medium load range (B), and the high load range (C)

The engine 1 performs the SPCCI combustion within the medium load range (B) in order to improve the fuel efficiency and exhaust gas performance. Hereinafter, the combustion modes in each of the low load range (A), the medium load range (B), and the high load range (C) will be described in detail.

(Low Load Range)

When the operating state of the engine 1 is within the low load range (A), the fuel injection amount is small. Therefore, the amount of heat generated when the mixture gas is combusted in the combustion chamber 17 is small and the temperature of the combustion chamber 17 is low. Additionally, since the temperature of the exhaust gas is also low, even if the internal EGR gas is introduced into the combustion chamber 17 as described later, it is difficult to raise the temperature of the combustion chamber 17 to such a degree that self-ignition is stably performed.

The combustion mode when the operating state of the engine 1 is within the low load range (A) is the SI combustion in which the spark plug 25 ignites the mixture gas inside the combustion chamber 17 to combust it by flame propagation. Hereinafter, the combustion mode within the low load range (A) may be referred to as "low-load SI combustion."

When the operating state of the engine 1 is within the low load range (A), an air-fuel ratio (A/F) of the mixture gas is at the theoretical air-fuel ratio (A/F≈14.7:1). Note that below, the air-fuel ratio, an excess air ratio λ, and the value of G/F (gas/fuel ratio) of the mixture gas mean the values taken at an ignition timing.

When the air-fuel ratio of the mixture gas is set to the theoretical air-fuel ratio, the three-way catalyst is able to purify the exhaust gas discharged from the combustion chamber 17, and thus the exhaust gas performance of the engine 1 improves. The A/F of the mixture gas may be set to remain within the purification window of the three-way catalyst (i.e., an air-fuel ratio width exhibiting the three-way purification function). The excess air ratio λ of the mixture gas may be set to 1.0±0.2.

In order to improve the fuel efficiency of the engine 1, when the operating state of the engine 1 is within the low load range (A), the EGR system 55 introduces the EGR gas into the combustion chamber 17. The G/F of the mixture gas, which is a mass ratio of the total gas to the fuel in the combustion chamber 17, is set between 18 and 30. The G/F of the mixture gas may be set between 18 and 50. The mixture gas is EGR lean and has a high dilution ratio.

By setting the G/F of the mixture gas to, for example, 25, within the low load range (A), the SI combustion is stably performed without the mixture gas self-igniting. Within the low load range (A), the G/F of the mixture gas is maintained constant regardless of the engine load. Thus, the SI combustion is stable throughout the entire low load range. Additionally, the fuel efficiency of the engine 1 improves and the exhaust gas performance improves.

When the operating state of the engine 1 is within the low load range (A), since the fuel amount is low, a charge amount of gas into the combustion chamber 17 needs to be lower than 100% in order to bring λ of the mixture gas to 1.0±0.2 and G/F to a value between 18 and 50. For example, the engine 1 executes throttling for changing the opening of the throttle valve 43 and/or a mirror cycle for retarding the close timing of the intake valve 21 to after a bottom dead center (BDC) on the intake stroke.

In the engine 1 adopting the operating range map 700, when the operating state is within the low load range (A), the SCV 56 is substantially fully opened. Therefore, the swirl flow scarcely occurs in the combustion chamber 17.

Note that within a low-load and low-speed segment of the low load range (A), the combustion temperature of the mixture gas and the temperature of the exhaust gas may be raised by reducing the charge amount of gas even smaller. This is advantageous in keeping the catalytic converter 51 in an active state.

(Medium Load Range)

When the operating state of the engine 1 is within the medium load range (B), the fuel injection amount increases. The temperature of the combustion chamber 17 increases, and thus, the self-ignition is performed stably. Within the medium load range (B), the engine performs the CI combustion in order to improve the fuel efficiency and exhaust gas performance.

In the combustion caused by self-ignition, the timing of the self-ignition changes greatly if the temperature inside the combustion chamber varies before the compression starts. Therefore, within the medium load range (B), the SPCCI combustion is performed.

Further, within the medium load range (B), the engine 1 sets the state inside the combustion chamber 17 so that λ of the mixture gas becomes 1.0±0.2 and the G/F of the mixture gas becomes a value between 18 and 50. Moreover, at the ignition timing, a required temperature $T_{IG}$ inside the combustion chamber 17 is 570 to 800K, a required pressure $P_{IG}$ inside the combustion chamber 17 is 400 to 920 kPa, and turbulence kinetic energy inside the combustion chamber 17 is 17 to 40 $m^2/s^2$.

In the engine 1 adopting the operating range map 700, when the operating state is within the medium load range (B), the SCV 56 is substantially fully opened. Therefore, the swirl flow scarcely occurs in the combustion chamber 17.

By accurately controlling the self-ignition timing, an increase of the combustion noise is avoided when the operating state of the engine 1 is within the medium load range (B). Moreover, by increasing the dilution ratio of the mixture gas as high as possible and performing the CI combustion, the fuel efficiency of the engine 1 is improved. Moreover, by setting λ of the mixture gas to 1.0±0.2, the three-way catalyst is able to purify the exhaust gas, and thus the exhaust gas performance of the engine 1 improves.

As described above, within the low load range (A), the G/F of the mixture gas is set between 18 and 50 (e.g., 25) and λ of the mixture gas is set to 1.0±0.2. The state function inside the combustion chamber 17 does not vary greatly between the states where the operating state of the engine 1 is within the low load range (A) and within the medium load range (B). Therefore, robustness of the control of the engine 1 against the change of the engine load improves.

When the operating state of the engine 1 is within the medium load range (B), different from being within the low load range (A), the fuel amount increases, therefore the charge amount of gas introduced into the combustion chamber 17 is not required to be changed. Here, the throttle valve 43 is fully opened.

When the engine load increases and the fuel amount further increases, in the naturally aspirated state, the introduction amount of gas into the combustion chamber 17 becomes insufficient for setting λ of the mixture gas to 1.0±0.2 and the G/F of the mixture gas between 18 and 50. Therefore, in a segment of the medium load range (B) where the engine load is higher than a given load, the booster 44 boosts the gas to be introduced into the combustion chamber 17.

The medium load range (B) is divided into a first medium load segment (B1) in which the engine load is higher than the given load and the boost is performed, and a second medium load segment (B2) in which the engine load is lower than the given load and the boost is not performed. The given load is, for example, ½ load. The second medium load segment (B2) is a segment where the engine load is lower than the first medium load segment (B1). Hereinafter, the combustion mode within the first medium load segment (B1) may be referred to as "boosted SPCCI combustion" and the combustion mode within the second medium load segment (B2) may be referred to as "non-boosted SPCCI combustion."

Within the second medium load segment (B2) in which the boost is not performed, as the fuel amount increases, the introduction amount of fresh air into the combustion chamber 17 increases while the EGR gas decreases. The G/F of the mixture gas decreases as the engine load increases. Since the throttle valve 43 is fully opened, the engine 1 changes the introduction amount of EGR gas into the combustion chamber 17 to change the amount of fresh air introduced into the combustion chamber 17. Within the second medium load segment (B2), the state function inside the combustion chamber 17 is set such that, for example, $\lambda$ of the mixture gas is substantially constant at 1.0 while the G/F of the mixture gas is changed between 25 and 28.

On the other hand, within the first medium load segment (B1) in which the boost is performed, the engine 1 increases the introduction amounts of fresh air and EGR gas into the combustion chamber 17 as the fuel amount increases. Thus, the G/F of the mixture gas is constant even when the engine load increases. In the state function inside the combustion chamber 17 within the first medium load segment (B1), for example, $\lambda$ of the mixture gas is substantially constant at 1.0 and the G/F of the mixture gas is constant at 25.

(High Load Range)

The combustion mode when the operating state of the engine 1 is within the high load range is the SI combustion. This is for prioritizing reliably avoiding the combustion noise. Hereinafter, the combustion mode within the high load range may be referred to as "high-load SI combustion."

When the operating state of the engine is within the high load range (C), $\lambda$ of the mixture gas becomes 1.0±0.2, and the G/F of the mixture gas is basically set at between 18 and 30. The G/F of the mixture gas may be set between 18 and 50. Within the high load range (C), the throttle valve 43 is fully opened and the booster 44 performs the boost.

Within the high load range (C), the engine 1 reduces the EGR gas amount as the engine load increases. The G/F of the mixture gas decreases as the engine load increases. The introduction amount of fresh air into the combustion chamber 17 increases by the reduced amount of EGR gas, therefore, the fuel amount may be increased, which is advantageous in increasing a highest output of the engine 1.

In the engine 1 adopting the operating range map 700, when the operating state is within the high load range (C), the SCV 56 is substantially fully opened. Therefore, the swirl flow scarcely occurs in the combustion chamber 17.

The state function inside the combustion chamber 17 does not vary greatly between the states where the operating state of the engine 1 is within the high load range (C) and within the medium load range (B). Therefore, the robustness of the control of the engine 1 against the change of the engine load improves.

Since the engine 1 performs the SI combustion within the high load range (C) as described above, there is an issue with abnormal combustion, such as pre-ignition and knocking, occurring easily.

Therefore, within the high load range (C), by devising the fuel injection mode, abnormal combustion is avoided in the engine 1. For example, the ECU 10 outputs control signals to the fuel supply system 61 and the injector 6 to inject the fuel into the combustion chamber 17 at a high fuel pressure of 30 MPa or higher, at a timing in a period from a final stage of the compression stroke to an early stage of the expansion stroke (hereinafter, this period is referred to as "retard period"). The ECU 10 also outputs a control signal to the spark plug 25 to ignite the mixture gas at a timing near CTDC after the fuel injection. Hereinafter, the fuel injection into the combustion chamber 17 at the high fuel pressure at the timing in the retard period is referred to as "high-pressure retard injection."

The high-pressure retard injection shortens reaction time of the mixture gas to avoid abnormal combustion. That is, the reaction time of the mixture gas is a total length of time of (1) a period for which the injector 6 injects the fuel (i.e., injection period), (2) a period for which combustible mixture gas is formed around the spark plug 25 after the fuel injection (i.e., mixture gas formation period), and (3) a period from the start of ignition until the SI combustion ends (i.e., (3) combustion period).

The injection period and the mixture gas formation period become shorter by injecting the fuel into the combustion chamber 17 at the high fuel pressure. By shortening the injection period and the mixture gas formation period, the timing of starting the fuel injection approaches the ignition timing. In the high-pressure retard injection, since the fuel injection into the combustion chamber 17 is performed at the high fuel pressure, the fuel is injected at a timing in the retard period from the final stage of the compression stroke to the early stage of the expansion stroke.

Injecting the fuel into the combustion chamber 17 at the high fuel pressure increases turbulence kinetic energy inside the combustion chamber 17. By bringing the fuel injection timing close to CTDC, it is possible to start the SI combustion while the turbulence kinetic energy inside the combustion chamber 17 is high. As a result, the combustion period becomes short.

Thus, in the high-pressure retard injection, since the injection period, the mixture gas formation period, and the combustion period are respectively shortened, the reaction time of the mixture gas is significantly shortened compared with a case where the fuel is injected into the combustion chamber 17 on the intake stroke. As a result, abnormal combustion is avoided.

In the technical field of the engine control, conventionally, the ignition timing is retarded to avoid abnormal combustion. However, retarding the ignition timing degrades the fuel efficiency. In the high-pressure retard injection, the ignition timing is not required to be retarded. Therefore, the fuel efficiency improves by using the high-pressure retard injection.

By setting the fuel pressure to be, for example, 30 MPa or higher, the injection period, the mixture gas formation period, and the combustion period are effectively shortened. Note that the fuel pressure may suitably be set according to properties of the fuel. An upper limit of the fuel pressure may be, for example, 120 MPa.

Here, when the engine speed is low, compared to when it is high, the time required for the crank angle to change by the same angle is longer, therefore, shortening the reaction time of the mixture gas by the high-pressure retard injection is particularly effective in avoiding abnormal combustion. On the other hand, when the engine speed is high, due to the shorter time required for the crank angle to change by the same angle, shortening the reaction time of the mixture gas is not particularly effective in avoiding abnormal combustion.

Further in the high-pressure retard injection, the fuel is injected into the combustion chamber 17 only after reaching near CTDC, on the compression stroke, fuel-free gas, in other words, the gas with a high ratio of specific heat, is compressed within the combustion chamber 17. If the high-pressure retard injection is performed when the engine speed is high, the temperature inside the combustion chamber 17 at CTDC, i.e., the compression end temperature, rises, which may cause abnormal combustion, such as knocking.

Therefore, in the engine 1, the high load range (C) is divided into a first high load segment (C1) on the low engine speed side and a second high load segment (C2) where the engine speed is higher than within the first high load segment (C1). When the high load range (C) is evenly divided into three ranges of low engine speed, medium engine speed, and high engine speed, the first high load segment (C1) may include the low engine speed range and the medium engine speed range, and the second high load segment (C2) may include the high engine speed range.

Within the first high load segment (C1), the injector 6, in response to receiving the control signal of the ECU 10, performs the high-pressure retard injection described above. Within the second high load segment (C2), the injector 6, in response to receiving the control signal of the ECU 10, performs the fuel injection at a given timing on the intake stroke. The fuel injection performed on the intake stroke does not require high fuel pressure. Therefore, the ECU 10 outputs the control signal to the fuel supply system 61 so that the fuel pressure falls below the fuel pressure of the high-pressure retard injection (e.g., below 40 MPa). Since lowering the fuel pressure reduces a mechanical resistance loss of the engine 1, it is advantageous in improving the fuel efficiency.

The ratio of the specific heat of the gas inside the combustion chamber 17 decreases by injecting the fuel into the combustion chamber 17 on the intake stroke, therefore, the compression end temperature drops, and thus, abnormal combustion is avoided. Since it is not necessary to retard the ignition timing for avoiding abnormal combustion, within the second high load segment (C2), similar to the first high load segment (C1), the spark plug 25 ignites the mixture gas at a timing near CTDC.

Within the first high load segment (C1), since the mixture gas does not result in self-ignition because the high-pressure retard injection is applied, the engine 1 performs stable SI combustion. Within the second high load segment (C2), since the mixture gas does not result in self-ignition because the fuel is injected on the intake stroke, the engine 1 performs stable SI combustion.

<SPCCI Combustion>

Figure 8:
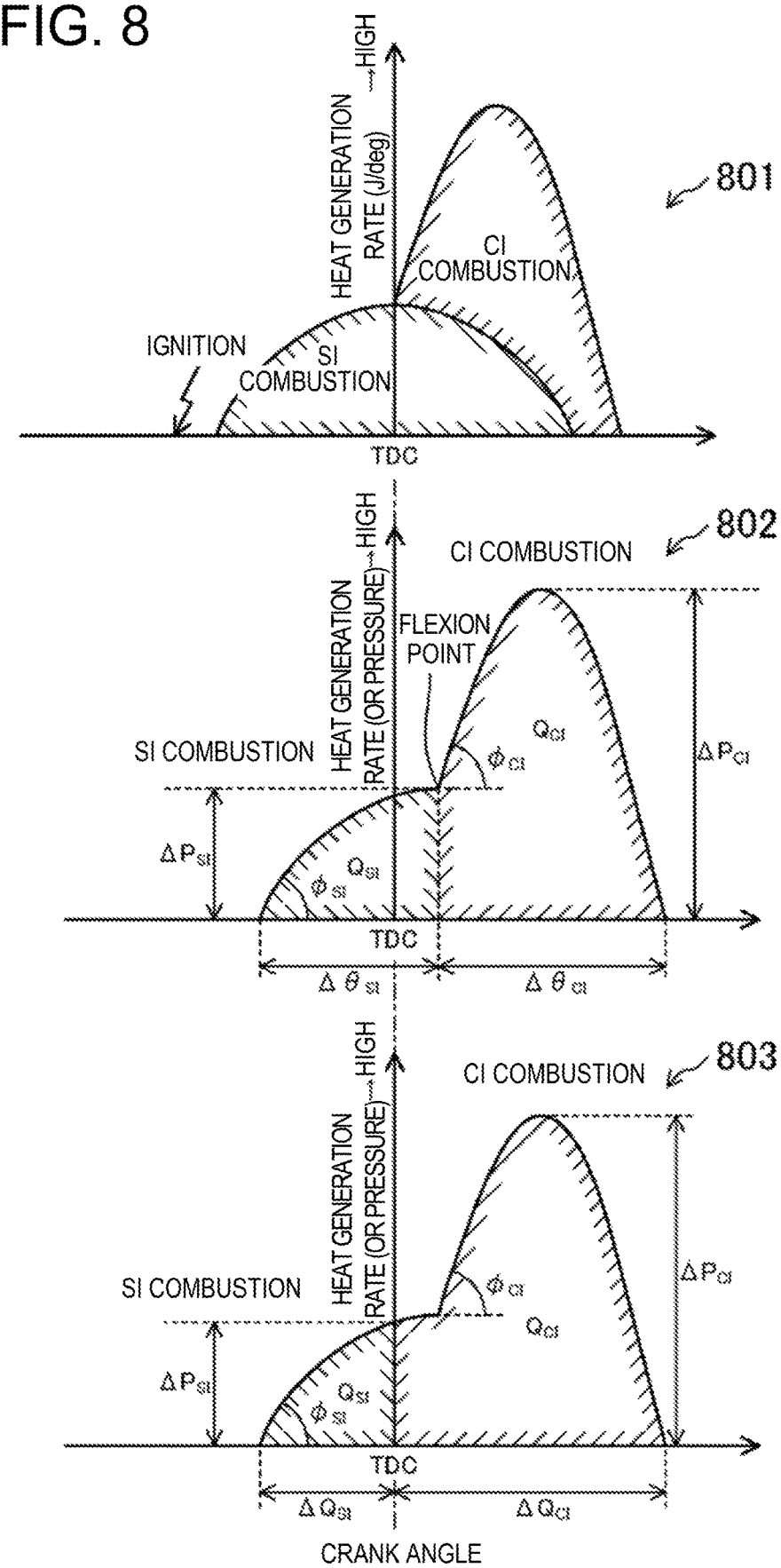
FIG. 8 shows charts conceptually illustrating a change in heat generation rate in SPCCI combustion in which SI combustion and CI combustion are combined.

Next, the SPCCI combustion described above is described in detail. The upper chart of FIG. 8 illustrates a waveform 801 which is one example of a change in a heat generation rate with respect to the crank angle. When the spark plug 25 ignites the mixture gas near CTDC, specifically at a given timing before CTDC, the combustion starts by flame propagation. The heat generation in the SI combustion is slower than the heat generation in the CI combustion. Therefore, the waveform of the heat generation rate has a relatively gentle slope. Although not illustrated, a pressure variation (dp/dθ) in the combustion chamber 17 is gentler in the SI combustion than in the CI combustion.

When the temperature and pressure inside the combustion chamber 17 rise due to the SI combustion, the unburned mixture gas self-ignites. In the example of the waveform 801, the slope of the waveform of the heat generation rate changes from gentle to sharp, i.e., the waveform of the heat generation rate has a flexion point at a timing when the CI combustion starts.

After the CI combustion starts, the SI combustion and the CI combustion are performed in parallel. In the CI combustion, since the heat generation is greater than in the SI combustion, the heat generation rate becomes relatively high. Note that since the CI combustion is performed after CTDC, the piston 3 descends by motoring. Therefore, the slope of the waveform of the heat generation rate by the CI combustion is avoided from becoming excessively sharp. The dp/dθ in the CI combustion also becomes relatively gentle.

The dp/dθ is usable as an index expressing the combustion noise. Since the SPCCI combustion is able to lower the dp/dθ as described above, it becomes possible to avoid the combustion noise from becoming excessively loud. Thus, the combustion noise is suppressed below an allowable value.

The SPCCI combustion ends by finishing the CI combustion. The CI combustion has a shorter combustion period than in the SI combustion. The SPCCI combustion advances the combustion end timing compared to the SI combustion. In other words, the SPCCI combustion brings the combustion end timing on the expansion stroke closer to CTDC. The SPCCI combustion is advantageous in improving the fuel efficiency of the engine 1 than the SI combustion.

Therefore, the SPCCI combustion achieves both prevention of the combustion noise and improvement in the fuel efficiency.

(SI Ratio:Heat Amount Ratio)

Here, an SI ratio is defined as a parameter indicating a characteristic of the SPCCI combustion. The SI ratio is defined as an index relating to a ratio of the heat amount generated by the SI combustion with respect to a total heat amount generated by the SPCCI combustion. The SI ratio is a heat amount ratio resulted from two combustions with different combustion modes. The SI ratio may be a ratio of heat amount generated by the SI combustion with respect to the heat amount generated by the SPCCI combustion. For example, in the waveform 801, the SI ratio may be expressed as SI ratio=(area of SI combustion)/(area of SPCCI combustion). In the waveform 801, the SI ratio may be referred to as "SI fuel ratio" in the meaning of the ratio of fuel to be combusted in the SI combustion.

In the SPCCI combustion combined the SI combustion and the CI combustion, the SI ratio is a ratio of the SI combustion with respect to the CI combustion. The ratio of the SI combustion is high when the SI ratio is high, and the ratio of the CI combustion is high when the SI ratio is low.

Various definitions may be considered for the SI ratio without limiting to the definition described above. For example, the SI ratio may be a ratio of the heat amount generated by the SI combustion with respect to the heat amount generated by the CI combustion. In other words, in FIG. 8, SI ratio=(area of SI combustion)/(area of CI combustion) may be set.

Further, in the SPCCI combustion, the waveform of the heat generation rate has a flexion point at the timing when the CI combustion starts. Therefore, as indicated by a reference character 802 in the middle chart of FIG. 8, by having a boundary at the flexion point in the waveform of the heat generation rate, the SI combustion may be applied for a range on the advancing side of the boundary, and the CI combustion may be applied for a range on the retarding side of the boundary. In this case, as indicated by hatching the waveform 802, based on an area $Q_{SI}$ of the advancing-side range and an area $Q_{CI}$ of the retarding-side range, SI ratio=$Q_{SI}/(Q_{SI}+Q_{CI})$ or SI ratio=$Q_{SI}/Q_{CI}$ may be set. Alternatively, the SI ratio may be defined based on an area of a part of the advancing-side range and an area of a part of the retarding-side range, instead of the entire area.

Further, instead of defining the SI ratio based on the heat generation, based on a crank angle $\Delta\theta_{SI}$ of the advancing-side range and a crank angle $\Delta\theta_{CI}$ of the retarding-side range, SI ratio=$\Delta\theta_{SI}/(\Delta\theta_{SI}+\Delta\theta_{CI})$ or SI ratio=$\Delta\theta_{SI}/\Delta\theta_{CI}$ may be set.

Moreover, based on a peak $\Delta P_{SI}$ of the heat generation rate in the advancing-side range and a peak $\Delta P_{CI}$ of the heat generation rate in the retarding-side range, SI ratio=$\Delta P_{SI}/(\Delta P_{SI}+\Delta P_{CI})$ or SI ratio=$\Delta P_{SI}/\Delta P_{CI}$ may be set.

Furthermore, based on a slope $\varphi_{SI}$ of the heat generation rate in the advancing-side range and a slope $\varphi_{CI}$ of the heat generation rate in the retarding-side range, SI ratio=$\varphi_{SI}/(\varphi_{SI}+\varphi_{CI})$ or SI ratio=$\varphi_{SI}/\varphi_{CI}$ may be set.

Additionally, in this embodiment, the SI ratio is defined by one of the area (i.e., the heat generation amount), length in the horizontal axis (i.e., the crank angle), length in the vertical axis (i.e., the heat generation rate), and the slope (i.e., the change rate in the heat generation rate) based on the waveform of the heat generation rate. Although not illustrated, the SI ratio may similarly be defined based on a waveform of pressure (P) in the combustion chamber 17, by one of the area, length in the horizontal axis, length in the vertical axis, and the slope.

In the SPCCI combustion, the flexion point of the combustion waveform regarding the heat generation rate or pressure does not necessarily appear clearly all the time. The following may be used as a definition of the SI ratio which is not based on the flexion point. That is, as indicated by a reference character 803 in the lower chart of FIG. 8, in the combustion waveform, the SI combustion may be applied for a range on the advancing side of CTDC and the CI combustion may be applied for a range on the retarding side of CTDC. Under this condition, the SI ratio may be defined by one of the area ($Q_{SI}$, $Q_{CI}$), length in the horizontal axis ($\Delta\theta_{SI}$, $\Delta\theta_{CI}$), length in the vertical axis ($\Delta P_{SI}$, $\Delta P_{CI}$) and the slope ($\varphi_{SI}$, $\varphi_{CI}$).

Alternatively, the SI ratio may be defined based on the fuel amount instead of the actual combustion waveform in the combustion chamber 17. As described later, within the medium load range in which the SPCCI combustion is performed, split injections including a first-stage injection and a second-stage injection may be performed. The fuel injected into the combustion chamber 17 by the second-stage injection ignites within a short time after the injection, it reaches near the spark plug 25 without spreading inside the combustion chamber 17. Therefore, the fuel injected into the combustion chamber 17 by the second-stage injection combusts mainly in the SI combustion.

On the other hand, the fuel injected into the combustion chamber 17 by the first-stage injection combusts mainly in the CI combustion. Therefore, the SI ratio may be defined based on the fuel amount injected in the first-stage injection ($m_1$) and the fuel amount injected in the second-stage injection ($m_2$). In other words, SI ratio=$m_2/(m_1+m_2)$ or SI ratio=$m_2/m_1$ may be set.

(Stabilizing SPCCI Combustion)

In order to appropriately perform the SPCCI combustion, the SI combustion needs to be stabilized. The combustion which includes the CI combustion does not stabilize if the SI combustion is unstable.

One factor related to the stability of the SI combustion is a turbulent combustion rate. When the turbulent combustion rate is high, the SI combustion stabilizes. The turbulent combustion rate receives influences from the air-fuel ratio (or the excess air ratio k) of the mixture gas, the G/F of the mixture gas, the temperature and pressure in the combustion chamber, the turbulence kinetic energy in the combustion chamber, etc.

According to the study of the present inventors, it was confirmed that the SI combustion stabilizes when $\lambda$ of the mixture gas is 1.0±0.2, the range of G/F of the mixture gas is 18 to 30, the range of the required temperature $T_{IG}$ inside the combustion chamber at the ignition timing is 570 to 800K, the range of the required pressure $P_{IG}$ inside the combustion chamber at the ignition timing is 400 to 920 kPa, and the range of the turbulence kinetic energy in the combustion chamber is 17 to 40 m$^2$/m$^2$.

It was also confirmed that it is possible to extend the range of G/F of the mixture gas to 50 which is above 30, by stratifying the mixture gas inside the combustion chamber.

That is, the SI combustion in the SPCCI combustion is caused by the spark plug 25 igniting the mixture gas. The mixture gas near the spark plug 25 mainly combusts in the SI combustion. Therefore, the state of the fuel spray moving in the combustion chamber 17 is controlled by, for example, utilizing the swirl flow. In this manner, even if the range of G/F in the combustion chamber exceeds 30 at the ignition timing, the G/F of the mixture gas near the spark plug 25 is made relatively lower (stratified) than the mixture gas located away from the spark plug 25, such as between 14 and 22.

Thus, the SI combustion is stabilized even with the mixture gas diluted advantageously for improving the fuel efficiency, and the SPCCI combustion is appropriately performed.

<Operation Control of Engine in Load Direction>

By adopting the operating range map 700, the engine 1 switches between the SI combustion and the SPCCI combustion according to the operating state. Further, the engine 1 changes the SI ratio according to the operating state of the engine 1. Thus, the engine 1 is achieved in preventing the generation of combustion noise and improving the fuel efficiency.

Figure 9:
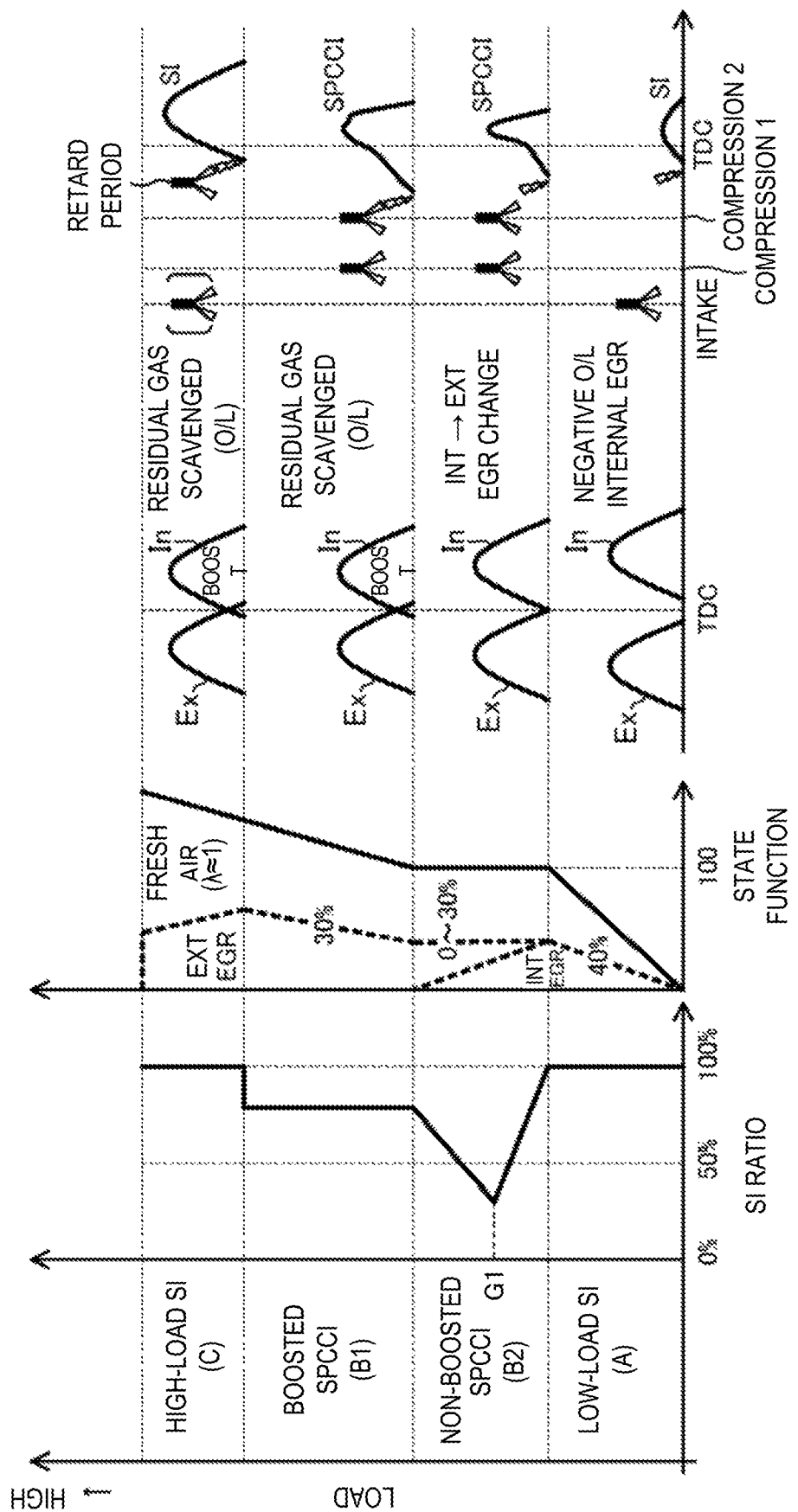
FIG. 9 is a chart illustrating a change in an SI ratio, a change in a state function inside a combustion chamber, a change in an overlap period between an intake valve and an exhaust valve, and changes in an injection timing and ignition timing of fuel, with respect to an engine load corresponding to the first operating range map.

FIG. 9 is a chart illustrating a change in the SI ratio, a change in the state function inside the combustion chamber 17, changes in the open periods of the intake valve 21 and the exhaust valve 22, and changes in the injection timing and ignition timing of the fuel, with respect to the engine load. Hereinafter, the operation control of the engine 1 is described for a condition in which the engine load gradually increases at a given engine speed.

(Low Load Range (Low-Load SI Combustion))

Within the low load range (A), the engine 1 performs the low-load SI combustion. When the operating state of the engine 1 is within the low load range (A), the SI ratio is constant at 100%.

Within the low load range (A), as described above, the G/F of the mixture gas is fixed between 18 and 50. The engine 1 introduces the fresh air and the burned gas by amounts corresponding to the fuel amount, into the combustion chamber 17. The introduction amount of fresh air, as described above, is changed by throttling and/or the mirror cycle. Since the dilution ratio is high, the temperature inside the combustion chamber 17 is raised to stabilize the SI combustion. Within the low load range (A), the engine 1 introduces the internal EGR gas into the combustion chamber 17.

The internal EGR gas is introduced into the combustion chamber 17 (i.e., the burned gas is confined inside the combustion chamber 17) by providing a negative overlap period in which the intake and exhaust valves 21 and 22 are both closed over the exhaust TDC. The change of the internal EGR gas amount is performed by suitably setting the length of the negative overlap period by the intake electrically-operated S-VT 23 changing the open timing of the intake valve 21 and the exhaust electrically-operated S-VT 24 changing the close timing of the exhaust valve 22.

Note that the internal EGR gas may be introduced into the combustion chamber 17 by providing a positive overlap period in which the intake and exhaust valves 21 and 22 are both opened.

That is, a period during which the open period of the intake valve 21 and the open period of the exhaust valve 22 overlap is provided. In this manner, high-temperature burned gas in the combustion chamber 17 partially flows into the intake port 18 communicating with the combustion chamber 17, by opening the intake valve 21. The burned gas flowed into the intake port 18 is introduced again into the combustion chamber 17 on the intake stroke. The amount of internal EGR gas is changeable by changing the length of the positive overlap period and the timing of the positive overlap period.

Note that the introduction of the internal EGR gas by setting the positive overlap period advances the open period of the intake valve 21 compared to the introduction of the internal EGR gas by setting the negative overlap period. Advancing the open period of the intake valve 21 increases the effective compression ratio and raise the temperature in the combustion chamber 17. Therefore, it becomes possible to set a low geometric compression ratio of the engine 1 while securing the stability of the SPCCI combustion corresponding to the temperature rise. Thus, the cooling loss, the mechanical loss, a pumping loss, etc. are achieved.

Further, the introduction of the internal EGR gas by setting the positive overlap period lowers the temperature of the combustion chamber more than when the internal EGR gas is introduced by setting the negative overlap period in which the high-temperature burned gas is confined as it is in the combustion chamber. As a result, the self-ignition in the SPCCI combustion is subsided and excessive CI combustion is prevented.

Within the low load range (A), the charge amount into the combustion chamber 17 is changed to be below 100%. The amount of fresh air introduced into the combustion chamber 17 and the amount of the internal EGR gas gradually increase as the fuel amount increases. The EGR ratio within the low load range (A) is, for example, 40%.

The injector 6 injects the fuel into the combustion chamber 17 on the intake stroke. Inside the combustion chamber 17, homogeneous mixture gas in which the excess air ratio $\lambda$ is 1.0±0.2 and the G/F is between 18 and 50 is formed. The excess air ratio $\lambda$ is preferably 1.0 to 1.2. By the spark plug 25 igniting the mixture gas at the given timing before CTDC, the mixture gas combusts by flame propagation without reaching the self-ignition.

(Second Medium Load Segment (Non-Boosted SPCCI Combustion))

When the engine load increases and the operating state enters the second medium load segment (B2), the engine 1 switches from the low-load SI combustion to the non-boosted SPCCI combustion. The SI ratio falls below 100%. The fuel amount increases as the engine load increases. When the engine load is low within the second medium load segment (B2), the ratio of the CI combustion is increased as the fuel amount increases. The SI ratio gradually decreases as the engine load increases. In the example of FIG. 9, the SI ratio decreases to a given load (lowest value) G1 lower than 50%.

Since the fuel amount increases, the combustion temperature rises within the second medium load segment (B2). If the temperature inside the combustion chamber 17 rises excessively, the heat generation at the start of the CI combustion becomes sharp, which results in increasing the combustion noise.

Therefore, within the second medium load segment (B2), the ratio between the internal EGR gas and the external EGR gas is changed according to the change in the engine load in order to change the temperature inside the combustion chamber 17 before the compression starts. That is, as the engine load increases, the internal EGR gas is gradually reduced and the cooled external EGR gas is gradually increased. Within the second medium load segment (B2), the negative overlap period changes from a longest length to zero as the engine load increases. Also within the second medium load segment (B2), the internal EGR gas becomes zero when the engine load reaches a highest value.

This is similar for when the positive overlap period between the intake and exhaust valves 21 and 22 is provided to introduce the internal EGR gas into the combustion chamber 17. As a result of adjusting the temperature inside the combustion chamber 17 by adjusting the overlap period, the SI ratio in the SPCCI combustion is adjusted.

Within the second medium load segment (B2), the opening of the EGR valve 54 is changed so that the external EGR gas increases as the engine load increases. The amount of external EGR gas introduced into the combustion chamber 17 is changed, when expressed by the EGR ratio, between 0 and 30%, for example. Within the second medium load segment (B2), the EGR gas is replaced from the internal EGR gas to the external EGR gas as the engine load increases. Since the temperature inside the combustion chamber 17 is also controlled by adjusting the EGR ratio, the SI ratio of the SPCCI combustion is changed.

Note that the EGR gas amount introduced into the combustion chamber 17 is continuous between the low load range (A) and the second medium load segment (B2). Within a low engine load section of the second medium load segment (B2), a large amount of the internal EGR gas is introduced into the combustion chamber 17 same as the low load range (A). Since the temperature inside the combustion chamber 17 becomes high, the mixture gas surely self-ignites when the engine load is low. Within a high engine load section of the second medium load segment (B2), the external EGR gas is introduced into the combustion chamber 17. Since the temperature inside the combustion chamber 17 decreases, the combustion noise accompanying the CI combustion is reduced when the engine load is high.

Within the second medium load segment (B2), the charge amount introduced into the combustion chamber 17 is set to 100%. The throttle valve 43 is fully opened. By changing the EGR gas amount which is a total of the internal EGR gas and the external EGR gas, the introduction amount of fresh air into the combustion chamber 17 is changed to the amount corresponding to the fuel amount.

As the ratio of the CI combustion in the non-boosted SPCCI combustion increases, the self-ignition timing is advanced. If the self-ignition timing is advanced than CTDC, the heat generation at the start of the CI combustion becomes sharp, which results in increasing the combustion noise. Therefore, in the engine 1, once the engine load reaches the given load G1, the SI ratio is gradually increased as the engine load further increases therefrom.

That is, the engine 1 increases the ratio of the SI combustion as the fuel amount increases. For example, as illustrated in the upper chart of FIG. 10, in the non-boosted SPCCI combustion, the ignition timing is gradually advanced as the fuel amount increases. Since the temperature inside the combustion chamber 17 is changed by reducing the introduction amount of the internal EGR gas and increasing the introduction amount of the external EGR gas as described above, the temperature rise at CTDC is suppressed even when the SI ratio is increased as the fuel amount increases. The slope of the heat generation rate of the SI combustion scarcely changes even when the engine load increases. Advancing the ignition timing causes the SI combustion to start earlier, and the heat generation amount of SI combustion accordingly increases.

As a result of suppressing the temperature rise inside the combustion chamber 17 caused by the SI combustion, the unburned mixture gas self-ignites at a timing after CTDC. The heat generation amount by the CI combustion is substantially the same even when the engine load increases, since the heat generation amount of the SI combustion is increased. Therefore, by setting the SI ratio to be gradually higher according to the increase in the engine load, the combustion noise is avoided from increasing. Note that the center of gravity of combustion in the non-boosted SPCCI combustion retards as the engine load increases.

Within the second medium load segment (B2), on the compression stroke, the injector 6 injects the fuel into the combustion chamber 17 in two stages, the first-stage injection and the second-stage injection. In the first-stage injection, the fuel is injected at a timing separated from the ignition timing, and in the second-stage injection, the fuel is injected at a timing close to the ignition timing.

(First Medium Load Segment (Boosted SPCCI Combustion))

When the engine load further increases and the operating state of the engine 1 enters the first medium load segment (B1), the booster 44 boosts the fresh air and the external EGR gas. The amount of fresh air introduced into the combustion chamber 17 and the amount of the external EGR gas both increase as the engine load increases. The amount of external EGR gas introduced into the combustion chamber 17 is, when expressed by the EGR ratio, 30%, for example. The EGR ratio is substantially constant regardless of the engine load. Therefore, the G/F of the mixture gas is also substantially constant regardless of the engine load. Note that the EGR gas amount introduced into the combustion chamber 17 is continuous between the second medium load segment (B2) and the first medium load segment (B1).

The SI ratio is fixed at a given value below 100% with respect to the engine load. When the SI ratio of the second medium load segment (B2), particularly the SI ratio which gradually increases as the engine load increases from a value above the given load G1 is compared with the SI ratio of the first medium load segment (B1), the SI ratio of the first medium load segment (B1) where the engine load is higher is higher than that of the second medium load segment (B2). The SI ratio is continuous over the boundary between the first medium load segment (B1) and the second medium load segment (B2).

Here, within the first medium load segment (B1), the SI ratio may slightly be changed according to the change of the engine load. The change rate of the SI ratio according to the engine load within the first medium load segment (B1) may be lower than that at a high engine load side of the second medium load segment (B2).

Figure 10:
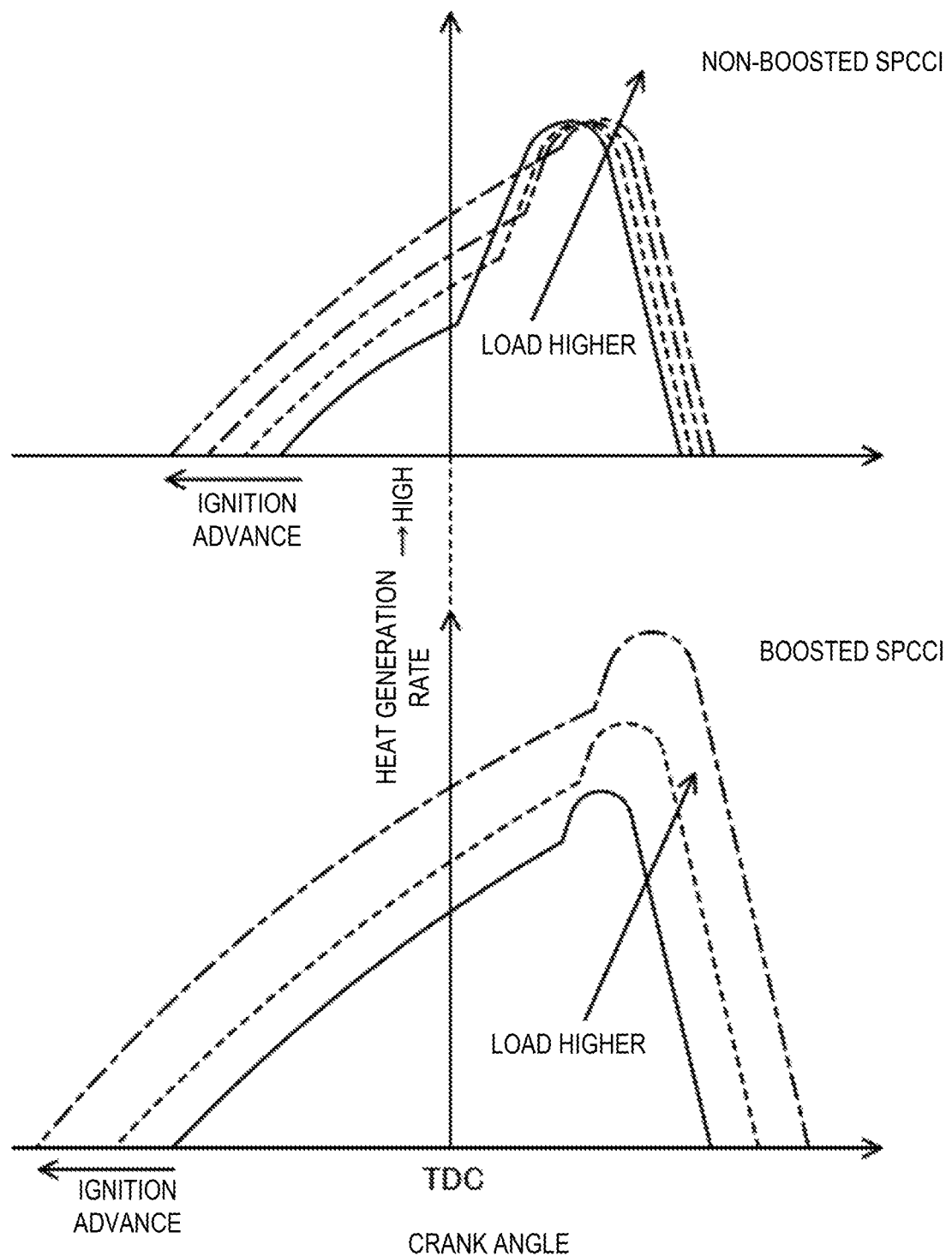
FIG. 10 shows charts in which the upper part illustrates a change in a combustion waveform according to an increase in the engine load in non-boosted SPCCI combustion, and the lower part illustrates a change in a combustion waveform according to an increase in the engine load in boosted SPCCI combustion.

As illustrated in the lower chart of FIG. 10, also in the boosted SPCCI combustion, the ignition timing is gradually advanced as the fuel amount increases. Since the fresh air and the EGR gas amount introduced into the combustion chamber 17 are increased by boosting as described above, the heat amount is large. Therefore, even when the fuel amount increases, the temperature increase inside the combustion chamber 17 caused by the SI combustion is suppressed. The waveform of the heat generation rate of the boosted SPCCI combustion becomes larger (the area of the section formed by the waveform and the horizontal axis becomes larger) in a similar shape as the engine load increases.

That is, the heat generation amount of the SI combustion increases while the slope of the heat generation rate of the SI combustion scarcely changes. The unburned mixture gas self-ignites at substantially the same timing after CTDC. The heat generation amount of the CI combustion increases as the engine load increases. As a result, within the first medium load segment (B1), since both the heat generation amount of the SI combustion and the heat generation amount of the CI combustion increase, the SI ratio is constant with respect to the engine load. Although the combustion noise increases when the peak of the heat generation of the CI combustion rises, since the engine load is relatively high within the first medium load segment (B1), a certain level of combustion noise is allowed. Note that the center of gravity of combustion in the boosted SPCCI combustion retards as the engine load increases.

Within the first medium load segment (B1), the overlap period in which the intake and exhaust valves 21 and 22 both open (positive overlap period) is provided over the exhaust TDC. The unburned gas residing in the combustion chamber 17 is scavenged by the boosting pressure. Thus, the temperature in the combustion chamber 17 drops, and as a result, abnormal combustion is prevented from occurring when the engine load is relatively high. Further, by dropping the temperature in the combustion chamber 17, within the range where the engine load is relatively high, the self-ignition timing is adjusted to a suitable timing and the SI ratio is maintained at a given SI ratio. Further, by scavenging the burned gas, the charge amount of fresh air in the combustion chamber 17 is increased.

Within the first medium load segment (B1), similarly to the second medium load segment (B2), the injector 6 injects the fuel into the combustion chamber 17 in two stages, the first-stage injection and the second-stage injection on the compression stroke. In the first-stage injection, the fuel is injected at the timing separated from the ignition timing, and in the second-stage injection, the fuel is injected at the timing close to the ignition timing. The first-stage injection may be performed in the period from the intake stroke to the early half of the compression stroke, and the second-stage injection may be performed in the period from the latter half of the compression stroke to the early half of the expansion stroke.

By the injector 6 performing the first-stage injection and the second-stage injection in these periods, in the combustion chamber 17, substantially homogeneous mixture gas in which the excess air ratio λ is 1.0±0.2 and the G/F is 18 to 30 is formed as a whole. Since the mixture gas is substantially homogeneous, the improvement in the fuel efficiency by reducing an unburned fuel loss and the improvement in the exhaust gas performance by avoiding the smoke generation are achieved. The excess air ratio λ is preferably 1.0 to 1.2.

By the spark plug 25 igniting the mixture gas at the given timing before CTDC, the mixture gas combusts by flame propagation. After this combustion starts, the unburned mixture gas self-ignites and causes the CI combustion. The fuel injected in the second-stage injection mainly causes the SI combustion. The fuel injected in the first-stage injection mainly causes the CI combustion. Since the first-stage injection is performed on the compression stroke, the fuel injected in the first-stage injection is prevented from causing abnormal combustion, such as the pre-ignition. Moreover, the fuel injected in the second-stage injection is stably combusted by flame propagation.

(High Load Range (High-Load SI Combustion))

When the engine load further increases and the operating state of the engine 1 enters the high load range (C), the engine 1 performs the high-load SI combustion. Therefore, the SI ratio within the high load range (C) becomes 100%.

The throttle valve 43 is fully opened. The booster 44 boosts the fresh air and the external EGR gas even within the high load range (C). The EGR valve 54, by changing its opening, gradually reduces the introduction amount of the external EGR gas as the engine load increases. In this manner, the fresh air introduced into the combustion chamber 17 increases as the engine load increases. Since the fuel amount is increased as the fresh air amount increases, it is advantageous in increasing the highest output of the engine 1. Note that the EGR gas amount introduced into the combustion chamber 17 is continuous between the first medium load segment (B1) and the high load range (C).

Also within the high load range (C), similarly to the first medium load segment (B1), the overlap period in which the intake and exhaust valves 21 and 22 are both opened is provided over the exhaust TDC. The unburned gas residing in the combustion chamber 17 is scavenged by the boosting pressure. Thus, the occurrence of abnormal combustion is prevented. Further, the charge amount of fresh air in the combustion chamber 17 is increased.

Within a low engine speed segment of the high load range (C) (i.e., the first high load segment (C1)), the injector 6 injects the fuel into the combustion chamber 17 in the retard period as described above. Within a high engine speed segment of the high load range (C) (i.e., the second high load segment (C2)), the injector 6 injects the fuel into the combustion chamber 17 on the intake stroke. Within either segment, substantially homogeneous mixture gas in which the excess air ratio λ is 1.0±0.2 and the G/F is 18 to 50 is formed inside the combustion chamber 17.

At the highest load, the excess air ratio λ is 0.8, for example. Moreover, the G/F of the mixture gas may be, for example, 17 at the highest load. By the spark plug 25 igniting the mixture gas at the given timing before CTDC, the mixture gas is combusted by flame propagation. Within the high load range (C), due to the high-pressure retard injection or the fuel injection on the intake stroke, the mixture gas causes the SI combustion without reaching the self-ignition.

<Operation Control of Engine in Speed Direction>
(Adjusting SI Ratio)

Figure 11:
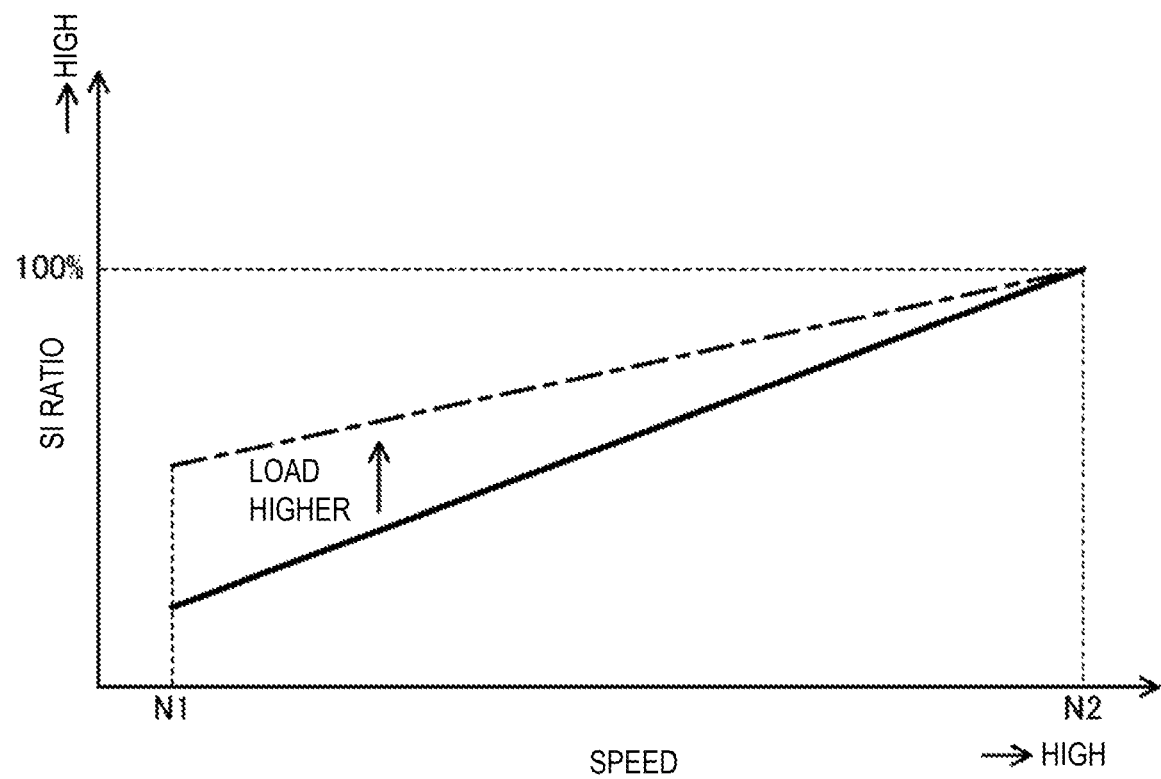
FIG. 11 is a chart illustrating one example of a relationship between an engine speed and the SI ratio within an operating range in which the SPCCI combustion of the engine corresponding to the first operating range map is performed.

FIG. 11 illustrates a relationship between the engine speed and the SI ratio at a given load within the medium load range (B) in which the SPCCI combustion is performed. As illustrated in the operating range map 700 of FIG. 7A, a speed N1 is a lowest speed within the medium load range (B). A speed N2 is a highest speed within the medium load range (B), located at a boundary with the high speed range (D) in which the SI combustion is performed (same in the description below).

The CI combustion is disadvantageous in that the combustion noise is louder than in the SI combustion. However, when the engine speed is low, NVH of the engine 1 is generally low. Therefore, at the low engine speed, even with the addition of the combustion noise of the CI combustion to NVH, NVH is kept lower than an allowable value. Therefore, at the low engine speed, the ECU 10 lowers the SI ratio and the CI combustion is sufficiently performed. Thus, at the low engine speed, the fuel efficiency is improved without NVH becoming a problem.

On the other hand, when the engine speed increases, NVH of the engine 1 also increases accordingly. Moreover, with the addition of the combustion noise of the CI combustion on top of the increased NVH, NVH may exceed the allowable value. Therefore, when the engine speed increases, the ECU 10 increases the SI ratio according to the speed increase.

As illustrated in FIG. 11, the ECU 10 of this configuration example linearly increases the SI ratio as the engine speed increases. Since the highest speed N2 is the boundary with the high speed range (D) in which only the SI combustion is performed, the SI ratio at the speed N2 is adjusted to 100%. Therefore, the transition between the medium load range (B), in which the SPCCI combustion is performed, and the high speed range (D), in which the SI combustion is performed, is smoothly performed without the combustion state greatly varying.

In other words, the ratio of the CI combustion is continuously reduced by adjusting the SI ratio according to the engine speed, and the engine load range in which the combustion by self-ignition is performed is extended as high as possible. As a result, in the engine 1, not only to the higher engine load side but also to the higher engine speed side, the operating range in which the combustion by self-ignition is performed may be extended while keeping NVH, which may become an issue, below the allowable value. Therefore, the engine 1 excels in fuel efficiency. Note that such adjustment of the SI ratio is achievable by a sophisticated control of the engine 1 executed by the ECU 10 (described later in detail).

When the engine load is high, the amount of fuel increases and the amount of heat which the combustion chamber 17 receives also increases, and therefore, the temperature of the combustion chamber 17 becomes relatively high. Thus, the SI combustion in the SPCCI combustion becomes sharper at the high engine load than the at low engine load. Therefore, when comparing at the same engine speed, the SI ratio is adjusted to be higher at a high engine load than at a low engine load. Therefore, as indicated by the one-dotted chain line in FIG. 11, the straight line indicating the change in the SI ratio with respect to the engine speed (SI ratio/engine speed) has a gentler slope as the engine load increases.

(Method of Increasing SI Ratio at High Engine Speed)

At a high engine speed, the combustion cycle is shorter than at a low engine speed. Since the amount of heat which an inner wall of the combustion chamber, etc. receives during combustion accordingly decreases, the temperature of the combustion chamber 17 drops compared to when the engine speed is low. It also becomes less likely for the mixture gas to receive heat from the combustion chamber 17. Additionally, the time length for the mixture gas to combust becomes short. At the high engine speed, the SI ratio needs to be increased under such a disadvantageous condition.

In this regard, by increasing the temperature of the mixture gas itself in the combustion chamber 17, the combustion is stimulated even under the condition in which the heat is not easily transferred from the combustion chamber 17.

Furthermore, the ignition of the CI combustion occurs after the SI combustion. Although increasing the temperature of the mixture gas stimulates both the SI combustion and the CI combustion, the combustion duration is short when the engine speed is high. Thus, the SI combustion becomes sharper and is stimulated than the CI combustion, which starts later than the SI combustion. Therefore, by increasing the temperature of the mixture gas, the SI ratio is increased when the engine speed is high.

(First Method)

Therefore, in the engine 1, in order to change the SI ratio according to the change in the engine speed, the internal EGR ratio is adjusted within the medium load range (B) in which the SPCCI combustion is performed.

For example, the ECU 10 outputs a control signal to the intake electrically-operated S-VT 23 and/or the exhaust electrically-operated S-VT 24, respectively, to change the open timing of the intake valve 21 and/or the exhaust valve 22. In this manner, the negative overlap period is provided, the length of the period is changed, and the high-temperature burned gas (internal EGR gas) introduced into the combustion chamber 17 is set to a given amount. Thus, an internal EGR ratio, specifically "a mass ratio (%) of the internal EGR gas with respect to the total gas within the combustion chamber 17," is changed.

As illustrated in FIG. 7A, in the engine 1 adopting the operating range map 700, the medium load range (B) is divided into the first medium load segment (B1) located on the higher engine load side, and the second medium load segment (B2) located on the lower engine load side. Within the first medium load segment (B1), while corresponding to the high engine load, since the operating range in which the SPCCI combustion is performed is extended to the higher load side, the boosting is performed, whereas, within the second medium load segment (B2), the boosting is not performed.

In this engine 1, within the first medium load segment (B1) in which the boosting is performed, since the positive overlap period is provided, even when the internal EGR gas is introduced, it is scavenged by the boosting pressure. Therefore, within the first medium load segment (B1), since it is difficult to change the internal EGR ratio, the first method is not adopted. Within the second medium load segment (B2), the ECU 10 outputs the control signal to the intake electrically-operated S-VT 23 etc. so that the internal EGR ratio becomes higher at a high engine load than at a low engine load.

Figure 12A:
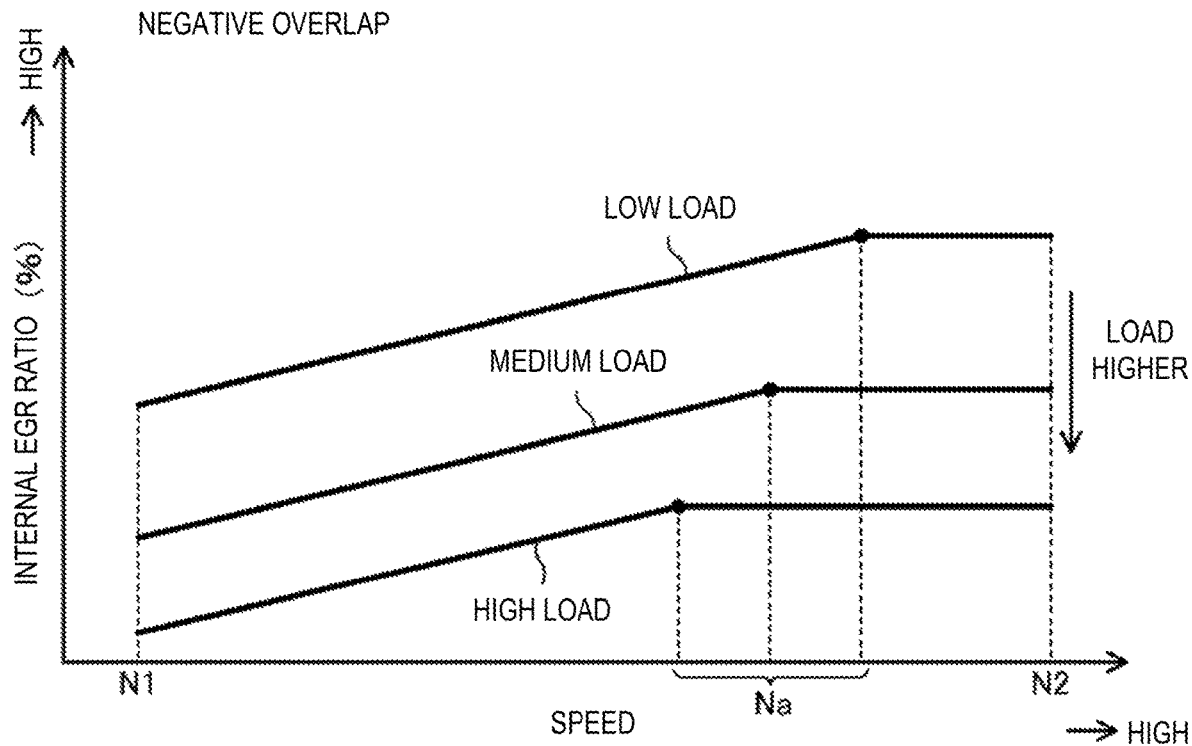
Figure 12B:
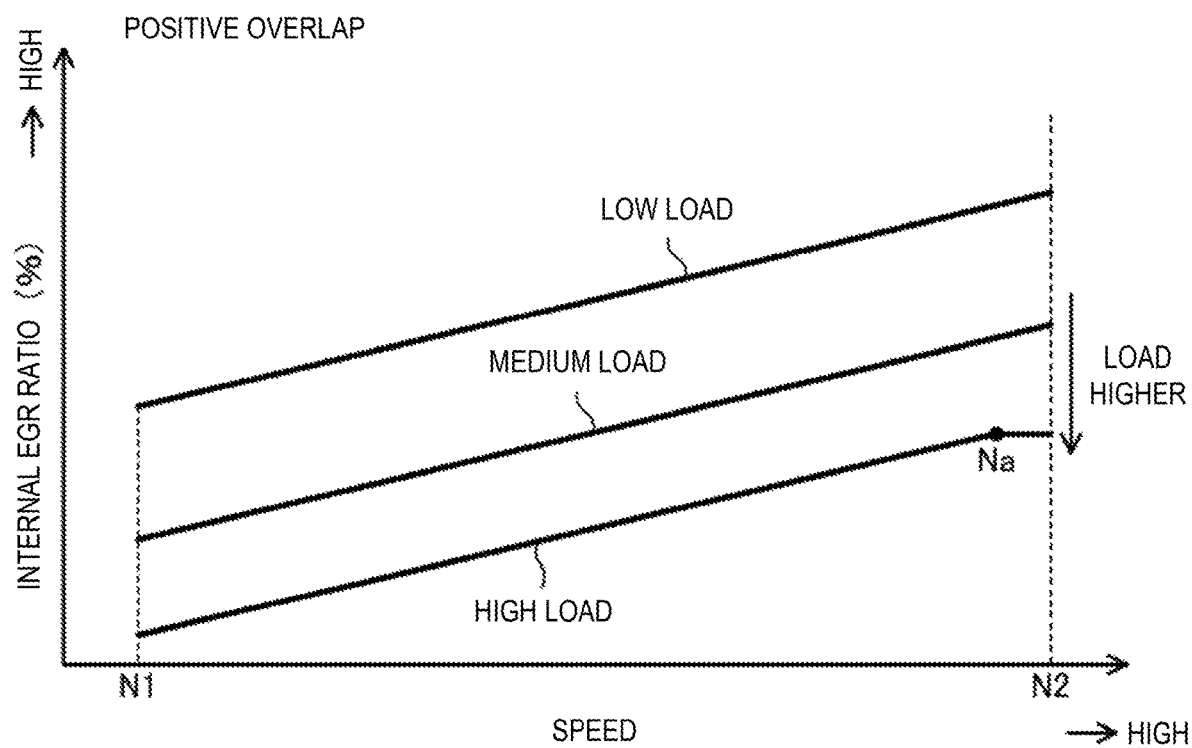

FIG. 12A illustrates a relationship between the engine speed and the internal EGR ratio (internal EGR ratio/engine speed) at given loads within the second medium load segment (B2). The ECU 10 linearly increases the internal EGR ratio as the engine speed increases from the speed N1 which is the lowest speed. As a result, the temperature of the mixture gas in the combustion chamber 17 rises, and therefore, even when the amount of heat received from the combustion chamber 17 is small and the combustion duration is short, the SI combustion becomes sharp and the SI ratio increases. Since the ratio of the CI combustion decreases as the SI ratio increases, the combustion noise caused by the SPCCI combustion is reduced. When the engine speed is high, NVH is suppressed below the allowable value. Note that the relationship between the engine speed and the internal EGR ratio illustrated in FIGS. 12A and 12B are examples, and the change rate is suitably changeable according to the specifications.

As illustrated in FIG. 12A, when the engine speed exceeds a given speed (limitation starting speed Na), the increase in the internal EGR ratio is limited. For example, in order to change the internal EGR ratio according to the change in the engine speed, the memory 102 of the ECU 10 stores a given map, and the limitation starting speed Na is set in the map. When the engine speed exceeds the limitation starting speed Na, the ECU 10 outputs the control signal to the intake electrically-operated S-VT 23, etc. so as to limit the increase in the internal EGR ratio.

Note that the limitation starting speed Na is at least set higher than a middle value of the range of the engine speed (between the speed N1 and the speed N2) within the medium load range (B). Particularly, when the range of the engine speed within the medium load range (B) is evenly divided into three segments, the speed Na is preferably set within the high-speed segment.

In this configuration example, the internal EGR ratio reaches its peak once exceeding the limitation starting speed Na and is kept substantially constant (depending on the specifications, the value may slightly vary). If the internal EGR ratio increases and the temperature of the mixture gas excessively rises, the CI combustion also becomes sharp and the combustion noise increases, which may cause NVH above the allowable value. Therefore, the ECU 10 sets the limitation starting speed Na lower than the value which may cause such a situation, so as to suppress NVH below the allowable value.

When the engine load is high, the fuel amount increases and the heat reception amount of the combustion chamber 17 also increases, and therefore, the temperature of the combustion chamber 17 relatively rises. Thus, the temperature of the mixture gas becomes higher and the SI combustion in the SPCCI combustion becomes sharp at a high engine load than at a low engine load. For this reason, the ECU 10 changes the internal EGR ratio to be lower over the entire engine speed range as the engine load increases.

Further here, the limitation starting speed Na is set lower as the engine load increases. Since the temperature of the mixture gas tends to increase excessively as the engine load increases, by setting the limitation starting speed Na lower as the engine load increases, NVH is more reliably prevented from exceeding the allowable value.

FIG. 12A illustrates a relationship between the engine speed and the internal EGR ratio in the case of introducing the internal EGR gas by setting the negative overlap period (also referred to as "NVO setting"). FIG. 12B illustrates a relationship between the engine speed and the internal EGR ratio in the case of introducing the internal EGR gas by setting the positive overlap period (also referred to as "PVO setting").

In the introduction of the internal EGR gas by the PVO setting, unlike the introduction of the internal EGR gas by the NVO setting, which confines the high-temperature burned gas as it is in the combustion chamber 17, the high-temperature burned gas flows out to the intake port 18 once and is introduced into the combustion chamber 17 again. The high-temperature burned gas introduced into the combustion chamber 17, that is, the internal EGR gas, is cooled by flowing out to the intake port 18 where the temperature is low.

Therefore, when the internal EGR gas is introduced by the PVO setting, compared to the introduction of the internal EGR gas by the NVO setting, the temperature of the combustion chamber 17 becomes relatively lower. Thus, even if the internal EGR ratio increases, the temperature of the mixture gas does not easily rise excessively. As a result, the setting of the limitation starting speed Na becomes unnecessary or even if it is needed, it is set sufficiently higher than when the NVO is set.

Therefore, in the introduction of the internal EGR gas by the PVO setting, the internal EGR ratio continuously increases without any limitation until reaching the highest speed N2. Although the limitation starting speed Na is set close to the highest speed N2 at a high engine load illustrated in FIG. 12B, the setting of the limitation starting speed Na may be unnecessary even at the high engine load. There may also be a case where the setting of the limitation starting speed Na is necessary at a low engine load or a medium engine load. Note that also in this case, the limitation starting speed Na is set closer to the highest speed N2 compared to the introduction of the internal EGR gas by the NVO setting.

Note that in the engine 1 adopting one of an operating range map 701 and an operating range map 702 described later, a swirl flow having a strength higher than a given strength is formed in the combustion chamber 17. With such a swirl flow formed in the combustion chamber 17, the mixture gas in the combustion chamber 17 is stratified by the flow. Thus, the mixture gas near the spark plug 25 is made suitable for the SI combustion, and as a result, the stable SPCCI combustion is achieved.

Therefore, in this case, even if the internal EGR ratio is increased at a high engine speed in order to secure the high SI ratio, by stratifying the mixture gas, the EGR gas near the spark plug 25 is reduced. Thus, the stability of the ignition in the SI combustion is secured and stable SPCCI combustion is achieved.

(Second Method)

By the first method alone, in the medium load range (B) in which the SPCCI combustion is performed, the operating range in which the combustion is by self-ignition is extended to the higher engine speed side only for the second medium load segment (B2). Therefore, in this engine 1, also within the first medium load segment (B1), similar to the second medium load segment (B2), the second method is adopted so that the temperature of the mixture gas itself in the combustion chamber 17 is changed higher as the engine load increases.

That is, this engine 1 changes the external EGR ratio within the medium load range (B) in which the SPCCI combustion is performed, so as to change the SI ratio according to the change in the engine speed.

For example, the introduction amount of the cooled burned gas (external EGR gas) at a lower temperature than the internal EGR gas is changed by changing the opening of the EGR valve 54, and thus, the external EGR ratio, specifically "a mass ratio (%) of the external EGR gas with respect to the total gas within the combustion chamber 17" is changed.

The ECU 10 outputs the control signal to the EGR valve 54 so that the external EGR ratio decreases lower at a low engine speed than a high engine speed. The external EGR gas has a lower temperature than the mixture gas in the combustion chamber 17. Thus, when the introduction amount of the external EGR gas is large, the temperature of the mixture gas drops accordingly. Therefore, by reducing the external EGR ratio, the temperature of the mixture gas itself in the combustion chamber 17 is changed higher.

As illustrated in FIG. 7A, the external EGR gas is introduced within both the first medium load segment (B1) and the second medium load segment (B2), and the amount of the external EGR gas is large particularly within the first medium load segment (B1). Therefore, the second method is effective within the first medium load segment (B1), and by combining the first method, the SI ratio is effectively adjusted to be high according to the change in the engine speed over the entire medium load range (B).

Figure 13A:
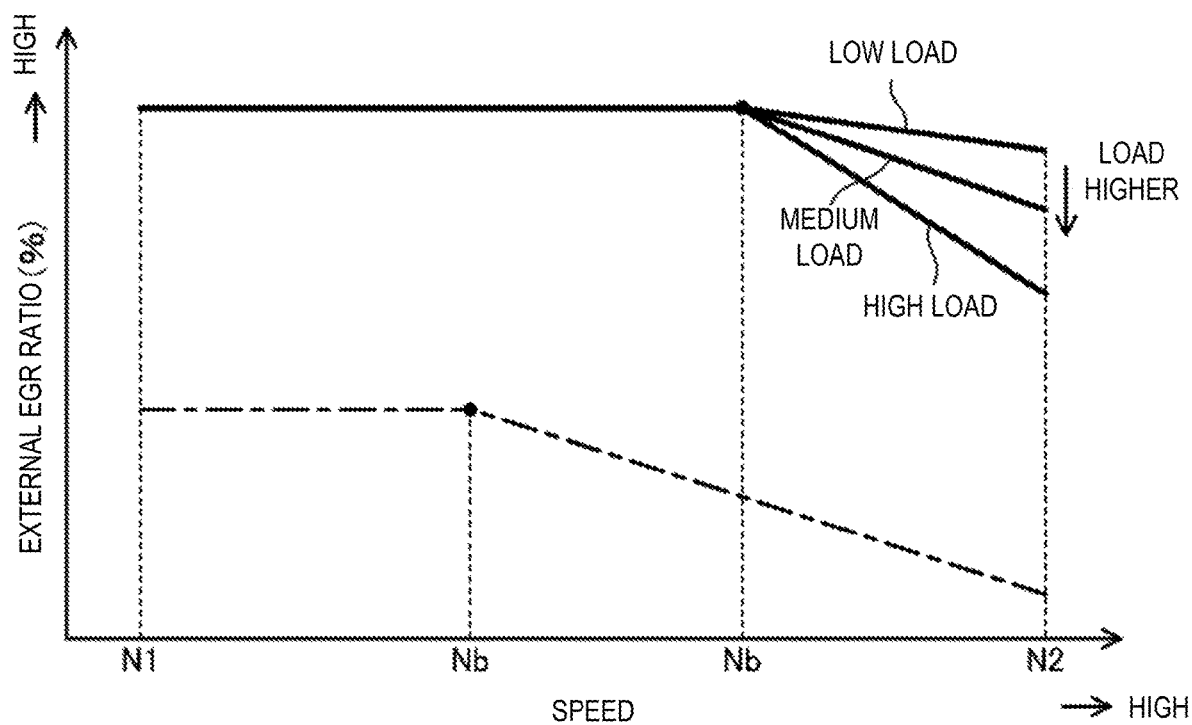

FIG. 13A illustrates a relationship between the engine speed and the external EGR ratio (external EGR ratio/engine speed) at given loads within the medium load range (B). The solid line indicates the relationship within the first medium load segment (B1), and the one-dotted dashed line indicates the relationship within the second medium load segment (B2).

As described above, in the engine 1 adopting the operating range map 700, the SCV 56 is substantially fully opened in each operating range including the medium load range (B) in which the SPCCI combustion is performed. FIG. 13A illustrates such a relationship as described above in the case where substantially no swirl flow is generated in the combustion chamber 17 or the flow is weak even if it is generated.

The ECU 10 keeps the external EGR ratio substantially fixed until the engine speed reaches a given speed (decrease starting speed Nb) from the lowest speed N1. In this manner, a high EGR ratio (external EGR ratio) is set at a low engine speed, therefore, even if the value of G/F of the mixture gas which needs to be secured is high, it may be settled within an appropriate range. Since the dilution ratio of the mixture gas is kept high, the fuel efficiency improves.

Then, once exceeding the decrease starting speed Nb, the ECU 10 reduces the external EGR ratio according to the engine load. For example, in order to change the external EGR ratio according to the change in the engine speed, the memory 102 of the ECU 10 stores a given map, and in the map, the decrease starting speed Nb is set in advance.

The decrease starting speed Nb also, similarly to the limitation starting speed Na, is at least set higher than a middle value of the range of the engine speed within the medium load range (B). Particularly, when the range of the engine speed within the medium load range (B) is evenly divided into three segments, the decrease starting speed Nb is preferably set the same as the limitation starting speed Na.

Based on the map, the ECU 10 outputs the control signal to the EGR valve 54 so that the external EGR ratio starts to decrease according to the engine load once exceeding the decrease starting speed Nb. Note that when the engine load is low, the value of the external EGR ratio may be kept as it is even when exceeded the decrease starting speed Nb.

Figure 13B:
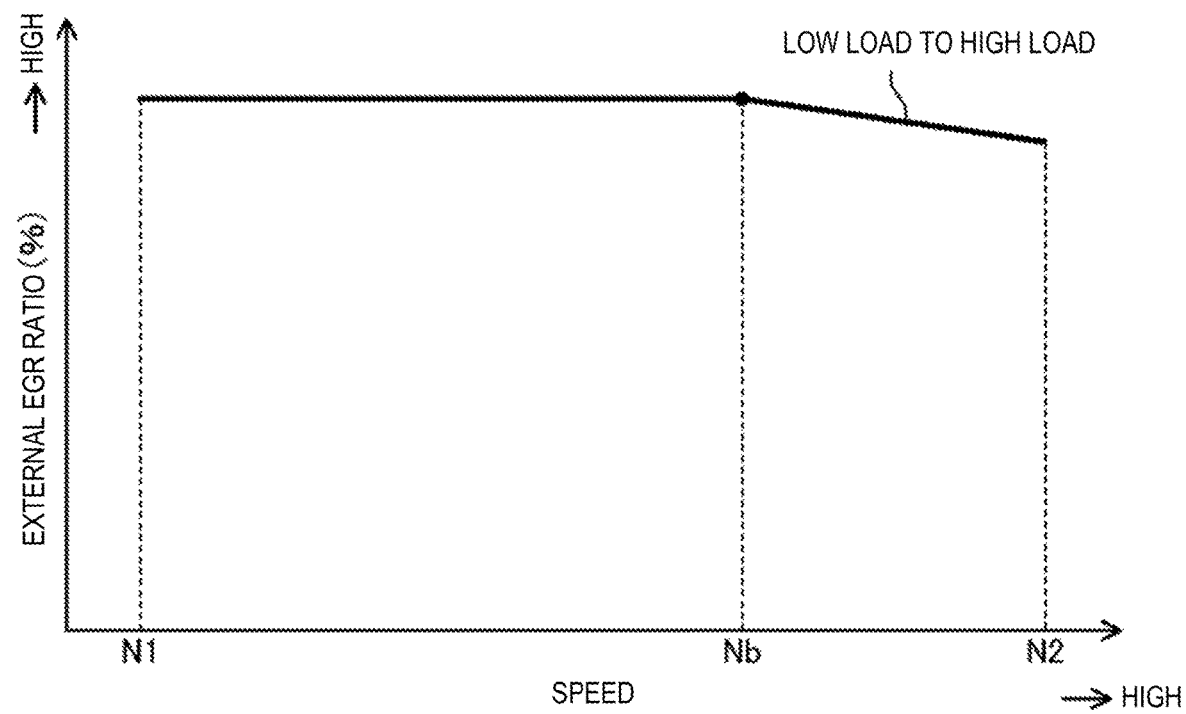

Thus, in a higher speed range at or above the decrease starting speed Nb, the ratio of the external EGR gas introduced into the combustion chamber 17 decreases, and the temperature of the mixture gas itself rises. Therefore, even if the heat reception amount from the combustion chamber 17 is small and the combustion duration is shortened, the SI combustion becomes sharp and the SI ratio increases. Since the CI combustion decreases as the SI ratio increases, the combustion noise generated by the SPCCI combustion is reduced. When the engine speed is high, NVH is suppressed below the allowable value. Note that the relationship between the engine speed and the external EGR ratio illustrated in FIGS. 13A and 13B are examples, and the change rate thereof is suitably changeable according to the specifications.

Here, the ECU 10 outputs the control signal to the EGR valve 54 so that the external EGR ratio decreases sharper (the decrease rate increases) as the engine load increases.

When the engine load increases, the fuel amount increases accordingly. If the amount of burned gas is excessively large with respect to the increasing fuel, the combustion by spark-ignition, that is, the SI combustion in the SPCCI combustion, becomes unstable and the SI ratio may decrease. Therefore, the decrease rate of the external EGR ratio is increased as the engine load increases to stabilize the ignition, a high SI ratio is maintained.

The ECU 10 changes the external EGR ratio also within the second medium load segment (B2) similarly to the first medium load segment (B1). In this configuration example, the EGR gas introduced within the first medium load segment (B1) only contains the external EGR gas, while the internal EGR gas is also introduced within the second medium load segment (B2). Therefore, within the second medium load segment (B2), the external EGR ratio is changed in consideration of the state function inside the combustion chamber 17, such as the G/F of the mixture gas due to the relationship with the introduction amount of the internal EGR gas. As a result, the external EGR ratio within the second medium load segment (B2) decreases relatively lower than and completely different from that within the first medium load segment (B1).

In the engine 1 adopting one of the operating range map 701 and the operating range map 702 described later, different from the engine 1 adopting the operating range map 700, a swirl flow stronger than a given strength is formed in the combustion chamber 17. FIG. 13B illustrates the relationship described above in such an engine 1.

By forming the swirl flow stronger than the given strength inside the combustion chamber 17, the fluidity of the mixture gas in the combustion chamber 17 is enhanced. Thus, even when the amount of EGR gas is large, the amount of EGR gas around the spark plug 25 is reduced when the ignition is performed. Therefore, even if the engine load increases and the fuel amount increases, the stability of the combustion by ignition is secured, and therefore, the SI combustion in the SPCCI combustion is stably performed.

Thus, as illustrated in FIG. 13B, the ECU 10 outputs the control signal to the EGR valve 54 so that the decrease rate of the external EGR ratio is kept substantially constant with respect to the change in the engine load. Even when the engine load increases, the ECU 10 reduces the external EGR ratio in the same state as when the engine load is low.

(Third Method)

In the method of increasing the temperature of the mixture gas as in the first and second methods, if the temperature rises excessively, the CI combustion becomes sharp and the combustion noise increases, which may cause NVH to exceed the allowable value. Further, since the internal EGR ratio and the external EGR ratio are restricted by other state function, such as the G/F of the mixture gas, simply changing the internal EGR ratio and the external EGR ratio limits the effect of reducing the combustion noise in the SPCCI combustion, and the effect may not be obtained sufficiently.

Particularly in the first method, the increase in the internal EGR ratio is limited within the range above the limitation starting speed Na. Also in the second method, if the external EGR ratio is excessively reduced within the range above the decrease starting speed Nb, the temperature of the mixture gas becomes excessively high and the combustion noise increases, which may cause NVH to exceed the allowable value, and therefore, the decrease rate is limited. Therefore, within the ranges above the limitation starting speed Na and the decrease starting speed Nb, the SI ratio may not increase to a desired SI ratio. In this case, the effect of reducing the combustion noise is limited, and a sufficient effect cannot be obtained.

Therefore, in this engine 1, another method different from the method of increasing the temperature of the mixture gas is used so that the SI ratio is also increased thereby.

That is, in conjunction with the first or second method, the ECU 10 uses a third method in which the SCV 56 is controlled to strengthen the flow of the intake air. If the intake air flow is strengthened, the SI ratio increases because the SI combustion becomes sharp. As a result, the combustion noise of the SPCCI combustion is reduced.

Figure 14A:
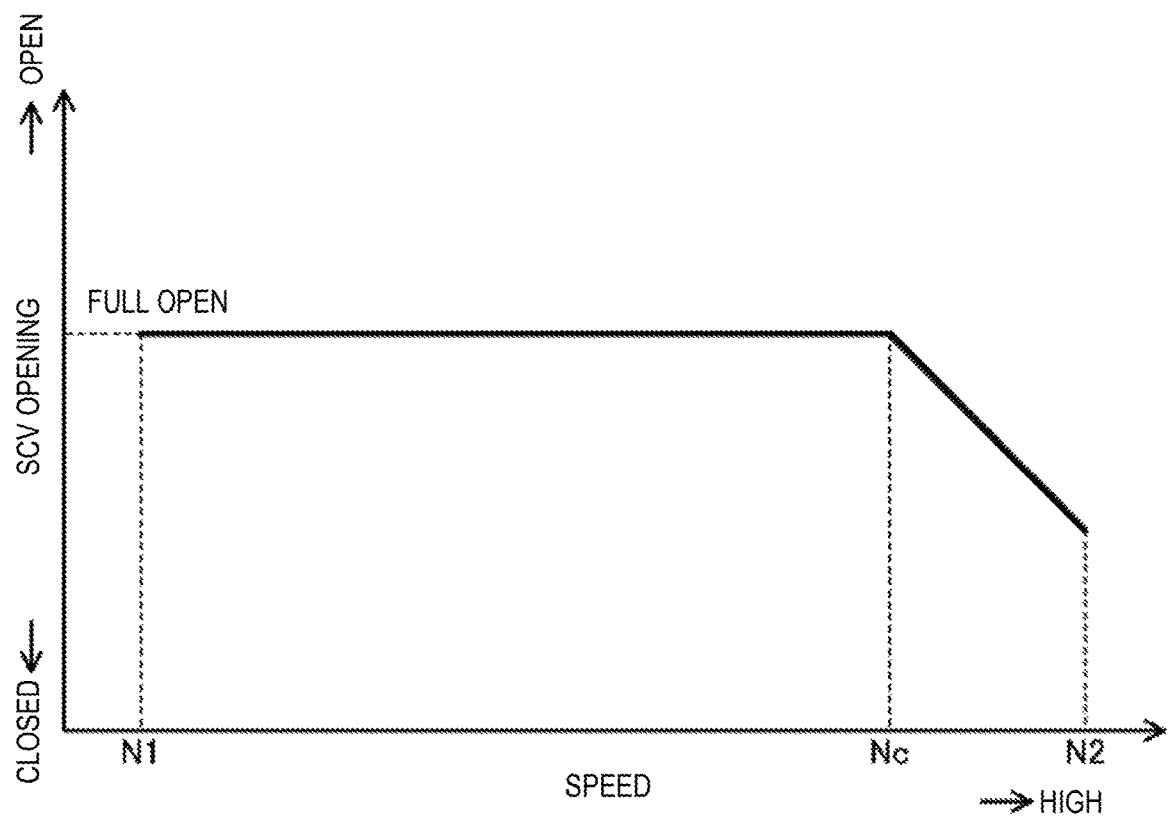

FIG. 14A illustrates a relationship between the speed of the engine 1 adopting the operating range map 700 and the SCV 56. As described above, in the engine 1 adopting the operating range map 700, the SCV 56 is substantially fully opened in each operating range including the medium load range (B) in which the SPCCI combustion is performed. FIG. 14A illustrates the above relationship in such a case. On the other hand, FIG. 14B illustrates the above relationship of the engine 1 adopting an operating range map 701 of FIG. 7B and the engine 1 adopting an operating range map 702 of FIG. 7C.

As illustrated in FIG. 14A, in the engine 1 adopting the operating range map 700, when the engine speed reaches a given speed (operation starting speed Nc) at which the adjustment to the desired SI ratio becomes difficult by the first or second method alone, such as the limitation starting speed Na at which the limitation of the internal EGR ratio is started, the decrease starting speed Nb at which the decrease of the external EGR ratio is started, the ECU 10 outputs the control signal to the SCV 56 to narrow its opening from the substantially full opened state. Thus, the swirl flow in the combustion chamber 17 becomes strong. The ECU 10 linearly reduces the opening of the SCV 56 as the engine speed increases. As the engine speed increases, since the swirl flow becomes stronger, the SI combustion becomes even sharper.

As a result, in the first or second method, even within the higher engine speed range where the limitation is applied, the combustion noise of the SPCCI combustion is reduced. As a result, when the engine speed is high, NVH is suppressed below the allowable value. By combining the first or second method with the third method, the SI ratio is changed higher and more suitably.

Figure 14B:
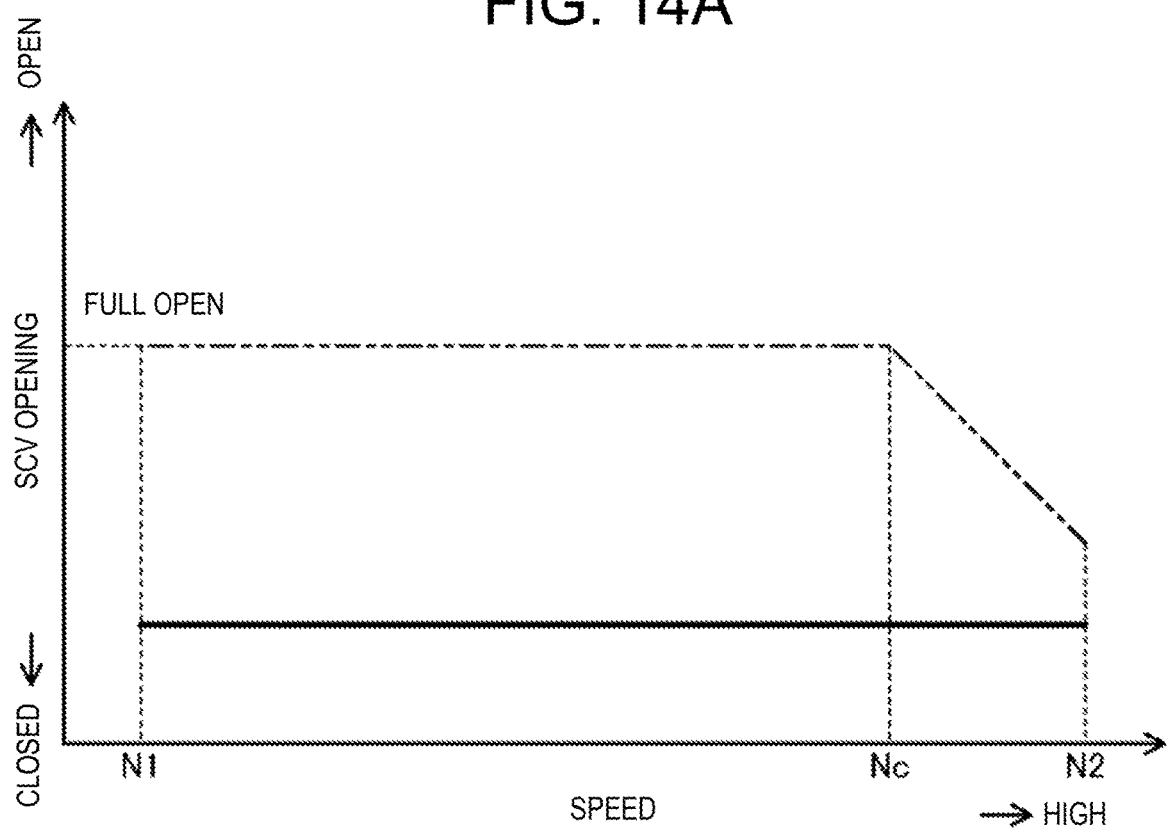

On the other hand, as illustrated in FIG. 14B, in the engine 1 adopting the operating range map 701 and the engine 1 adopting the operating range map 702 described later, the swirl flow stronger than the given strength is formed in the combustion chamber 17 within the range in which the SPCCI combustion is performed.

For example, at the timing of reaching the ignition from the intake stroke, the SCV 56 is controlled at a given narrow opening without being fully closed so that the swirl ratio becomes a range between 1.5 to 3. The opening of the SCV 56 or the swirl ratio is suitably set according to the specifications of the engine 1. FIG. 14B illustrates the case where the SCV 56 is kept substantially constant at approximately 30% with respect to the engine speed.

When the SPCCI combustion is performed, by forming such a swirl flow in the combustion chamber 17, the fluidity in the combustion chamber 17 is enhanced, and stratified mixture gas is formed in the combustion chamber 17. Thus, the stable SPCCI combustion is achieved within a wide operating range of the engine 1. Details will be described later.

(Fourth Method)

In the engine 1 adopting the operating range map 700, the SI ratio is increased to the higher speed side also by changing the ignition timing.

Figure 15:
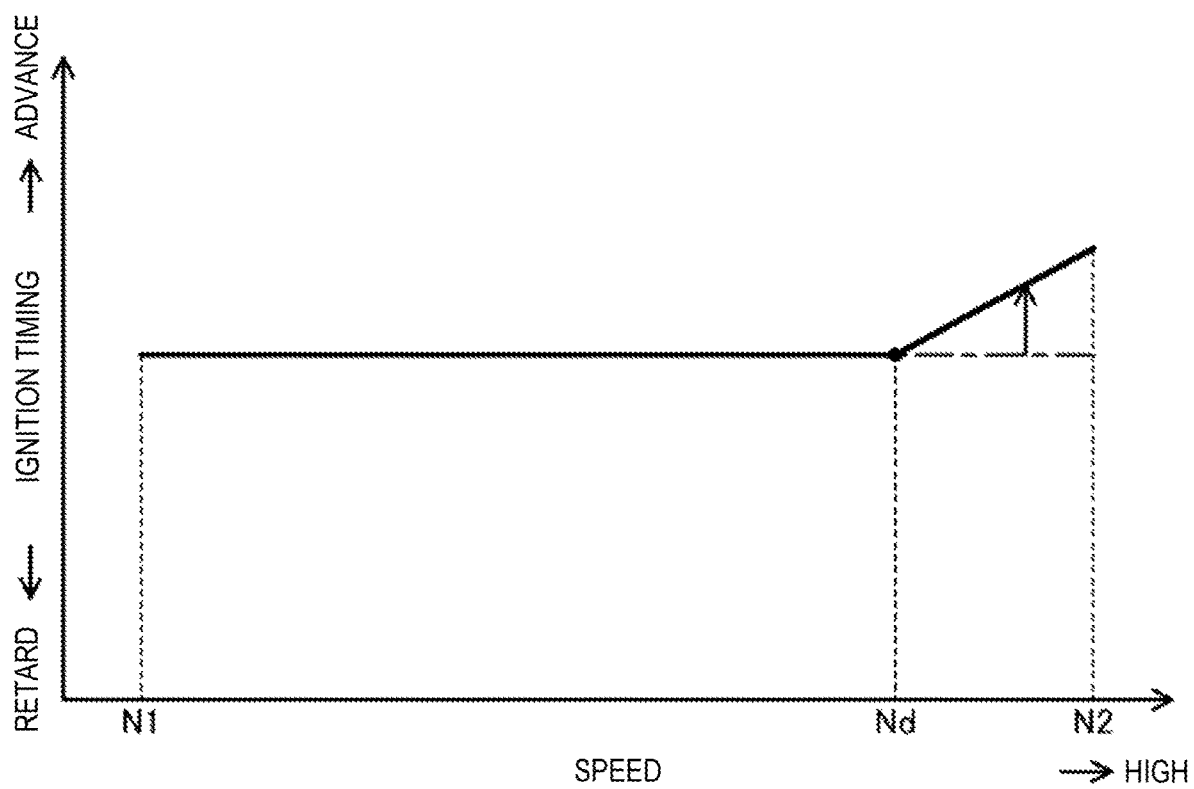
FIG. 15 is a chart illustrating one example of a relationship between the engine speed and the ignition timing within the operating range in which the SPCCI combustion of the engine corresponding to the first operating range map is performed.

FIG. 15 illustrates a relationship between the engine speed and the ignition timing at a given load within the medium load range (B) in which the SPCCI combustion is performed. Similar to the third method, when the engine speed reaches a given speed (advance starting speed Nd) at which the adjustment to the desired SI ratio becomes difficult by only the first or second method, such as the limitation starting speed Na at which the limitation of the internal EGR ratio is started, the decrease starting speed Nb at which the decrease of the external EGR ratio is started, the ECU 10 outputs the control signal to the spark plug 25 to advance the ignition timing. Thus, the start of the SI combustion is advanced and the SI combustion becomes sharp. The ECU 10 linearly advances the ignition timing as the engine speed increases. The SI combustion becomes even sharper as the engine speed increases.

The fourth method may replace the third method. The fourth method may be used together with the third method. By suitably combining the first to fourth methods, the adjustment to the stable SI ratio becomes possible even at a high engine speed.

(Changing SI Ratio)

Figure 16:
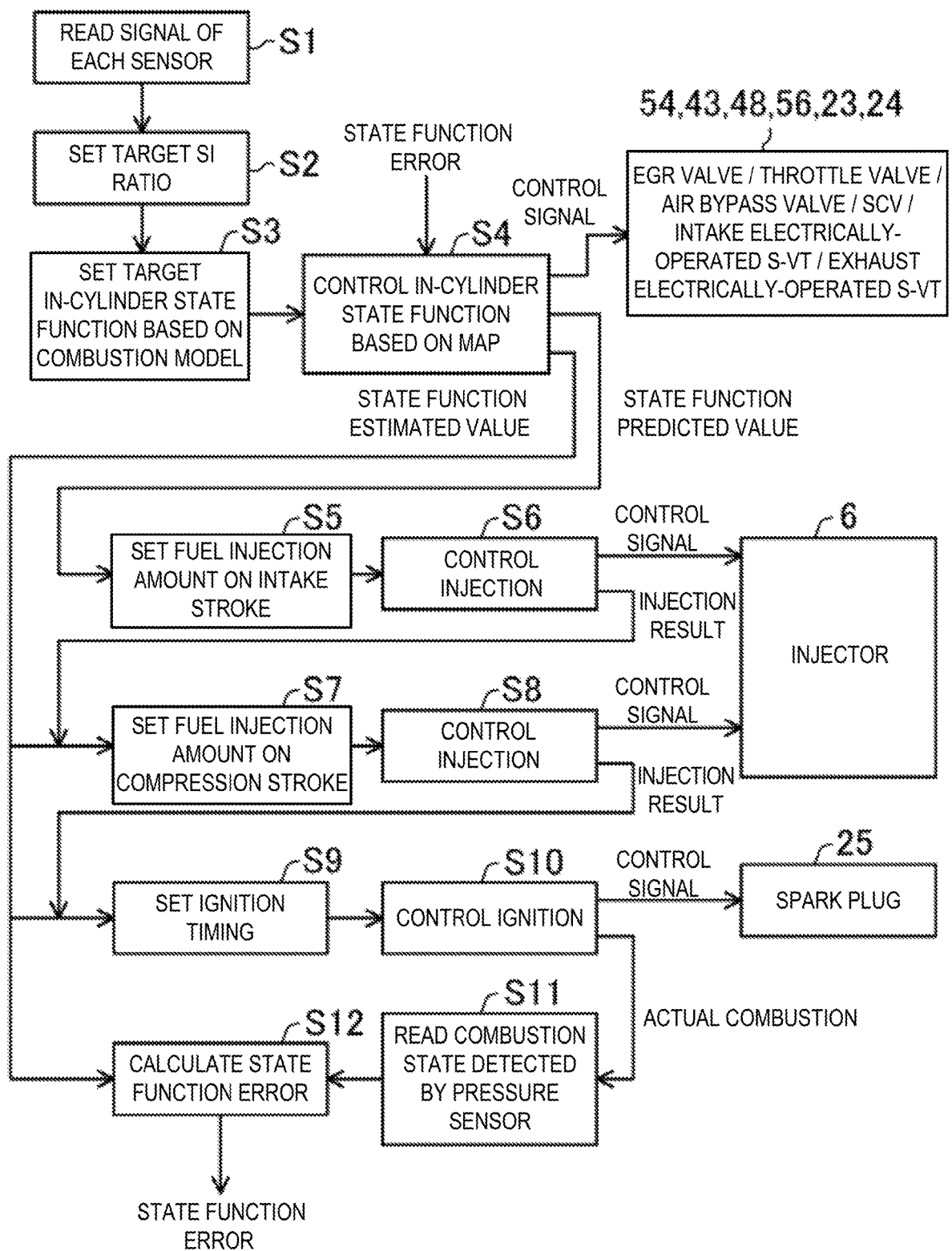
FIG. 16 is a flowchart illustrating a flow of a control of the engine executed by an ECU.

FIG. 16 illustrates a process relating to the operation control of the engine 1 executed by the ECU 10. Based on the detection signals from the sensors SW1 to SW16, the ECU 10 determines the operating state of the engine 1, and also changes the state function inside the combustion chamber 17, the injection amount, the injection timing, and the ignition timing so that the combustion in the combustion chamber 17 is of the SI ratio corresponding to the operating state.

The ECU 10 further adjusts the SI ratio by the SI ratio changing module 102a when its change is determined to be needed, based on the detection signals from the sensors.

First at S1, the ECU reads the detection signals of the sensors SW1 to SW16. Next at S2, the ECU 10 determines the operating state of the engine 1 based on the detection signals and sets the target SI ratio which is as illustrated in FIG. 9 or 11.

Next at S3, the ECU 10 sets a target in-cylinder state function for achieving the set target SI ratio, based on a preset combustion model. For example, the target temperature, the target pressure, and the target state function in the combustion chamber 17 are set. At S4, the ECU 10 sets the opening of the EGR valve 54, the opening of the throttle valve 43, the opening of the air bypass valve 48, the phase angles of the intake electrically-operated S-VT 23 and the exhaust electrically-operated S-VT 24, and the opening of the SCV 56, which are required for achieving the target in-cylinder state function.

The ECU 10 sets the control amounts of these devices in advance based on a map stored in the ECU 10. Based on the set control amounts, the ECU 10 outputs control signals to the EGR valve 54, the throttle valve 43, the air bypass valve 48, the intake electrically-operated S-VT 23, the exhaust electrically-operated S-VT 24, and the SCV 56. As each device operates based on the control signal from the ECU 10, the state function in the combustion chamber 17 becomes the target state function.

The ECU 10 further calculates a predicted value and an estimated value of the state function in the combustion chamber 17 based on the set control amount of each device. The state function predicted value is obtained by predicting the state function in the combustion chamber 17 before the intake valve 21 is closed, and is used for setting the fuel injection amount on the intake stroke as described later. The state function estimated value is obtained by estimating the state function in the combustion chamber 17 after the intake valve 21 is closed, and is used for setting of the fuel injection amount and the ignition timing on the compression stroke as described later. The state function estimated value is also used for calculating a state function error based on comparison with an actual combustion state as described later.

At S5, the ECU 10 sets the fuel injection amount on the intake stroke based on the state function predicted value. Note that in a case where the fuel injection is not performed on the intake stroke, the fuel injection amount is zero. At S6, the ECU 10 controls the injection of the injector 6. That is, the ECU 10 outputs a control signal to the injector 6 to inject the fuel into the combustion chamber 17 at a given injection timing.

At S7, the ECU 10 sets the fuel injection amount on the compression stroke based on the state function estimated value and the fuel injection result on the intake stroke. Note that in the case where the fuel injection is not performed on the compression stroke, the fuel injection amount is zero. In the case where the split injections are performed on the compression stroke, the injection amount of the first-stage injection and the injection amount of the second-stage injection are respectively set. At S8, the ECU 10 outputs a control signal to the injector 6 to inject the fuel into the combustion chamber 17 at the injection timing based on the preset map.

At S9, the ECU 10 sets the ignition timing based on the state function estimated value and the fuel injection result on the compression stroke. At S10, the ECU 10 outputs a control signal to the spark plug 25 to ignite the mixture gas into the combustion chamber 17 at the set ignition timing.

The SI combustion or SPCCI combustion is performed in the combustion chamber 17 by the spark plug 25 igniting the mixture gas. At S11, the ECU 10 reads a change in pressure inside the combustion chamber 17 detected by the pressure sensor SW6, and, based on this change, determines the combustion state of the mixture gas in the combustion chamber 17. At S12, the ECU 10 further compares the detection result of the combustion state with the state function estimated value estimated at S4 to calculate a difference (error) between the state function estimated value and the actual state function. The calculated error is used in the estimation at S4 in the next cycle and/or its subsequent cycles.

The ECU 10 changes the openings of the throttle valve 43, the EGR valve 54, the SCV 56, and/or the air bypass valve 48, and the phase angles of the intake electrically-operated S-VT 23 and the exhaust electrically-operated S-VT 24. Thus, the introduction amounts of fresh air and EGR gas amount into the combustion chamber 17 are changed. The feedback of the state function error is equivalent to changing the SI ratio when the ECU 10 determines that the change of the SI ratio is needed based on the error between the target SI ratio and the actual SI ratio (error).

If, at S8, the temperature in the combustion chamber 17 is estimated to be lower than the target temperature based on the state function estimated value, the ECU 10 advances the injection timing on the compression stroke than the injection timing which is based on the map so that the ignition timing is advanced. On the other hand, at S8, if the temperature in the combustion chamber 17 is estimated to be higher than the target temperature based on the state function estimated value, the ECU 10 retards the injection timing on the compression stroke than the injection timing which is based on the map so that the ignition timing retards.

Figure 17:
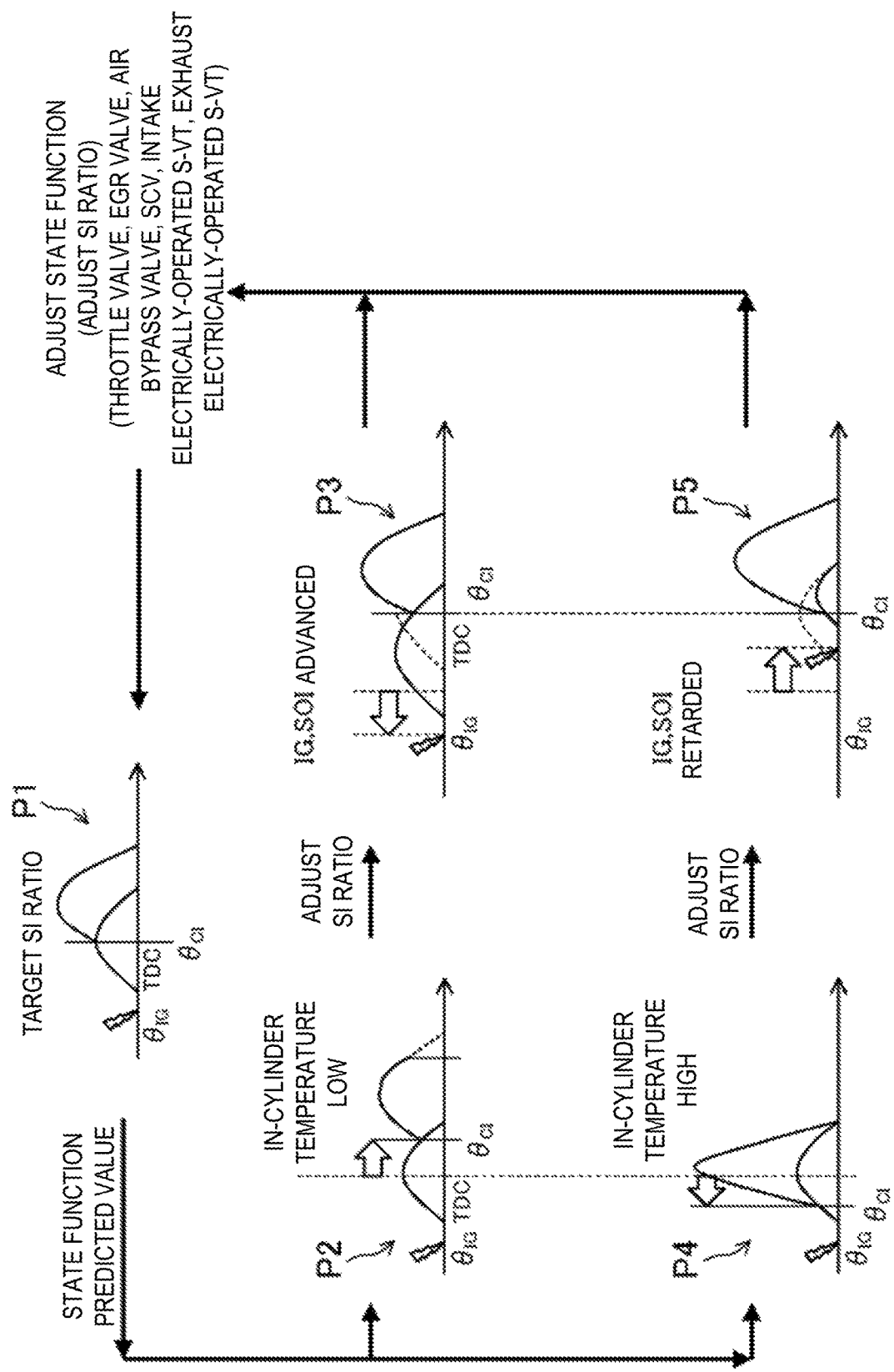
FIG. 17 is a diagram illustrating a control concept regarding a change of the SI ratio.

That is, as indicated by P2 of FIG. 17, if the temperature in the combustion chamber 17 is low, the timing $\theta_{CI}$ at which the unburned mixture gas self-ignites after the SI combustion is started by the spark-ignition retards, and the SI ratio shifts from the target SI ratio (see P1). In this case, the unburned fuel increases and the exhaust gas performance degrades.

Therefore, when the temperature in the combustion chamber 17 is estimated to be lower than the target temperature, the ECU 10 advances the injection timing as well as the ignition timing $\theta_{IG}$ at S10 of FIG. 16. As indicated by P3 of FIG. 17, since the start of SI combustion is advanced, sufficient heat generation by the SI combustion occurs, and therefore, the timing $\theta_{CI}$ of the self-ignition of the unburned mixture gas is prevented from retarding when the temperature in the combustion chamber 17 is low. As a result, the SI ratio approaches the target SI ratio. The increase of the unburned fuel and the degradation of exhaust gas performance are prevented.

Moreover, as indicated by P4 of FIG. 17, when the temperature in the combustion chamber 17 is high, the unburned mixture gas self-ignites immediately after the SI combustion is started by the spark-ignition, and the SI ratio shifts from the target SI ratio (see P1). In this case, the combustion noise increases.

Therefore, when the temperature in the combustion chamber 17 is estimated to exceed the target temperature, the ECU 10 retards the injection timing as well as the ignition timing $\theta_{IG}$ at S10 of FIG. 16. As indicated by P5 of FIG. 17, since the start of SI combustion is retarded, the timing $\theta_{CI}$ of the self-ignition of the unburned mixture gas is prevented from advancing when the temperature in the combustion chamber 17 is high. As a result, the SI ratio approaches the target SI ratio. The increase of the combustion noise is avoided.

The changes of the injection timing and the ignition timing are equivalent to changing the SI ratio when the ECU 10 determines that the SI ratio in the SPCCI combustion is required to be changed. By changing the injection timing, suitable mixture gas is formed in the combustion chamber 17 at the advanced or retarded ignition timing. The spark plug 25 reliably ignites the mixture gas, and the unburned mixture gas self-ignites at a suitable timing.

Note that the change of the state function inside the combustion chamber 17 through controlling the throttle valve 43, the EGR valve 54, the air bypass valve 48, the intake electrically-operated S-VT 23, the exhaust electrically-operated S-VT 24, and the SCV 56 based on the actual combustion state in FIG. 17 is as described at S12 and S4 of FIG. 16.

The engine 1 changes the SI ratio by the state function setting devices including the throttle valve 43, the EGR valve 54, the air bypass valve 48, the intake electrically-operated S-VT 23, the exhaust electrically-operated S-VT 24, and the SCV 56. The SI ratio may roughly be changed by changing the state function inside the combustion chamber 17. At the same time, the engine 1 changes the SI ratio by changing the injection timing and the ignition timing of the fuel. By changing the injection timing and the ignition timing, for example, the difference between the cylinders may be corrected and the self-ignition timing is finely changed. By changing the SI ratio in two stages, the engine 1 accurately achieves the target SPCCI combustion corresponding to the operating state.

<Second Operating Range Map>

Figure 7B:
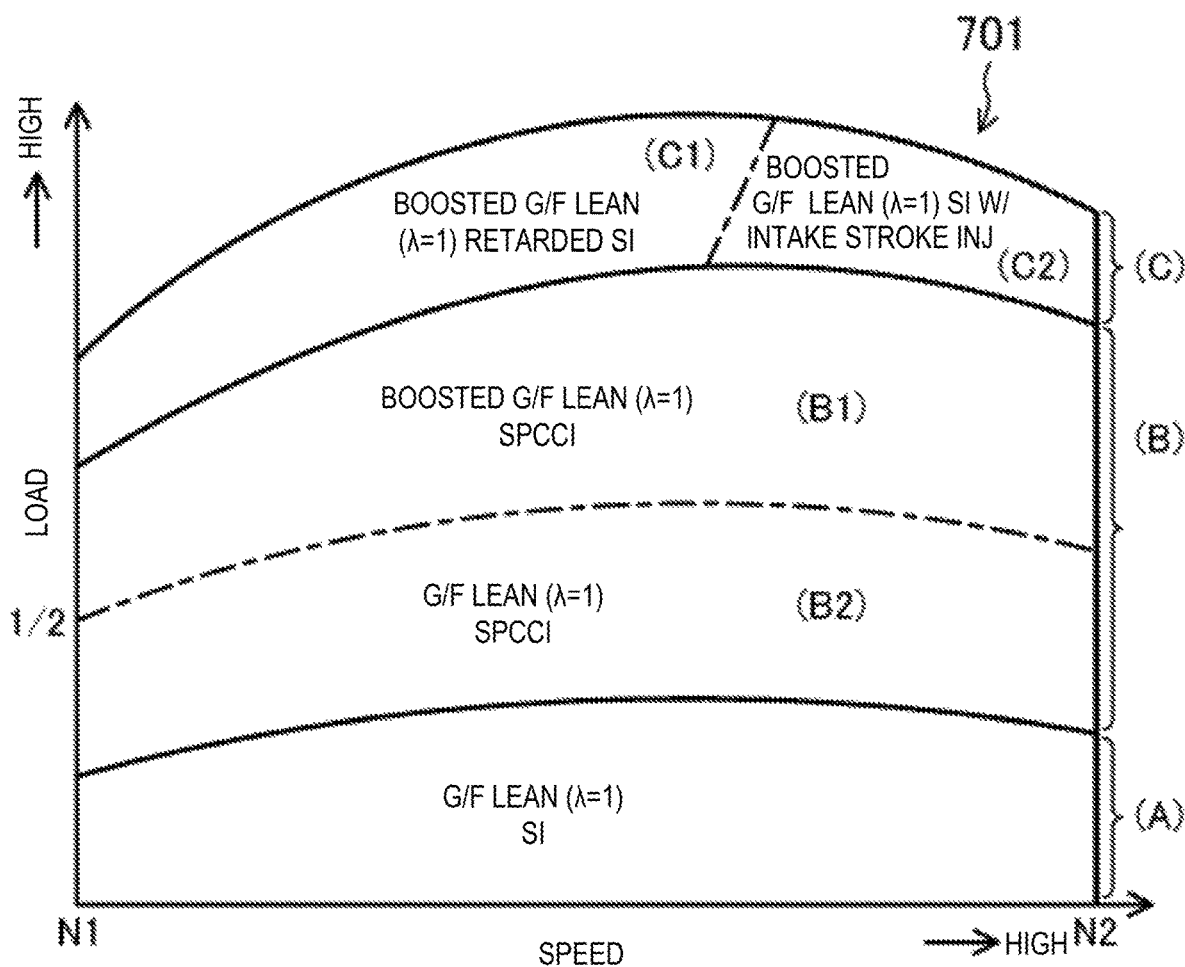
FIG. 7B is a chart illustrating a second operating range map.

FIG. 7B illustrates a second configuration example of the operating range map of the engine 1 (second operating range map 701). The operating range map 701 is divided into the following three ranges.

(A): a low load range including the idle operation (B): a medium load range between the low load range (A) and the following high load range (C)

(C): a high load range including the full engine load

That is, on the operating range map 701, compared to the operating range map 700 described above, each of the low load range (A), the medium load range (B), and the high load range (C) is extended in the engine speed direction.

In the engine 1 adopting the operating range map 701, especially in order to extend the medium load range (B) in which the SPCCI combustion is performed, the swirl flow stronger than a given strength is generated in the combustion chamber 17.

For example, the ECU 10 adjusts the opening of the SCV 56 as needed. When the operating state of the engine 1 is within the medium load range (B), the SCV 56 is adjusted to be fully closed or have a given narrow opening. As a result, a swirl flow having the given strength is formed in the combustion chamber 17. At the timing of reaching the ignition from the intake stroke, the swirl ratio may be 4 or higher. Moreover, the swirl ratio may be set below 4, for example, within a range of 1.5 to 3.

Also in the engine 1 adopting the operating range map 701, the SI ratio is preferably adjusted similar to the engine 1 adopting the operating range map 700. That is, as illustrated in FIG. 11, within the second medium load segment (B2) in which the boosting is not performed, the SI ratio is linearly increased as the engine speed increases. As a result, also within the high speed range, the SPCCI combustion is stably performed while keeping NVH, which can become an issue, below the allowable value.

Further in the engine 1 adopting the operating range map 701, the SI ratio is increased at a high engine speed by the first to fourth methods similar to the engine 1 adopting the operating range map 700.

<Third Operating Range Map>

Figure 7C:
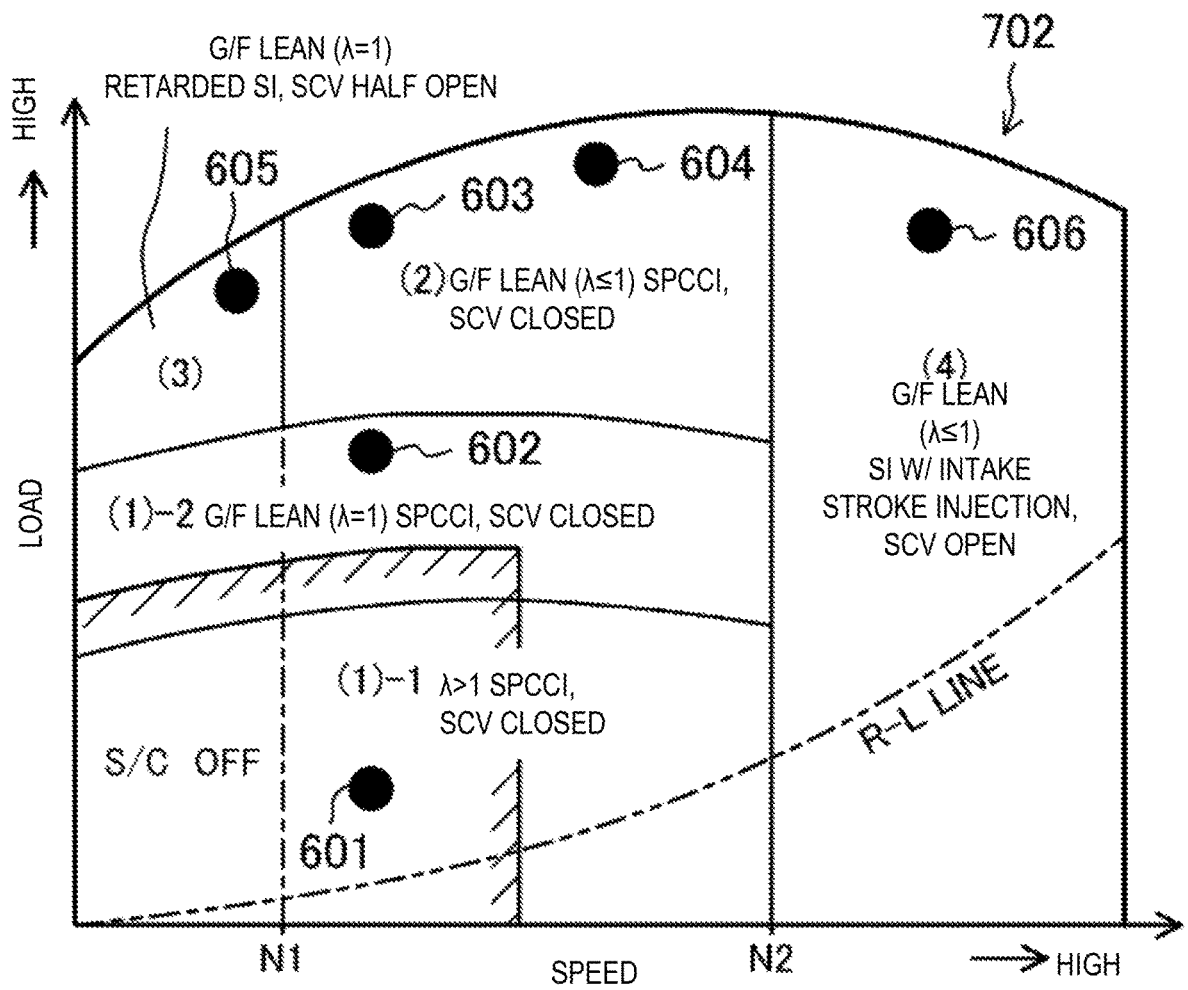
FIG. 7C is a chart illustrating a third operating range map.

FIG. 7C illustrates a third configuration example of the operating range map of the engine 1 (third operating range map 702).

(1)-1: a low load range including the idle operation and extending in low and medium engine speed ranges (1)-2: a medium load range in which the engine load is higher than the low load range and extending in the low and medium engine load ranges (2): a high-load medium-speed range in which the engine load is higher than the medium load range and which is located in the high load range including the full engine load (3): a high-load low-speed range located in the high load range and in which the engine speed is lower than the high-load medium-speed range (4): and a high speed range in which the engine speed is higher than the low load range, the medium load range, the high-load medium-speed range, and the high-load low-speed range Here, the low speed range, the medium speed range, and the high speed range may be defined by substantially evenly dividing, in the engine speed direction, the entire operating range of the engine 1 into three ranges of the low speed range, the medium speed range and the high speed range. On the operating range map 702, the engine speed lower than a speed N1 is defined as low, the engine speed higher than a speed N2 is defined as high, and the engine speed between engine speeds N1 and N2 is defined as medium.

For example, the speed N1 may be about 1,200 rpm and the speed N2 may be about 4,000 rpm. Note that the speed N1 and the speed N2 may be the same or different between the operating range map 700 and the operating range map 702.

On the operating range map 702, mainly for improving the fuel efficiency and the exhaust gas performance, the engine 1 performs the SPCCI combustion within the low load range (1)-1, the medium load range (1)-2, and the high-load medium-speed range (2). The operating range map 702 is different from the operating range map 701 in that the SPCCI combustion is performed also when the engine 1 operates at a low load and when the engine 1 operates at a high load. Further, the engine 1 performs the combustion by spark-ignition within the other ranges, specifically, the high-load low-speed range (3) and the high speed range (4). Hereinafter, the operation of the engine 1 within each range is described in detail with reference to the fuel injection timing and the ignition timing illustrated in FIG. 18.

(Low Load Range (1)-1)

When the engine 1 is operating within the low load range (1)-1, the engine 1 performs the SPCCI combustion.

Figure 18:
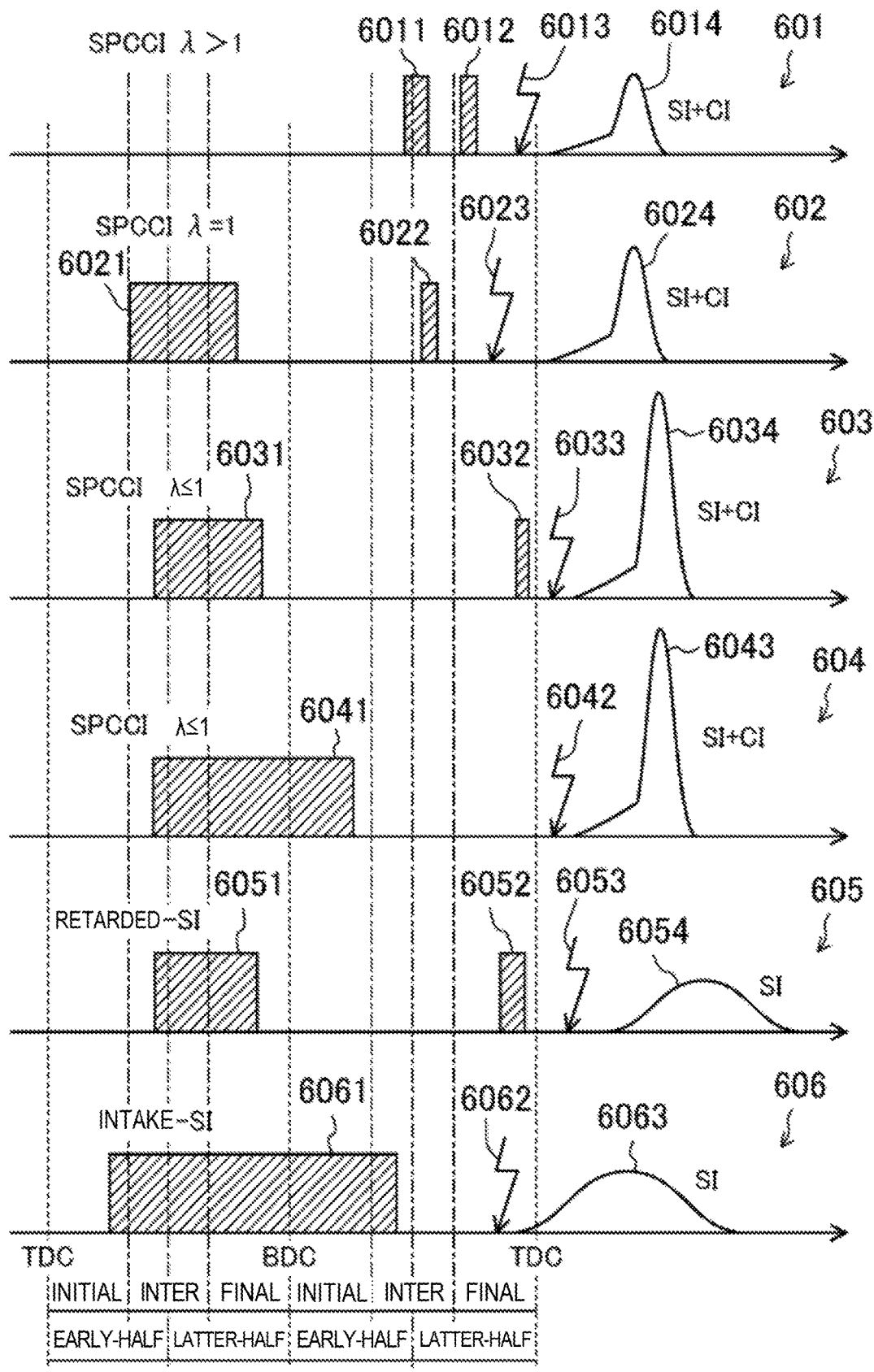
FIG. 18 is a diagram illustrating fuel injection timings, ignition timings, and combustion waveforms in respective operating states on the third operating range map.

The reference character 601 in FIG. 18 indicates one example of the fuel injection timings (reference characters 6011 and 6012) and the ignition timing (reference character 6013), and a combustion waveform (i.e., a waveform indicating a change in heat generation rate with respect to the crank angle; the reference character 6014) when the engine 1 is operating in the operating state of the reference character 601 within the low load range (1)-1 of the engine 1.

When the engine 1 is operating within the low load range (1)-1, the swirl flow having the given strength is formed in the combustion chamber 17 (see FIG. 14B). The swirl ratio when the engine 1 operates within the low load range (1)-1 is approximately 2, and is adjusted within a range of below 4, for example, within the range of 1.5 to 3. Note that a strong swirl flow may be formed by setting the swirl ratio to 4 or higher.

The swirl flow is strong in an outer circumferential portion of the combustion chamber 17 and weak in a center portion. The SCV 56 is controlled to have a given narrow opening without being fully closed. As described above, since the intake port 18 is a tumble port, an oblique swirl flow having a tumble component and a swirl component is formed in the combustion chamber 17.

When the engine 1 operates within the low load range (1)-1, the air-fuel ratio (A/F) of the mixture gas is leaner than the theoretical air-fuel ratio in the entire combustion chamber 17. That is, the excess air ratio λ of the mixture gas exceeds 1 in the entire combustion chamber 17. More specifically, the A/F of the mixture gas in the entire combustion chamber 17 is 30:1 or higher. In this manner, generation of raw $NO_x$ is reduced and the exhaust gas performance is improved.

When the engine 1 operates within the low load range (1)-1, the EGR system 55 introduces the EGR gas into the combustion chamber 17 as needed. For example, the internal EGR gas is introduced according to the setting of the positive overlap period.

When the engine 1 operates within the low load range (1)-1, the mixture gas is stratified between the center portion and the outer circumferential portion of the combustion chamber 17. The center portion of the combustion chamber 17 is the portion where the spark plug 25 is disposed, and the outer circumferential portion is the portion around the center portion and in contact with a liner of the cylinder 11. The center portion of the combustion chamber 17 may be defined as a portion where the swirl flow is weak and the outer circumferential portion may be defined as a portion where the swirl flow is strong.

The fuel concentration of the mixture gas in the center portion is higher than that in the outer circumferential portion. For example, the A/F of the mixture gas in the center portion is between 20:1 and 30:1, and the A/F of the mixture gas in the outer circumferential portion is 35:1 or higher.

When the engine 1 operates within the low load range (1)-1, the injector 6 basically injects the fuel into the combustion chamber 17 by splitting it into in a plurality of injections on the compression stroke. The mixture gas is stratified in the center portion and the outer circumferential portion of the combustion chamber 17 by the split injections of the fuel and the swirl flow in the combustion chamber 17.

After the fuel injection is ended, the spark plug 25 ignites the mixture gas in the center portion of the combustion chamber 17 at the given timing before CTDC (see the reference character 6013). Since the fuel concentration of the mixture gas in the center portion is relatively high, ignitability improves and the SI combustion by the flame propagation stabilizes. By stabilizing the SI combustion, the CI combustion starts at the suitable timing. The controllability of the CI combustion improves in the SPCCI combustion. As a result, when the engine 1 operates within the low load range (1)-1, both the reduction of the generation of combustion noise and the improvement of the fuel efficiency by shortening the combustion period are achieved.

(Medium Load Range (1)-2)

Also when the engine 1 is operating within the medium load range (1)-2, the engine 1 performs the SPCCI combustion similarly to the low load range (1)-1. The medium load range (1)-2 corresponds to the medium load range (B) on the operating range map 701.

The reference character 602 in FIG. 18 indicates one example of the fuel injection timings (reference characters 6021 and 6022) and the ignition timing (reference character 6023), and a combustion waveform (reference character 6024) when the engine 1 is operating in the operating state of the reference character 602 within the medium load range (1)-2 of the engine 1.

The EGR system 55 introduces the EGR gas into the combustion chamber 17 when the operating state of the engine 1 is within the medium load range (1)-2. For example, the internal EGR gas is introduced according to the setting of the positive overlap period.

Also when the engine 1 operates within the medium load range (1)-2, similar to the low load range (1)-1, a swirl flow having a given strength, in which the swirl ratio is about 2, is formed in the combustion chamber 17. The SCV 56 is not fully closed but has a given narrow opening. By forming the swirl flow, the residual gas accumulated in the cavity 31 is led outside the cavity 31. As a result, the G/F of the mixture gas in the SI portion near the spark plug 25 may be varied from the G/F of the mixture gas in the CI portion around the SI portion. Therefore, the SPCCI combustion is stabilized by setting the total G/F in the entire combustion chamber 17 to between 18 and 50 as described above.

Further, since the turbulence kinetic energy in the combustion chamber 17 increases by forming the swirl flow, when the engine 1 operates within the medium load range (1)-2, the flame of the SI combustion propagates promptly and the SI combustion is stabilized. The controllability of the CI combustion improves by stabilizing the SI combustion. By making the timing of the CI combustion in the SPCCI combustion appropriate, the generation of combustion noise is reduced and the fuel efficiency is improved. Further, the variation in torque between cycles is reduced.

When the engine 1 operates within the medium load range (1)-2, the air-fuel ratio (A/F) of the mixture gas is at the theoretical air-fuel ratio (A/F≈14.7:1) in the entire combustion chamber 17. The three-way catalyst purifies the exhaust gas discharged from the combustion chamber 17. Thus, the exhaust gas performance of the engine 1 becomes good. The A/F of the mixture gas may be set to remain within the purification window of the three-way catalyst. Therefore, the excess air ratio λ of the mixture gas may be set to 1.0±0.2.

When the engine 1 operates within the medium load range (1)-2, the injector 6 performs the fuel injection on the intake stroke (reference character 6021) and the fuel injection on the compression stroke (reference character 6022). By performing the first injection 6021 on the intake stroke, the fuel is distributed substantially evenly in the combustion chamber 17. By performing the second injection 6022 on the compression stroke, the temperature in the combustion chamber 17 is reduced by latent heat of vaporization of the fuel. The mixture gas containing the fuel injected in the first injection 6021 is prevented from causing pre-ignition.

When the injector 6 performs the first injection 6021 on the intake stroke and the second injection 6022 on the compression stroke, the mixture gas with the excess air ratio λ of 1.0±0.2 as a whole is formed in the combustion chamber 17. Since the fuel concentration of the mixture gas is substantially homogeneous, the improvement in the fuel efficiency by reducing the unburned fuel loss and the improvement in the exhaust gas performance by avoiding the smoke generation are achieved. The excess air ratio λ is preferably 1.0 to 1.2. Further, the total G/F in the entire combustion chamber 17 is 18 to 50, and the G/F of the SI portion near the spark plug 25 is 14 to 22.

By the spark plug 25 igniting the mixture gas at the given timing before CTDC (reference character 6023), the mixture gas combusts by flame propagation. After the combustion by flame propagation is started, the unburned mixture gas self-ignites at the target timing and causes the CI combustion. The fuel injected in the second-stage injection mainly causes the SI combustion. The fuel injected in the first-stage injection mainly causes the CI combustion. By having the total G/F in the entire combustion chamber 17 between 18 and 50 and the G/F of the SI portion near the spark plug 25 between 14 and 22, the SPCCI combustion is stabilized.

Here, as illustrated in FIG. 7C, a range in which the booster 44 is turned off (refer to S/C OFF) is a part of the low load range (1)-1 and a part of the medium load range (1)-2. In detail, the booster 44 is turned off within the low engine speed segment of the low load range (1)-1. Within a high engine speed segment of the low load range (1)-1, the booster 44 is turned on to increase the boosting pressure in order to secure a required intake charge amount corresponding to the engine speed being high. Further, within a low-load low-speed segment of the medium load range (1)-2, the booster 44 is turned off. Within a high load segment of the medium load range (1)-2, the booster 44 is turned on in order to secure the required intake air charge amount corresponding to the engine speed being high. Within a high speed segment of the medium load range (1)-2, the booster 44 is turned on in order to secure the required intake air charge amount corresponding to the engine speed being high.

Note that within the high-load medium-speed range (2), the high-load low-speed range (3), and the high speed range (4), the booster 44 is turned on throughout the ranges.

(High-Load Medium-Speed Range (2))

Also when the engine 1 is operating within the high-load medium-speed range (2), the engine 1 performs the SPCCI combustion similarly to the low load range (1)-1 and the medium load range (1)-2.

The reference character 603 in FIG. 18 indicates one example of the fuel injection timings (reference characters 6031 and 6032) and the ignition timing (reference character 6033), and a combustion waveform (reference character 6034) when the engine 1 is operating in the operating state of the reference character 603 within the high-load medium-speed range (2) of the engine 1. Further, the reference character 604 in FIG. 18 indicates one example of the fuel injection timings (reference characters 6041) and the ignition timing (reference character 6042), and a combustion waveform (reference character 6043) when the engine speed is higher than in the operating state of the reference character 603.

The EGR system 55 introduces the EGR gas (e.g., external EGR gas) into the combustion chamber 17 when the operating state of the engine 1 is within the high-load medium-speed range (2). The engine 1 reduces the EGR gas amount as the engine load increases. At the full engine load, the EGR gas may be set to zero.

Also when the engine 1 operates within the high-load medium-speed range (2), similar to the low load range (1)-1, a swirl flow having a given strength, in which the swirl ratio is below 4, is formed in the combustion chamber 17. A strong swirl flow may be formed by setting the swirl ratio to 4 or higher. The SCV 56 is controlled to have a given narrow opening without being fully closed.

When the engine 1 operates within the high-load medium-speed range (2), the air-fuel ratio (A/F) of the mixture gas is at or richer than the theoretical air-fuel ratio in the entire combustion chamber 17 (i.e., the excess air ratio λ of the mixture gas is λ≤1).

When the engine 1 operates at the low speed side of the high-load medium-speed range (2), the injector 6 injects the fuel on the intake stroke (reference character 6031) and injects the fuel at a final stage of the compression stroke (reference character 6032). The final stage of the compression stroke may be defined by evenly dividing the compression stroke into three stages of an initial stage, an intermediate stage, and the final stage.

The first-stage injection 6031 starting on the intake stroke may start the fuel injection in an early half of the intake stroke. The early half of the intake stroke may be defined by evenly dividing the intake stroke into two parts of the early half and the latter half. For example, the first-stage injection may start the fuel injection at 280° CA before TDC.

When the injection of the first-stage injection 6031 is started in the early half of the intake stroke, although not illustrated, the fuel spray hits an opening edge of the cavity 31 so that a portion of the fuel enters the squish area 171 of the combustion chamber 17 and the rest of the fuel enters the section within the cavity 31. The swirl flow is strong in the outer circumferential portion of the combustion chamber 17 and weak in the center portion. Therefore, the portion of the fuel that enters the squish area 171 joins the swirl flow, and the rest of the fuel entered the section within the cavity 31 joins the inner side of the swirl flow. The fuel joins the swirl flow, remains in the swirl flow during the intake stroke and the compression stroke and forms the mixture gas for the CI combustion in the outer circumference portion of the combustion chamber 17. The fuel that enters the inner side of the swirl flow also remains at the inner side of the swirl flow during the intake stroke and the compression stroke and forms the mixture gas for the SI combustion in the center portion of the combustion chamber 17.

When the engine 1 operates within the high-load medium-speed range (2), the excess air ratio λ of the mixture gas in the center portion where the spark plug 25 is disposed preferably is 1 or less, and the excess air ratio λ of the mixture gas in the outer circumferential portion is 1 or less, preferably below 1. The air-fuel ratio (A/F) of the mixture gas in the center portion may be, for example, between 13 and the theoretical air-fuel ratio (14.7:1). The air-fuel ratio of the mixture gas in the center portion may be leaner than the theoretical air-fuel ratio. Further, the air-fuel ratio of the mixture gas in the outer circumferential portion may be, for example, between 11:1 and the theoretical air-fuel ratio, preferably between 11:1 and 12:1. Since the amount of fuel within the mixture gas increases in the outer circumferential portion when the excess air ratio λ of the outer circumferential portion of the combustion chamber 17 is set to below 1, the temperature is lowered by the latent heat of vaporization of the fuel. The air-fuel ratio of the mixture gas in the entire combustion chamber 17 may be between 12.5:1 and the theoretical air-fuel ratio, preferably between 12.5:1 and 13:1.

The second-stage injection 6032 performed in the final stage of the compression stroke may start the fuel injection at 10° CA before TDC. By performing the second-stage injection immediately before TDC, the temperature in the combustion chamber 17 is lowered by the latent heat of vaporization of the fuel. Although a low-temperature oxidation reaction of the fuel injected by the first-stage injection 6031 progresses on the compression stroke and transitions to a high-temperature oxidation reaction before TDC, by performing the second-stage injection 6032 immediately before TDC so as to lower the temperature inside the combustion chamber, the transition from the low-temperature oxidation reaction to the high-temperature oxidation reaction is avoided and pre-ignition is prevented. Note that the ratio between the injection amount of the first-stage injection and the injection amount of the second-stage injection may be, for example, 95:5.

The spark plug 25 ignites the mixture gas in the center portion of combustion chamber 17 near CTDC (reference character 6033). The spark plug 25 ignites, for example, after CTDC. Since the spark plug 25 is disposed in the center portion of the combustion chamber 17, the ignition of the spark plug 25 causes the mixture gas in the center portion to start the SI combustion by flame propagation.

Within the high load range, the fuel injection amount increases as well as the temperature of the combustion chamber 17, therefore the CI combustion is likely to start early. In other words, within the high load range, the pre-ignition of the mixture gas is likely to occur. However, since the temperature of the outer circumferential portion of the combustion chamber 17 is lowered by the latent heat of vaporization of the fuel as described above, the CI combustion is avoided from starting immediately after the mixture gas is spark-ignited.

As described above, when the spark plug 25 ignites the mixture gas in the center portion, the combustion rate increases and the SI combustion is stabilized by high turbulence kinetic energy, and the flame of the SI combustion propagates in the circumferential direction along the swirl flow inside the combustion chamber 17. Then, at a given position of the outer circumferential portion of the combustion chamber 17 in the circumferential direction, the unburned mixture gas self-ignites and the CI combustion starts.

In the concept of this SPCCI combustion, by the combination of stratifying the mixture gas in the combustion chamber 17 and causing the swirl flow in the combustion chamber 17, the SI combustion is sufficiently performed until the CI combustion starts. As a result, the generation of combustion noise is reduced and, since the combustion temperature does not become excessively high, generation of $NO_x$ is also reduced. Further, the variation in torque between cycles is reduced.

Further, since the temperature in the outer circumferential portion is low, the CI combustion becomes slower and the generation of the combustion noise is reduced. Moreover, since the combustion period is shortened by the CI combustion, within the high load range, the torque improves and also the thermal efficiency improves. Thus, by performing the SPCCI combustion within the high engine load range, the engine 1 is improved in the fuel efficiency while avoiding the combustion noise.

When the engine 1 operates at the high speed side of the high-load medium-speed range (2), the injector 6 starts the fuel injection on the intake stroke (reference character 6041).

The first-stage injection 6041 starting on the intake stroke may start the fuel injection in the early half of the intake stroke similarly to the above description. For example, the first-stage injection 6041 may start the fuel injection at 280° CA before TDC. The first-stage injection may last over the intake stroke and end on the compression stroke. By setting the start of injection of the first-stage injection 6041 in the early half of the intake stroke, the mixture gas for the CI combustion is formed in the outer circumferential portion of the combustion chamber 17 and the mixture gas for the SI combustion is formed in the center portion of the combustion chamber 17. Similar to the above description, the excess air ratio λ of the mixture gas in the center portion where the spark plug 25 is disposed preferably is 1 or less, and the excess air ratio λ of the mixture gas in the outer circumferential portion is 1 or less, preferably below 1. The air-fuel ratio (A/F) of the mixture gas in the center portion may be, for example, between 13 and the theoretical air-fuel ratio (14.7:1). The air-fuel ratio of the mixture gas in the center portion may be leaner than the theoretical air-fuel ratio. Further, the air-fuel ratio of the mixture gas in the outer circumferential portion may be, for example, between 11:1 and the theoretical air-fuel ratio, preferably between 11:1 and 12:1. The air-fuel ratio of the mixture gas in the entire combustion chamber 17 may be between 12.5:1 and the theoretical air-fuel ratio, preferably between 12.5:1 and 13:1.

When the engine speed increases, the time length during which the fuel injected in the first-stage injection 6041 reacts becomes shorter. Therefore, the second-stage injection for suppressing the oxidation reaction of the mixture gas may be omitted.

The spark plug 25 ignites the mixture gas in the center portion of combustion chamber 17 near CTDC (reference character 6042). The spark plug 25 ignites, for example, after CTDC.

As described above, by stratifying the mixture gas, within the high-load medium-speed range (2), the combustion noise is reduced and the SPCCI combustion is stabilized.

(High-Load Low-Speed Range (3))

When the engine 1 is operating within the high-load low-speed range (3), the engine 1 performs the SI combustion instead of the SPCCI combustion. The high-load low-speed range (3) corresponds to the first high load segment (C1) on the operating range map 701.

The reference character 605 in FIG. 18 indicates one example of the fuel injection timings (reference characters 6051 and 6052) and the ignition timing (reference character 6053), and a combustion waveform (reference character 6054) when the engine 1 is operating in the operating state of the reference character 605 within the high-load low-speed range (3) of the engine 1.

The EGR system 55 introduces the EGR gas into the combustion chamber 17 when the operating state of the engine 1 is within the high-load low-speed range (3). The engine 1 reduces the EGR gas amount as the engine load increases. At the full load, the EGR gas may be set to zero.

When the engine 1 operates within the high-load low-speed range (3), the air-fuel ratio (A/F) of the mixture gas is at the theoretical air-fuel ratio (A/F=44.7:1) in the entire combustion chamber 17. The A/F of the mixture gas may be set to remain within the purification window of the three-way catalyst. Therefore, the excess air ratio λ of the mixture gas may be set to 1.0±0.2. By setting the air-fuel ratio of the mixture gas to the theoretical air-fuel ratio, the fuel efficiency improves within the high-load low-speed range (3). When the engine 1 operates within the high-load medium-speed range (3), the fuel concentration of the mixture gas in the entire combustion chamber 17 may be set so that the excess air ratio λ is 1 or less and equal to or higher than the excess air ratio λ within the high-load medium-speed range (2), preferably higher than the excess air ratio λ within the high-load medium-speed range (2).

On the operating range map 702, when the engine 1 operates within the high-load low-speed range (3), the injector 6 injects the fuel into the combustion chamber 17 at the timings of the intake stroke and in the retard period from the final stage of the compression stroke to the early stage of the expansion stroke (reference characters 6051 and 6052). By injecting the fuel in two injections, the amount of fuel injected in the retard period is reduced. By injecting the fuel on the intake stroke (reference character 6051), the formation period of time of the mixture gas is sufficiently secured. Additionally, by injecting the fuel in the retard period (reference character 6052), the flow in the combustion chamber 17 immediately before the ignition is strengthened, which is advantageous in stabilizing the SI combustion.

After the fuel is injected, the spark plug 25 ignites the mixture gas at a timing near CTDC (reference character 6053). The spark plug 25 ignites, for example, after CTDC. The mixture gas causes the SI combustion on the expansion stroke. Since the SI combustion starts on the expansion stroke, the CI combustion does not start.

When the engine 1 operates within the high-load low-speed range (3), the swirl flow is made weaker than when operating within the high-load medium-speed range (2). When the engine 1 operates within the high-load low-speed range (3), the opening of the SCV 56 is larger than when operating within the high-load medium-speed range (2). The opening of the SCV 56 may be, for example, about 50% (i.e., half opened).

The axes of the nozzle ports of the injector 6 do not circumferentially overlap with the spark plug 25. The fuel injected from the nozzle ports flows in the circumferential direction due to the swirl flow in the combustion chamber 17. By the swirl flow, the fuel is promptly conveyed to near the spark plug 25. The fuel is vaporized while being conveyed to near the spark plug 25.

On the other hand, if the swirl flow is excessively strong, the fuel flows in the circumferential direction and reaches away from the spark plug 25, and the fuel cannot promptly be conveyed to near the spark plug 25. For this reason, when the engine 1 operates within the high-load low-speed range (3), the swirl flow is made weaker than when operating within the high-load medium-speed range (2). As a result, the fuel is promptly conveyed to near the spark plug 25, thus the ignitability of the mixture gas improves and the SI combustion stabilizes.

(High Speed Range (4))

When the engine speed is high, the time length for the crank angle to change 1° becomes shorter. Therefore, for example, within the high speed side of the high load range, it is difficult to stratify the mixture gas in the combustion chamber 17 as described above. When the engine speed increases, it becomes difficult to perform the SPCCI combustion described above.

When the engine 1 is operating within the high speed range (4), the engine 1 performs the SI combustion instead of the SPCCI combustion. Note that the high speed range (4) extends over the entire load direction from low load to high loads.

The reference character 606 in FIG. 18 indicates one example of the fuel injection timing (reference characters 6061) and the ignition timing (reference character 6062), and a combustion waveform (reference character 6063) when the engine 1 is operating in the operating state of the reference character 606 within the high speed range (4).

The EGR system 55 introduces the EGR gas into the combustion chamber 17 when the operating state of the engine 1 is within the high speed range (4). The engine 1 reduces the EGR gas amount as the engine load increases. At the full load, the EGR gas may be set to zero.

When operating within the high speed range (4), the engine 1 fully opens the SCV 56. No swirl flow is generated in the combustion chamber 17, and only the tumble flow is generated. By fully opening the SCV 56, the charging efficiency is improved in the high speed range (4) and a pumping loss is reduced.

When the engine 1 operates within the high speed range (4), the air-fuel ratio (A/F) of the mixture gas is basically at the theoretical air-fuel ratio (A/F≈14.7:1) in the entire combustion chamber 17. The excess air ratio λ of the mixture gas may be set to 1.0±0.2. Note that within the high load side of the high speed range (4) including the full load, the excess air ratio λ of the mixture gas may be less than 1.

When the engine 1 operates within the high speed range (4), the injector 6 starts the fuel injection on the intake stroke (reference character 6061). The injector 6 injects all the fuel for one combustion cycle in a lump. By starting the fuel injection on the intake stroke, homogeneous or substantially homogeneous mixture gas is formed in the combustion chamber 17. Further, when the engine speed is high, since the vaporization time of the fuel is secured as long as possible, the unburned fuel loss and generation of soot are reduced.

After the fuel injection is ended, the spark plug 25 ignites the mixture gas at a suitable timing before CTDC (reference character 6062).

Also in the engine 1 adopting the operating range map 702, the SI ratio is preferably adjusted similar to the engine 1 adopting the operating range map 700. That is, as illustrated in FIG. 11, within the low load range (1)-1, the medium load range (1)-2, and the high-load medium-speed range (2) in which the SPCCI combustion is performed, the SI ratio is linearly increased as the engine speed increases. As a result, although within the high speed range, the SPCCI combustion is stably performed while keeping NVH, which may become an issue, below the allowable value.

Further in the engine 1 adopting the operating range map 702, the SI ratio is increased at a high engine speed by the first to fourth methods, similar to the engine 1 adopting the operating range map 700.

(Combustion Waveform)

Figure 19:
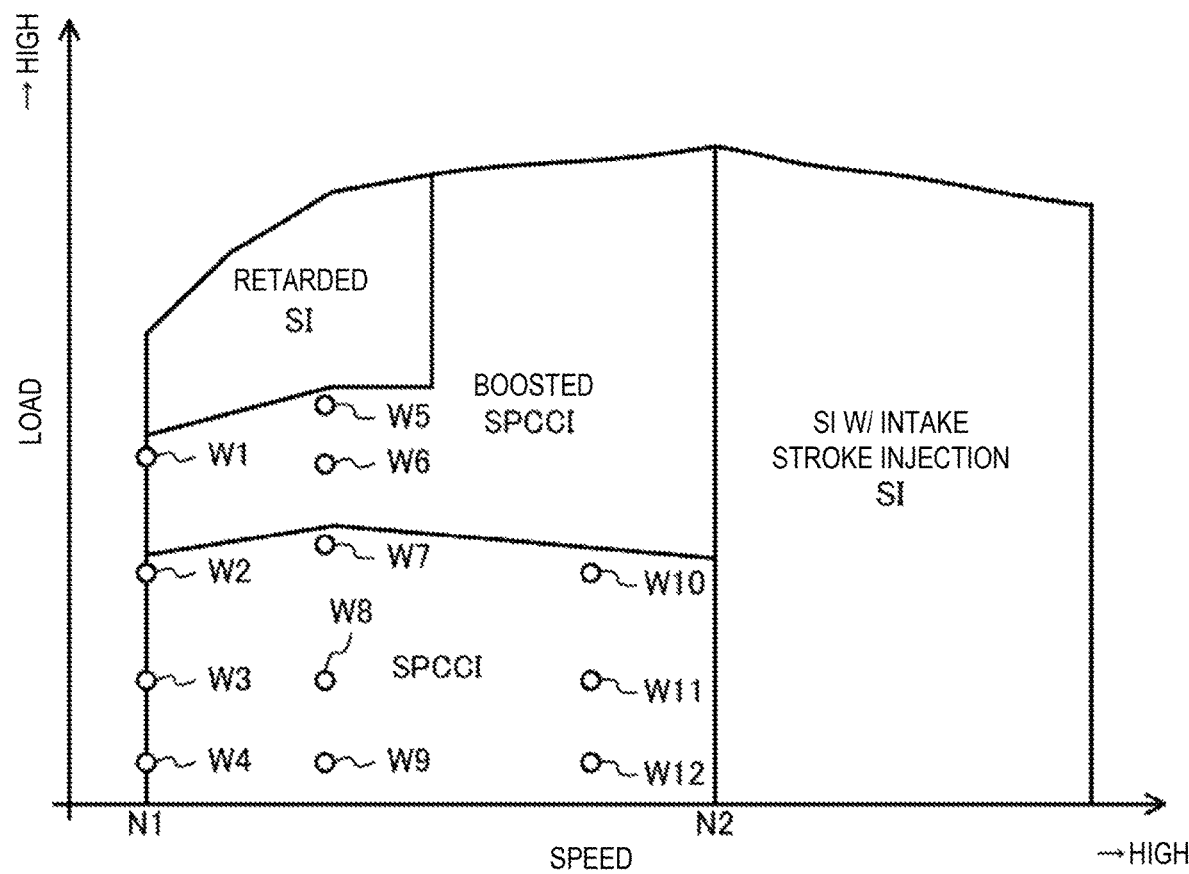
FIG. 19 is a brief chart of the third operating range map illustrated in FIG. 7C, illustrating respective operating states.
Figure 20:
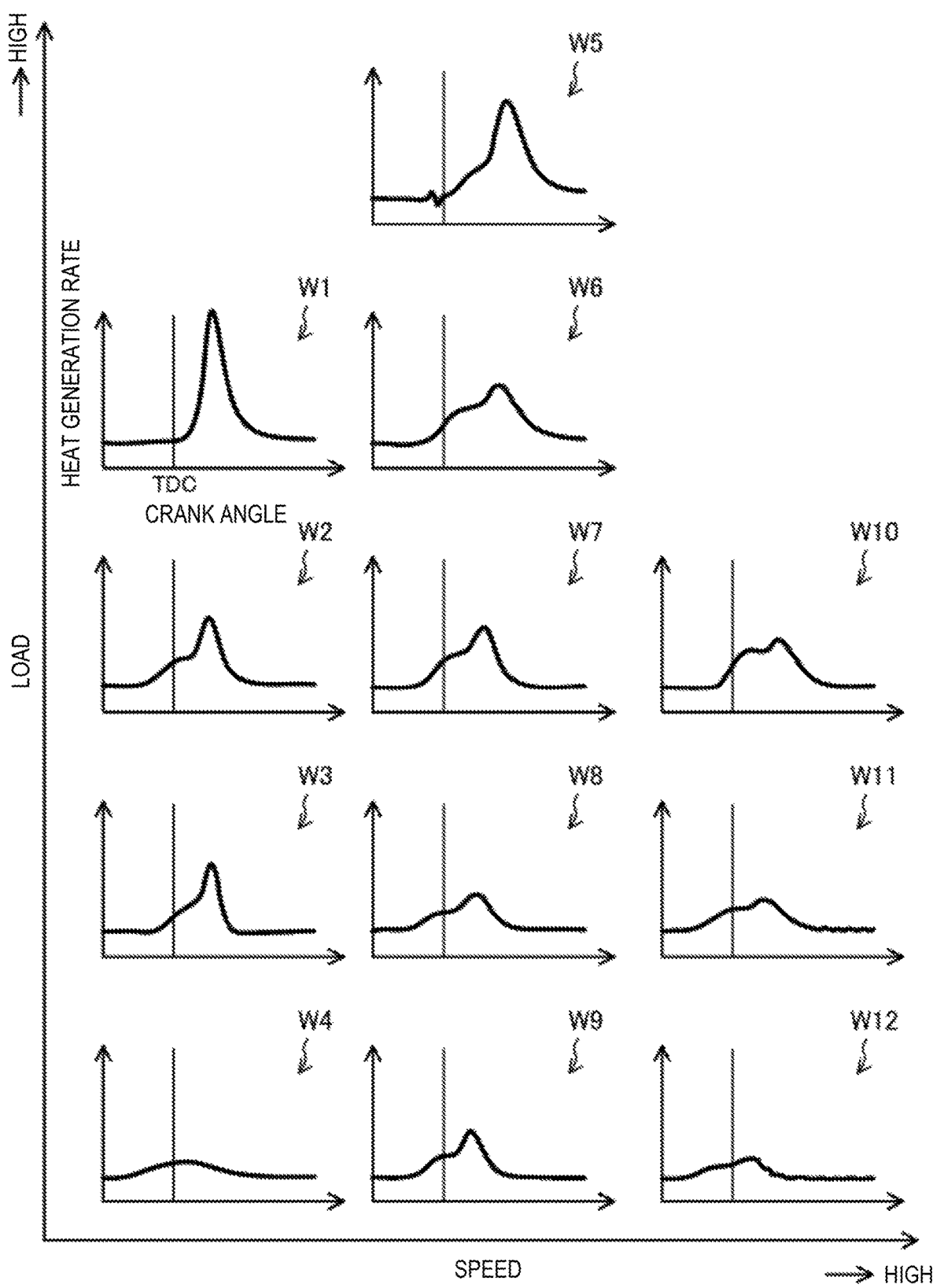
FIG. 20 is a diagram illustrating combustion waveforms in the respective operating states illustrated in FIG. 19.

FIGS. 19 and 20 illustrate combustion waveforms in operating states of the engine 1 adopting the operating range map 702. FIG. 19 is a brief chart corresponding to the third operating range map 702 illustrated in FIG. 7C. The combustion waveform indicates the change in the heat generation rate with respect to the change in the crank angle. W1 to W12 correspond to the respective operating states illustrated in FIG. 19.

As described above, within the range in which the SPCCI combustion is performed, the SI ratio is increased as the engine speed increases. When the waveforms of W2, W7 and W10 are compared, the peak of the SI combustion gradually increases in the order of W2, W7 and W10. As a result, the peak of the CI combustion gradually decreases in the order of W2, W7 and W10. Thus, the generation of combustion noise is reduced as the engine speed increases. Note that within the SPCCI range, the similar tendency is shown in the waveforms W3, W8 and W11 and the waveforms W4, W9 and W12, which are for lower engine loads than W2, W7 and W10.

Other Embodiments

Note that the control of the engine 1 performed by the ECU 10 is not limited to be based on the combustion model described above. For example, although the internal EGR system of the engine 1 described above changes the internal EGR ratio by changing the negative overlap period, it may be changed by opening the exhaust valve also on the intake stroke.

The third and fourth methods are not limited for supplementing the first or second method. They may be independent from the first and second method depending on the specifications. That is, the combination of the first to fourth methods is arbitrary.

Further, the engine 1 may perform, instead of performing the SI combustion within the high speed range, the SPCCI combustion over the entire engine speed range. Moreover, the engine 1 may perform the SPCCI combustion over the entire operating range.

Further, the art disclosed here is not limited to be applied to the engine 1 having the above configuration. The configuration of the engine 1 may adopt various configurations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Controller)
17 Combustion Chamber

DESCRIPTION OF REFERENCE CHARACTERS

23 Intake Electrically-operated S-VT (Internal EGR System)
24 Exhaust Electrically-operated S-VT (Internal EGR System)
25 Spark Plug
3 Piston
31 Cavity
54 EGR Valve (External EGR System)
55 EGR (exhaust gas recirculation) System
56 Swirl Control Valve (Intake Flow Control Device)
6 Injector
102a SI Ratio Changing Module (Heat Amount Ratio Changing Module)
SW6 Pressure Sensor

What is claimed is:

1. A control system of a compression-ignition engine, comprising:
an engine formed with a combustion chamber and configured to cause combustion of a mixture gas inside the combustion chamber;
a spark plug disposed to be oriented into the combustion chamber and configured to ignite the mixture gas inside the combustion chamber; and
a controller operatively connected to the spark plug and comprises a processor is configured to operate the engine by outputting a control signal to the spark plug,
wherein the combustion is performed in a given mode in which, after the spark plug ignites the mixture gas to start combustion, unburned mixture gas combusts by self-ignition,
wherein the controller has a heat amount ratio changing module configured to change, according to an operating state of the engine, a heat amount ratio as an index relating to a ratio of a heat amount generated when the mixture gas combusts by flame propagation with respect to a total heat amount generated when the mixture gas inside the combustion chamber combusts, and
wherein the controller causes the heat amount ratio changing module to increase the heat amount ratio at a high engine speed than at a low engine speed.

2. The control system of claim 1, further comprising a pressure sensor configured to detect pressure inside the combustion chamber,
wherein the controller sets a target heat amount ratio, receives a detection signal of the pressure sensor, calculates the heat amount ratio based on a pressure waveform caused by the combustion of the mixture gas, and changes, when the calculated heat amount ratio is different from the target heat amount ratio, the heat amount ratio to approach the target heat amount ratio.

3. The control system of claim 1, further comprising an internal exhaust gas recirculation (EGR) system provided to the engine and configured to change an internal EGR ratio that is a ratio of an amount of internal EGR gas contained within the mixture gas inside the combustion chamber,
wherein the controller outputs a control signal to the internal EGR system to increase the internal EGR ratio so as to increase the heat amount ratio.

4. The control system of claim 3, wherein the internal EGR gas is introduced into the combustion chamber by overlapping an open period of an intake valve with an open period of an exhaust valve.

5. The control system of claim 1, further comprising an external EGR system provided to the engine and configured to change an external EGR ratio that is a ratio of an amount of external EGR gas contained within the mixture gas inside the combustion chamber, wherein the controller outputs a control signal to the external EGR system to reduce the external EGR ratio so as to increase the heat amount ratio.

6. The control system of claim 1, wherein a swirl flow is formed in a combustion mode when the combustion is performed in the given mode.

7. The control system of claim 6, wherein a swirl ratio of the swirl flow is below 4.

8. The control system of claim 7, further comprising a swirl control valve provided to the engine and configured to change a strength of the swirl flow by controlling an opening by the controller, wherein the strength of the swirl flow increases as the opening of the swirl control valve is reduced, and wherein the controller controls the swirl control valve to have a given narrow opening without fully closing the swirl control valve.

9. The control system of claim 1, wherein the controller outputs the control signal to the spark plug to advance an ignition timing so as to increase the heat amount ratio.

* * * * *